US009047729B2

(12) United States Patent
Okada

(10) Patent No.: US 9,047,729 B2
(45) Date of Patent: Jun. 2, 2015

(54) GAMING MACHINE AND GAMING METHOD THEREOF, WHICH SIMULTANEOUSLY RUN COMMON GAME IN ALL TERMINALS

(75) Inventor: Kazuo Okada, Tokyo (JP)

(73) Assignees: Universal Entertainment Corporatrion, Tokyo (JP); Aruze Gaming America, Inc., Las Vegas, NV (US)

( * ) Notice: Subject to any disclaimer, the term of this patent is extended or adjusted under 35 U.S.C. 154(b) by 231 days.

(21) Appl. No.: 12/780,313

(22) Filed: May 14, 2010

(65) Prior Publication Data

US 2010/0304821 A1 Dec. 2, 2010

(30) Foreign Application Priority Data

May 28, 2009 (JP) ................................ 2009-128588

(51) Int. Cl.

*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.

CPC .................................. *G07F 17/3211* (2013.01)

(58) Field of Classification Search

CPC . A63F 11/0011; A63F 11/0074; A63F 13/10; A63F 13/12
USPC ......................................... 463/16, 17, 25, 42
See application file for complete search history.

(56) References Cited

U.S. PATENT DOCUMENTS

| | | | | |
|---|---|---|---|---|
| 5,564,700 | A | 10/1996 | Celona | |
| 6,077,162 | A | 6/2000 | Weiss | |
| 6,173,955 | B1 * | 1/2001 | Perrie et al. | 273/146 |
| 6,312,332 | B1 | 11/2001 | Walker et al. | |
| 6,375,568 | B1 | 4/2002 | Roffman et al. | |
| 7,806,764 | B2 * | 10/2010 | Brosnan et al. | 463/20 |
| 2002/0082071 | A1 * | 6/2002 | Riendeau et al. | 463/16 |
| 2005/0164793 | A1 * | 7/2005 | Merimovich et al. | 463/42 |
| 2006/0121971 | A1 * | 6/2006 | Slomiany et al. | 463/16 |
| 2008/0102916 | A1 * | 5/2008 | Kovacs et al. | 463/16 |
| 2009/0115133 | A1 * | 5/2009 | Kelly et al. | 273/274 |

* cited by examiner

*Primary Examiner* — Milap Shah
*Assistant Examiner* — Jason Pinheiro
(74) *Attorney, Agent, or Firm* — KMF Patent Services, PLLC; S. Peter Konzel; Kenneth M. Fagin

(57) ABSTRACT

The gaming machine performs the following functions: running a base game at gaming terminals in response to a start operation input through an input device; running a crap game simultaneously at all the gaming terminals in response to a game start command from the center controller; determining which gaming terminal is designated to be a shooter of a crap game; allowing the gaming terminal designated to be the shooter to receive a roll operation input through an input device, and output a roll operation command to the center controller; determining a win or loss which causes the crap game to end; and (i) when no win or loss is resulted, running a crap game again; and when a win is resulted, awarding a payout according to the win.

17 Claims, 33 Drawing Sheets

FIG. 8

REGULAR GAME SYMBOL TABLE

| | | FIRST COLUMN(L1) | SECOND COLUMN(L2) | THIRD COLUMN(L3) | FOURTH COLUMN(L4) | FIFTH COLUMN(L5) |
|---|---|---|---|---|---|---|
| CODE NO. | RANDOM NUMBER | SYMBOL | SYMBOL | SYMBOL | SYMBOL | SYMBOL |
| 0 | 0-3277 | J | WILD | A | Q | J |
| 1 | 3278-6555 | Q | A | J | J | A |
| 2 | 6556-9833 | BAT | Q | BAT | BAT | BAT |
| 3 | 9834-13111 | J | HAMMER | SWORD | Q | J |
| 4 | 13112-16389 | Q | SWORD | RHINOCEROS | K | A |
| 5 | 16390-19667 | RHINOCEROS | WILD | BAT | BAT | BUFFALO |
| 6 | 19668-22945 | A | BUFFALO | FEATURE | A | RHINOCEROS |
| 7 | 22946-26223 | DEER | DEER | A | K | FEATURE |
| 8 | 26224-29501 | SWORD | K | J | HAMMER | K |
| 9 | 29502-32779 | HAMMER | RHINOCEROS | HAMMER | Q | HAMMER |
| 10 | 32780-36057 | A | WILD | A | DEER | Q |
| 11 | 36058-39335 | Q | A | Q | SWORD | BAT |
| 12 | 39336-42613 | SWORD | HAMMER | DEER | FEATURE | K |
| 13 | 42614-45891 | RHINOCEROS | DEER | K | K | DEER |
| 14 | 45892-49169 | K | J | BUFFALO | SWORD | SWORD |
| 15 | 49170-52447 | A | SWORD | Q | DEER | J |
| 16 | 52448-55725 | HAMMER | SWORD | FEATURE | A | WILD |
| 17 | 55726-59003 | J | BAT | A | HAMMER | HAMMER |
| 18 | 59004-62281 | Q | WILD | HAMMER | BUFFALO | SWORD |
| 19 | 62282-65535 | BUFFALO | FEATURE | SWORD | RHINOCEROS | Q |

RANDOM NUMBER RANGE: 0-65535

FIG. 9

BONUS GAME SYMBOL TABLE

| | | FIRST COLUMN(L1) |
|---|---|---|
| CODE NO. | RANDOM NUMBER | SYMBOL |
| 0 | 0-2184 | J |
| 1 | 2185-4369 | Q |
| 2 | 4370-6553 | BAT |
| 3 | 6554-8737 | WILD |
| 4 | 8738-10921 | J |
| 5 | 10922-13105 | Q |
| 6 | 13106-15289 | RHINOCEROS |
| 7 | 15290-17473 | WILD |
| 8 | 17474-19657 | A |
| 9 | 18658-21841 | DEER |
| 10 | 21842-24025 | WILD |
| 11 | 24026-26209 | SWORD |
| 12 | 26210-28393 | HAMMER |
| 13 | 28394-30577 | A |
| 14 | 30578-32761 | WILD |
| 15 | 32762-34945 | Q |
| 16 | 34946-37129 | SWORD |
| 17 | 37130-39313 | WILD |
| 18 | 39314-41497 | RHINOCEROS |
| 19 | 41498-43681 | K |
| 20 | 43682-45865 | A |
| 21 | 45866-48049 | WILD |
| 22 | 48050-50233 | HAMMER |
| 23 | 50234-52417 | J |
| 24 | 52418-54601 | WILD |
| 25 | 54602-56785 | Q |
| 26 | 56786-58969 | WILD |
| 27 | 58970-61153 | WILD |
| 28 | 61154-63337 | BUFFALO |
| 29 | 63338-65535 | WILD |

---

| | | FIFTH COLUMN(L5) |
|---|---|---|
| CODE NO. | RANDOM NUMBER | SYMBOL |
| 0 | 0-2184 | WILD |
| 1 | 2185-4369 | J |
| 2 | 4370-6553 | A |
| 3 | 6554-8737 | WILD |
| 4 | 8738-10921 | WILD |
| 5 | 10922-13105 | BAT |
| 6 | 13106-15289 | J |
| 7 | 15290-17473 | A |
| 8 | 17474-19657 | BUFFALO |
| 9 | 18658-21841 | WILD |
| 10 | 21842-24025 | RHINOCEROS |
| 11 | 24026-26209 | FEATURE |
| 12 | 26210-28393 | K |
| 13 | 28394-30577 | WILD |
| 14 | 30578-32761 | WILD |
| 15 | 32762-34945 | WILD |
| 16 | 34946-37129 | HAMMER |
| 17 | 37130-39313 | Q |
| 18 | 39314-41497 | BAT |
| 19 | 41498-43681 | K |
| 20 | 43682-45865 | WILD |
| 21 | 45866-48049 | DEER |
| 22 | 48050-50233 | SWORD |
| 23 | 50234-52417 | J |
| 24 | 52418-54601 | WILD |
| 25 | 54602-56785 | WILD |
| 26 | 56786-58969 | HAMMER |
| 27 | 58970-61153 | SWORD |
| 28 | 61154-63337 | Q |
| 29 | 63338-65535 | WILD |

RANDOM NUMBER RANGE: 0-65535

FIG. 10

SYMBOL COLUMN DETERMINATION TABLE

| SYMBOL COLUMN NO. | RANDOM NUMBER |
|---|---|
| 1 | 0-13106 |
| 2 | 13107-26214 |
| 3 | 26215-39321 |
| 4 | 39322-52428 |
| 5 | 52429-65535 |

RANDOM NUMBER RANGE:0-65535

FIG. 11

CODE NO.
DETERMINATION TABLE

| | |
|---|---|
| RANDOM NUMBER | CODE NO. |
| 0-3277 | 0 |
| 3278-6555 | 1 |
| 6556-9833 | 2 |
| 9834-13111 | 3 |
| 13112-16389 | 4 |
| 16390-19667 | 5 |
| 19668-22945 | 6 |
| 22946-26223 | 7 |
| 26224-29501 | 8 |
| 29502-32779 | 9 |
| 32780-36057 | 10 |
| 36058-39335 | 11 |
| 39336-42613 | 12 |
| 42614-45891 | 13 |
| 45892-49169 | 14 |
| 49170-52447 | 15 |
| 52448-55725 | 16 |
| 55726-59003 | 17 |
| 59004-62281 | 18 |
| 62282-64281 | 19 |
| 64282-65535 | END |

RANDOM NUMBER RANGE:0-65535

FIG. 12

WILD SYMBOL INCREASE NUMBER DETERMINATION TABLE

| THE NUMBER OF WILD SYMBOLS TO BE ADDED | RANDOM NUMBER |
|---|---|
| 10 | 0-13106 |
| 30 | 13107-26214 |
| 50 | 26215-39321 |
| 70 | 39322-52428 |
| 90 | 52429-65535 |

RANDOM NUMBER RANGE: 0-65535

FIG. 13

TRIGGER SYMBOL INCREASE NUMBER DETERMINATION TABLE

| THE NUMBER OF TRIGGER SYMBOLS TO BE ADDED | RANDOM NUMBER |
|---|---|
| 2 | 0-13106 |
| 4 | 13107-26214 |
| 6 | 26215-39321 |
| 8 | 39322-52428 |
| 10 | 52429-65535 |

RANDOM NUMBER RANGE:0-65535

FIG. 14

PAYOUT TABLE

| SYMBOL | THE NUMBER OF SYMBOLS REARRANGED | | | |
|---|---|---|---|---|
| | TWO | THREE | FOUR | FIVE |
| A | 2 | 4 | 6 | 8 |
| K | 10 | 20 | 30 | 40 |
| Q | 30 | 60 | 90 | 120 |
| J | 3 | 6 | 9 | 12 |
| SWORD | 2 | 4 | 6 | 8 |
| HAMMER | 2 | 4 | 6 | 8 |
| BAT | 5 | 10 | 15 | 20 |
| DEER | 15 | 30 | 45 | 60 |
| RHINOCEROS | 8 | 16 | 24 | 32 |
| BUFFALO | 25 | 50 | 75 | 100 |
| FEATURE | 2 | 4 | 6 | 8 |

FEATURE (FREE GAME): FREE GAME IS RUN WHEN THREE OR MORE OF THE SAME TYPE OF SYMBOLS ARE REARRANGED

FIG. 15

GAMING TERMINAL MANAGEMENT TABLE

| GAMING TERMINAL | TYPE OF GAME | GAME STATUS | ACCUMULATED BET AMOUNT | ACCUMULATED GAME COUNT |
|---|---|---|---|---|
| 001 | REGULAR GAME | RUN | 130 | 35 |
| 002 | REGULAR GAME | STOP | 220 | 60 |
| 003 | REGULAR GAME | RUN | 100 | 21 |
| 004 | BONUS GAME | RUN | 160 | 18 |
| 005 | BONUS GAME | STOP | 210 | 51 |
| 006 | REGULAR GAME | STOP | 560 | 120 |

FIG. 16

COMMON GAME MANAGEMENT TABLE

| GAME TERMINAL | BET AMOUNT | PAYOUT MULTIPLYING FACTOR | SHOOTER |
|---|---|---|---|
| 001 | 10 | 5 | 0 |
| 002 | 10 | 5 | 1 |
| 003 | 10 | 5 | 0 |
| 004 | 20 | 5 | 0 |
| 005 | 20 | 5 | 0 |
| 006 | 10 | 5 | 0 |

GAMING MACHINE AND GAMING METHOD THEREOF, WHICH SIMULTANEOUSLY RUN COMMON GAME IN ALL TERMINALS

CROSS REFERENCE TO RELATED APPLICATION

The present application claims priority from Japanese Patent Application No. 2009-128588, which was filed on May 28$^{th}$, 2009, the disclosure of which is herein incorporated by reference in its entirety.

BACKGROUND OF THE INVENTION

1. Field of the Invention

The present invention relates to a gaming machine which runs a common game such as crap game simultaneously at all of the gaming terminals, and a gaming method thereof.

2. Description of Related Art

As disclosed in U.S. Pat. Nos. 5,564,700, 6,077,162, 6,375,568, 6,312,332, and the like, a known gaming machine includes a plurality of gaming terminals, terminal controllers each provided to a gaming terminal and causes the gaming terminal to run a game, and a center controller which controls the terminal controllers. The gaming machine has functions of: allowing a jackpot to be run as a common game to the gaming terminals in addition to a base game which is runnable individually at each gaming terminal; and distributing a payout of the jackpot to a plurality of players. Accordingly, a known gaming machine possesses an entertainment characteristic which allows a plurality of players to play one common game, in addition to allowing the players to individually play a base game.

Thus, how to run a common game at each gaming terminals has traditionally been an important element of improving the entertainment characteristic.

The object of the present invention is to provide a gaming machine having a function of running a common game capable of realizing a high entertainment characteristic, and a playing method of the gaming machine.

SUMMARY OF THE INVENTION

The present invention provides a gaming machine having the following structure. Specifically, the gaming machine includes: a plurality of gaming terminals each having an input device and a terminal controller, the input device capable of receiving an external input, and the terminal controller programmed to carry out the following steps of (a1) to (a4); and a center controller connected in communication with the gaming terminals, and programmed to carry out the following steps of (b1) to (b5).

Specifically, the terminal controller carries out the steps of:

(a1) running a base game in response to a start operation input through the input device;

(a2) running a crap game in response to a game start command from the center controller;

(a3) determining whether the gaming terminal is designated to be a shooter of the crap game based on a shooter command from the center controller, and in the event that the gaming terminal is designated to be a shooter, receiving a roll operation input through the input device to allow a roll operation command to be outputted to the center controller; and (a4) based on game result information from the center controller, determining a win or loss which causes the crap game to end, and (i) in the event that no win or loss is resulted, running a crap game again, and (ii) in the event that a win is resulted, awarding a payout according to the win.

Specifically, the center controller carries out the steps of:

(b1) determining whether a crap game start condition has been met, based on a running status of the base game at each of the gaming terminals;

(b2) in the event that the crap game start condition has been met, outputting a game start command simultaneously to all of the gaming terminals;

(b3) after the game start command is outputted, selecting a specific gaming terminal from among all of the gaming terminals, and outputting a shooter command to the specific gaming terminal;

(b4) determining a win or loss based on a roll operation command from the specific gaming terminal, and outputting the determination result as game result information to all of the gaming terminals; and (b5) in the event that no win or loss is resulted from the crap game, selecting a specific gaming terminal from among all of the gaming terminals, and outputting a shooter command to the specific gaming terminal.

According to the above structure, the center controller determines whether the crap game start condition has been met, based on a running status of the base game at each of the gaming terminals. In the event that the crap game start condition has been met, a game start command is outputted simultaneously to all of the gaming terminals. Thus, even when the base game is run at individual timing in response to a start operation input through the input device, a crap game is run at all of the gaming terminals simultaneously or substantially simultaneously, in response to a game start command input simultaneously to each of the gaming terminals. As a result, the present invention realizes a high entertainment characteristic which allows players to participate in the crap game from the beginning at all of the gaming terminals. Further, the present invention prevents a player from being behind of a game due to participating in an ongoing crap game, thus preventing an unfair situation from among the players of the gaming terminals caused by a player's belated participation.

Further, each time a crap game is run again, a specific gaming terminal is selected from among all of the gaming terminals, and a shooter command is outputted to the specific gaming terminal. Thus, the shooter of a crap game may be changed each time a crap game is run again. As a result, even when a series of crap games are run for a long period of time, each player may be designated to be the shooter of a crap game. This prevents such a situation where the shooter determined at the beginning of the series of crap games being the only player who directly plays the crap games for a long period of time.

Further, in at least one of the steps of (b3) and (b5), the present invention may randomly select a specific gaming terminal from among all of the gaming terminals.

Accordingly to the above structure, when a shooter is randomly selected, every player may be unexpectedly designated to be a shooter, that is, a main player of the crap game. This enhances each player's interest towards the crap game.

Further, in the step of (b3), the present invention may select a gaming terminal which has met the crap game start condition as a specific gaming terminal.

According to the above structure, a gaming terminal which causes the crap game to start is selected to be the shooter. This enhances each player's interest towards meeting the crap game start condition which causes the crap game to start.

Further, in the step of (a4), the present invention may allow a increase when no win or loss is resulted.

According to the above structure, even when a series of crap games are run without any win or loss resulted, a bet increase is allowed. This maintains and enhances each player's interest towards the crap games.

In the step of (b1), the present invention may set the crap game start condition as achieving a specific winning in the base game.

According to the above structure, achieving a specific winning in the base game means meeting the crap game start condition. This causes each player to be conscious of a crap game each time a base game is run. Thus, each player constantly holds his/her interest towards the crap game.

In the step of (b1), the present invention may set the crap game start condition as an accumulated value reaching a predetermined value, which accumulated value increases in accordance with the repetition of base games.

According to the above structure, the accumulated value reaching the predetermined value is set as the crap game start condition. This causes each player to be aware that a crap game is coming closer, thus makes each player hold his/her interest towards the crap game.

In the present invention, each of the gaming terminals further includes a terminal display device, and in the step of (a2), the gaming terminals may each display a bet table of the crap game on the terminal display device, in response to a game start command from the center controller.

According to the above structure, the bet table is displayed on each of the terminal display devices. This directs each player's attention towards the crap game.

In the present invention, each of the gaming terminal further includes a terminal display device, and in the step of (a5), the terminal controller may cause a movie related to the roll operation to be displayed during a period of time after outputting a roll operation command to the center controller before receiving game result information from the center controller.

According to the above structure, a movie related to the roll operation is displayed after a roll operation is carried out before game result information is received. This directs each player's interest towards the crap game.

In the present invention, a common display is provided to a position where it is noticeable from operating positions of al the gaming terminals, and in the step of (b1), the center controller may display on the common display device a status until the crap game start condition is met.

According to the above structure, a screen is displayed on the common display device, the screen illustrating a status until the crap game start condition is met. This allows each player to anticipate waiting time before the crap game begins.

The present invention is a gaming machine including: a plurality of gaming terminals each having an input device and a terminal controller, the input device capable of receiving an external input, and the terminal controller programmed to carry out the following steps of (c1) to (c4); and a center controller programmed to carry out the following steps of (d1) to (d5).

Specifically, the terminal controller carries out the steps of:

(c1) running a base game in response to a start operation input through the input device;

(c2) running a common game in response to a game start command from the center controller;

(c3) determining whether the gaming terminal is designated to be a shooter based on a shooter command from the center controller, and in the event that the gaming terminal is designated to be a shooter, receiving a roll operation input through the input device to allow a roll operation command to be outputted to the center controller;

(c4) determining, based on game result information from the center controller, a win or loss which causes the common game to end, and (i) in the event that no win or loss is resulted, running a common game again, and (ii) in the event that a win is resulted, awarding a payout according to the win.

Specifically, the center controller carries out the following steps:

(d1) determining whether a common game start condition has been met, based on a running status of the base game at each of the gaming terminals;

(d2) in the event that the common game start condition has been met, outputting the game start command simultaneously to all the gaming terminals;

(d3) after outputting the game start command, selecting a specific gaming terminal from among all the gaming terminals, and outputting a shooter command to the specific gaming terminal;

(d4) determining a win or loss in the common game based on the roll operation command from the specific gaming terminal, and outputting the result as game result information to all the gaming terminals; and (d5) in the event that no win or loss is resulted from the common game, selecting a specific gaming terminal from among all the gaming terminals, and outputting a shooter command to the specific gaming terminal.

According to the above structure, the center controller determines whether the common game start condition has been met, based on the running status of the base game at each of the gaming terminals. When the common game start condition has been met, a game start command is outputted simultaneously to all of the gaming terminals. Thus, even when the base game is run at individual timing in response to a start operation input through the input device, a common game is run at all the gaming terminals simultaneously or substantially simultaneously, in response to a game start command inputted simultaneously or substantially simultaneously to each of the gaming terminals. As a result, the present invention realizes a high entertainment characteristic which allows players to participate in the common game from the beginning at all of the gaming terminals. Further, the present invention prevents a player from being behind of a game due to participating in an ongoing common game, thus preventing an unfair situation among the players of the gaming terminals caused by a player's belated participation.

Further, a specific gaming terminal is selected from among all of the gaming terminals and a shooter command is outputted to the specific gaming terminal, each time a common game is run again. Thus, the shooter of each common game may be changed each time a common game is run. As a result, even when a series of common games are run for a long period of time, each player may be designated to be the shooter of a common game. This prevents such a situation where the shooter determined at the beginning of the series of common games being the only player who directly plays the common games for a long period of time.

The present invention is a gaming method of a gaming machine having a plurality of gaming terminals and a center controller connected in communication with the gaming terminals, the method including: the gaming terminals' each carrying out the steps of: running a base game in response to a start operation received through the input device; running a crap game in response to a game start command from the center controller; determining whether the gaming terminal is designated to be a shooter based on a shooter command from the center controller, and when the gaming terminal is designated to be a shooter, receiving a roll operation through the input device to allow a roll operation command to be outputted to the center controller; determining, based on game result information from the center controller, a win or loss which causes the crap game to end, and when no win or loss is resulted, re-running a crap game, and when a win is resulted, awarding a payout according to the win; and the center controller's carrying out the steps of: determining whether a crap game start condition has been met, based on a running state of the base game at the gaming terminal; when the crap game start condition has been met, outputting the game start command simultaneously to all of the gaming terminals; after outputting the game start command, selecting a specific gaming terminal from among all of the gaming terminals, outputting determining a win or loss in the crap game based on the roll operation command from the specific gaming terminal, and outputting the result of the crap game as the game result information to all of the gaming terminals; and when no win or loss is resulted from the crap game, selecting a specific gaming terminal from among all of the gaming terminals, and outputting a shooter command to the specific gaming terminal.

According to the above structure, the center controller determines whether the crap game start condition has been met, based on the running status of the base game at each gaming terminal. When the crap game start condition has been met, a game start command is outputted simultaneously to all of the gaming terminals. Thus, even when the base game is run at individual timing in response to a start operation input through the input device, a crap game is run at all the gaming terminals simultaneously or substantially simultaneously, in response to a game start command inputted simultaneously or substantially simultaneously to each of the gaming terminals. As a result, the present invention realizes a high entertainment characteristic which allows players to participate in the crap game from the beginning at all of the gaming terminals. Further, the present invention prevents a player from being behind of a game due to participating in an ongoing crap game, thus preventing an unfair situation among the players of the gaming terminals caused by a player's belated participation.

Further, each time a crap game is run again, a specific gaming terminal is selected from among all of the gaming terminals, and a shooter command is outputted to the specific gaming terminal. Thus, the shooter of a crap game may be changed each time a crap game is run again. As a result, even when a series of crap games are run for a long period of time, each player may be designated to be the shooter of a crap game. This prevents such a situation where the shooter determined at the beginning of the series of crap games being the only player who directly plays the crap games for a long period of time.

The present invention provides a gaming machine having the following structure. Specifically, the gaming machine includes: a plurality of gaming terminals each having an input device and a terminal controller, the input device capable of receiving an external input, the terminal controller programmed to carry out the following steps of (e1) to (e4); and a center controller which is connected in communication with the gaming terminals, and which is programmed to carry out the following steps of (f1) to (f4).

Specifically, the terminal controller carries out the steps of:

(e1) running a base game in response to a start operation input through the input device;

(e2) running a crap game in response to a game start command from the center controller;

(e3) placing a bet on the shooter win or loss;

(e4) determining, based on game result information from the center controller, a win or loss in the crap game which causes the crap game to end, and (i) in the event that no win or loss is resulted, running a crap game again, and (ii) in the event that a win is resulted, awarding a payout according to the win, and when a bet has been placed on the shooter winning the crap game, awarding a payout according to the bet.

Specifically, the center controller carries out the steps of:

(f1) determining whether a crap game start condition has been met, based on a running status of the base game at each of the gaming terminals;

(f2) in the event that the crap game start condition has been met, outputting the game start command simultaneously to all of the gaming terminals;

(f3) determining a win or loss in the crap game, and outputting the result of the crap game as the game result information to all of the gaming terminals; and (f4) in the event that no win or loss in the crap game is resulted, running the process (f3) again.

According to the above structure, the center controller determines whether or not the crap game start condition has been met, based on a running status of the base game at each of the gaming terminal. When the crap game start condition has been met, a game start command is outputted simultaneously to all of the gaming terminals. Thus, even when the base game is run at individual timing in response to a start operation input through the input device, a crap game is run at all the gaming terminals simultaneously or substantially simultaneously, in response to a game start command input simultaneously to each of the gaming terminals. As a result, the present invention realizes a high entertainment characteristic which allows players to participate in the crap game from the beginning at all of the gaming terminals. Further, the present invention prevents a player from being behind of a game due to participating in an ongoing crap game, thus preventing an unfair situation among the players of the gaming terminals caused by a player's belated participation.

Further, when the shooter wins, a payout is awarded according to the win, as well as when a bet is placed on the shooter winning the crap game, a payout is awarded according to the bet. Accordingly, a player may be awarded an additional payout, depending on the shooter winning or losing the crap game.

The present invention is able to possess a function of a common game capable of realizing a high entertainment characteristic.

BRIEF DESCRIPTION OF THE DRAWINGS

FIG. 8 is an explanatory diagram of a regular game symbol data table.

FIG. 9 is an explanatory diagram of a bonus game symbol table.

FIG. 10 is an explanatory diagram of a symbol column determination table.

FIG. 11 is an explanatory diagram of a code No. determination table.

FIG. 12 is an explanatory diagram of a wild symbol increase count determination table.

FIG. 13 is an explanatory diagram of a trigger symbol increase count determination table.

FIG. 14 is an explanatory diagram of a payout table.

FIG. 15 is an explanatory diagram of a gaming terminal management table.

FIG. 16 is an explanatory diagram of a common game management table.

DESCRIPTION OF THE PREFERRED EMBODIMENTS (Gaming Machine Overview)

The gaming machine is configured to: connect the gaming terminals in connection with the center controller; run a common game simultaneously at the gaming terminals, be able to change shooters at each unit game.

Specifically, the gaming machine includes: a plurality of gaming terminals each having an input device and a terminal controller, the input device capable of receiving an external input, and the terminal controller programmed to carryout the following steps of (c1) to (c4); and a center controller programmed to carry out the following steps of (d1) to (d5).

Specifically, the terminal controller carries out the steps of:

(c1) running a base game in response to a start operation input through the input device;

(c2) running a common game in response to a game start command from the center controller;

(c3) determining whether the gaming terminal is designated to be a shooter based on a shooter command from the center controller, and in the event that the gaming terminal is designated to be a shooter, receiving a roll operation input through the input device to allow a roll operation command to be outputted to the center controller;

(c4) determining, based on game result information from the center controller, a win or loss which causes the common game to end, and (i) in the event that no win or loss is resulted, running a common game again; and (ii) in the event that a win is resulted, awarding a payout according to the win.

Specifically, the center controller carries out the steps of:

(d1) determining whether a common game start condition has been met, based on a running status of the base game at each of the gaming terminals;

(d2) when the common game start condition has been met, outputting the game start command simultaneously to all the gaming terminals;

(d3) after outputting the game start command, selecting a specific gaming terminal from among all the gaming terminals, and outputting a shooter command to the specific gaming terminal;

(d4) determining a win or loss in the common game based on the roll operation command from the specific gaming terminal, and outputting the result as game result information to all the gaming terminals; and (d5) in the event that no win or loss is resulted from the common game, selecting a specific gaming terminal from among all the gaming terminals, and outputting a shooter command to the specific gaming terminal.

Figure 1:
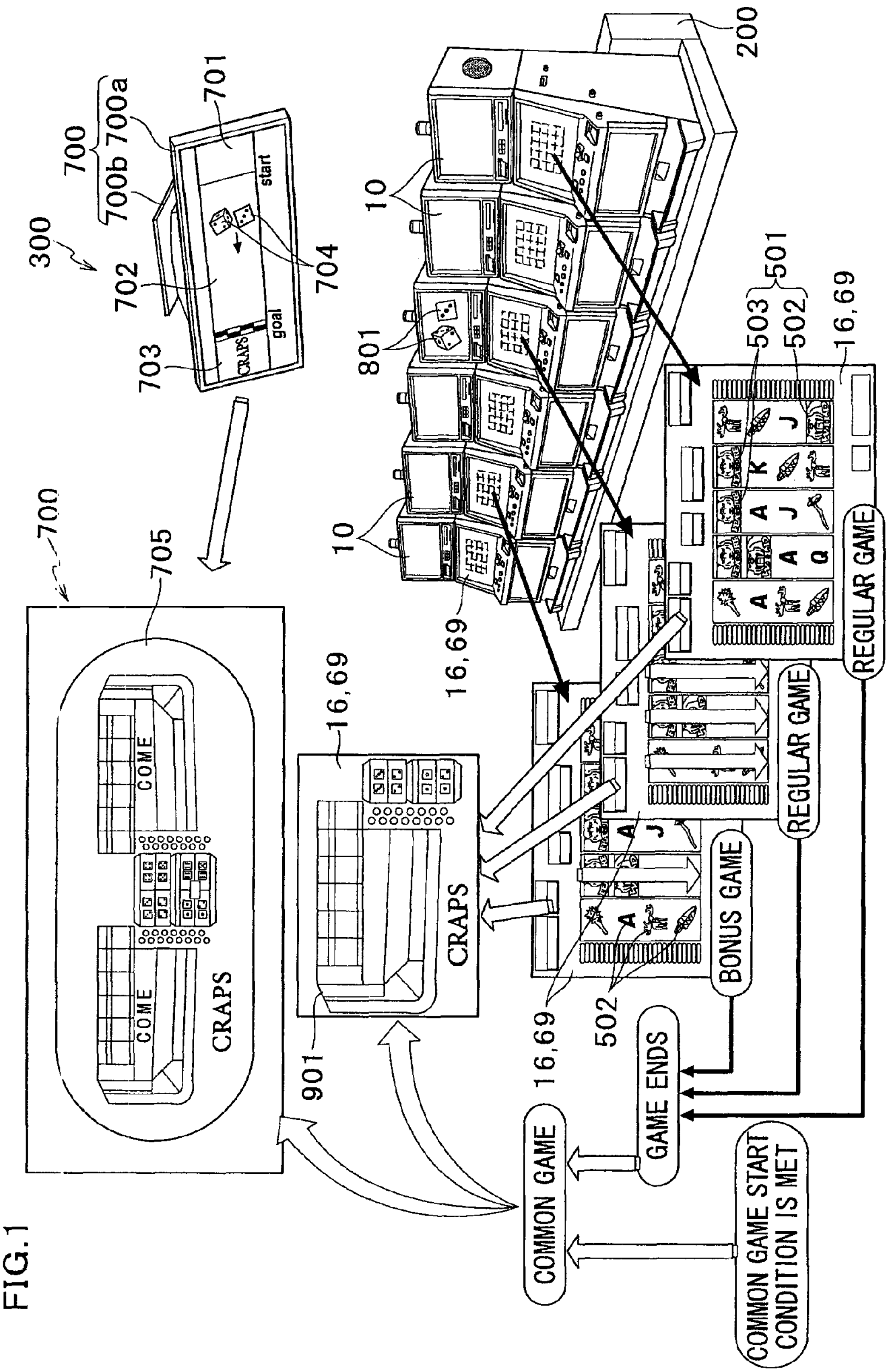
FIG. 1 is an explanatory diagram illustrating a playing method of a gaming machine.
Figure 4:
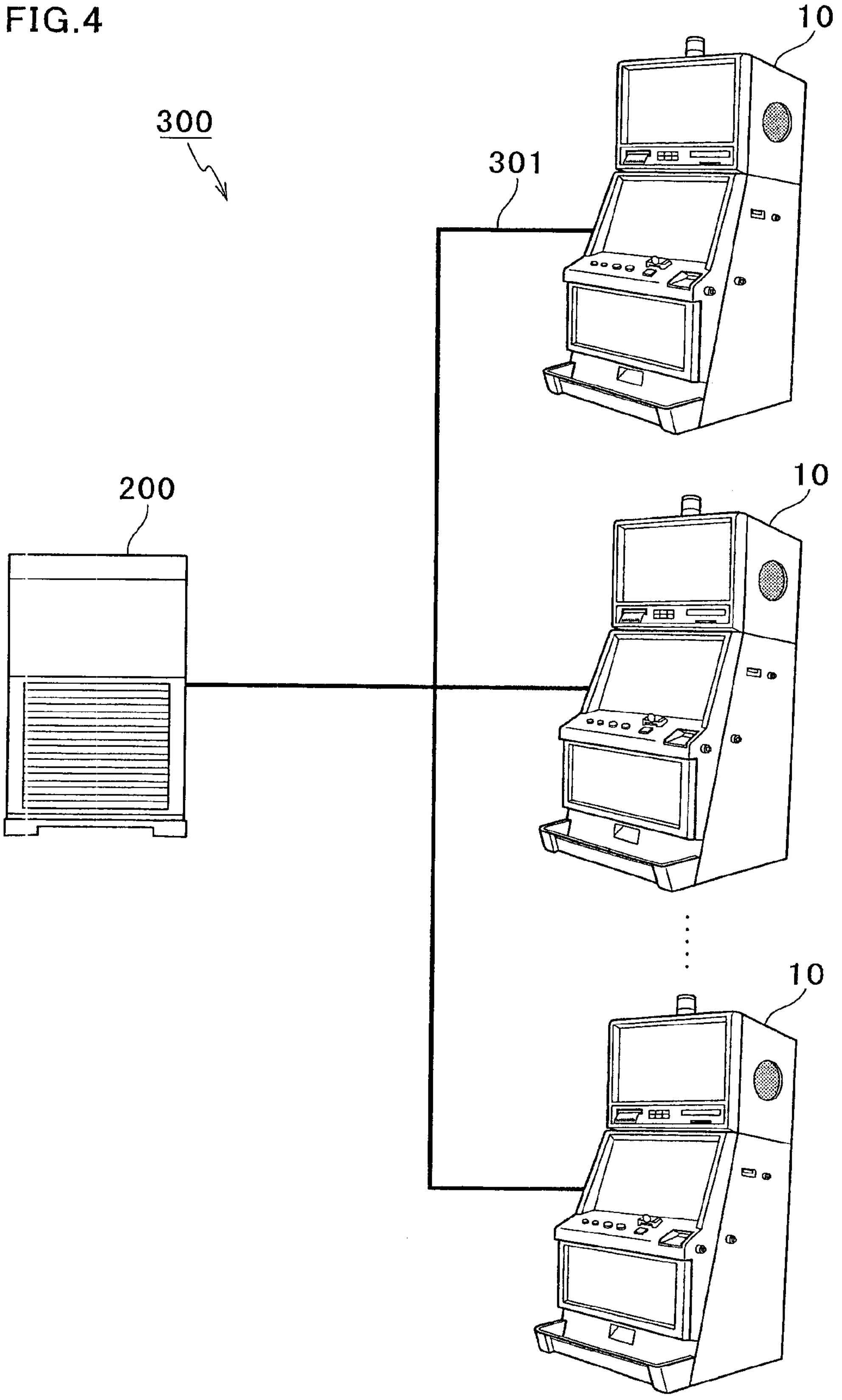
FIG. 4 is a perspective view illustrating an entire gaming machine.

More specifically, as illustrated in FIGS. 1 and 4, a gaming machine 300 has a first structure where the gaming machine 300 is configured as a multiplayer-type gaming machine having: a plurality of slot machines 10 as gaming terminals connected in communication with a center controller 200; running a crap game as a common game simultaneously at the slot machines 10; and an ability to change shooters at each unit game.

In other words, as the first structure, the gaming machine 300 includes: a plurality of slot machines 10 and a center controller 200. The slot machines 10 each have (i) an input device capable of receiving an external input, and (ii) a terminal controller programmed to carry out the following steps of (a1) to (a4). The center controller carries out the following steps of (b1) to (b5). Note that the connection between the slot machines 10 and the center controller 200 may be wireless, wired, or a combination of these.

The specific description of the steps (a1) to (a4) carried out by the terminal controller of each of the slot machines 10 is as follows:

(a1) running a base game in response to a start operation input through the input device;

(a2) running a crap game in response to a game start command from the center controller 200.

Note that the crap game may substitute for the base game, and the base game and the crap game may be run in parallel.

In step (a3), the terminal controller determines whether the gaming terminal is designated to be a role as a shooter of the crap game based on a shooter command from the center controller 200, and when the gaming terminal is designated to be a role as a shooter, the terminal controller receives a roll operation input through the input device to allow a roll operation command to be outputted to the center controller 200. Here, a "shooter" is a player who rolls dice. "Roll operation" refers to an action of rolling the dice.

In step (a4), based on game result information from the center controller 200, the terminal controller determines a win or loss which causes the crap game to end, and (i) in the event that no win or loss is resulted, running a crap game again, and (ii) in the event that a win is resulted, awarding a payout according to the win.

The specific description of the steps (b1) to (b5) carried out by the center controller 200 is as follows:

(b1) determining whether a crap game start condition has been met, based on a running status of the base game at each of the slot machines 10;

(b2) in the event that the crap game start condition has been met, outputting a game start command simultaneously to all of the slot machines 10;

(b3) after the game start command is outputted, selecting a specific slot machine 10 from among all of the slot machines 10, and outputting a shooter command to the specific slot machine 10;

(b4) determining a win or loss based on a roll operation command from the specific slot machine 10, and outputting the determination result as game result information to all of the slot machines 10; and (b5) in the event that no win or loss is resulted from the crap game, selecting a specific slot machine 10 from among all of the slot machines 10, and outputting a shooter command to the specific slot machine 10.

Note that the present embodiment is described using the gaming machine 300 having a central controller 200 aside from the slot machines 10; however, the present invention is not limited to this. In other words, the gaming machine 300 may be configured in such a manner that at least one slot machine 10 has a function of the center controller 200, and the slot machines 10 may be connected in communication with each other.

The "slot machines 10" each are a type of gaming terminal in the gaming machine 300. Note that the present embodiment is described using slot machines 10 as an example of gaming terminals; however, the present invention is not limited to this: The present invention may adopt a model which has a terminal controller capable of independently running some base game.

The "base game" in the present invention is run by the slot machines 10. The base game is a slot game where a plurality of symbols 501 are rearranged. Note that the base game is not limited to slot game: The base game may be any type as long as it is independently runnable at gaming terminals such as slot machines 10.

Rearrangement of the symbols 501 in the slot game is performed on a symbol display device 16. The slot game includes processes of: running a regular game subject to a game value bet, in which regular game the symbols 501 are rearranged on the symbol display device 16, and a regular payout according to the symbols 501 rearranged is awarded; when the symbols 501 are rearranged on a predetermined condition, running a bonus game where the symbols 501 are rearranged under such a condition that a payout rate thereof is greater than that of the regular game, and a bonus payout is awarded according to the symbols 501 rearranged; and when a rescue start condition is met, running a rescue process.

Figure 17:
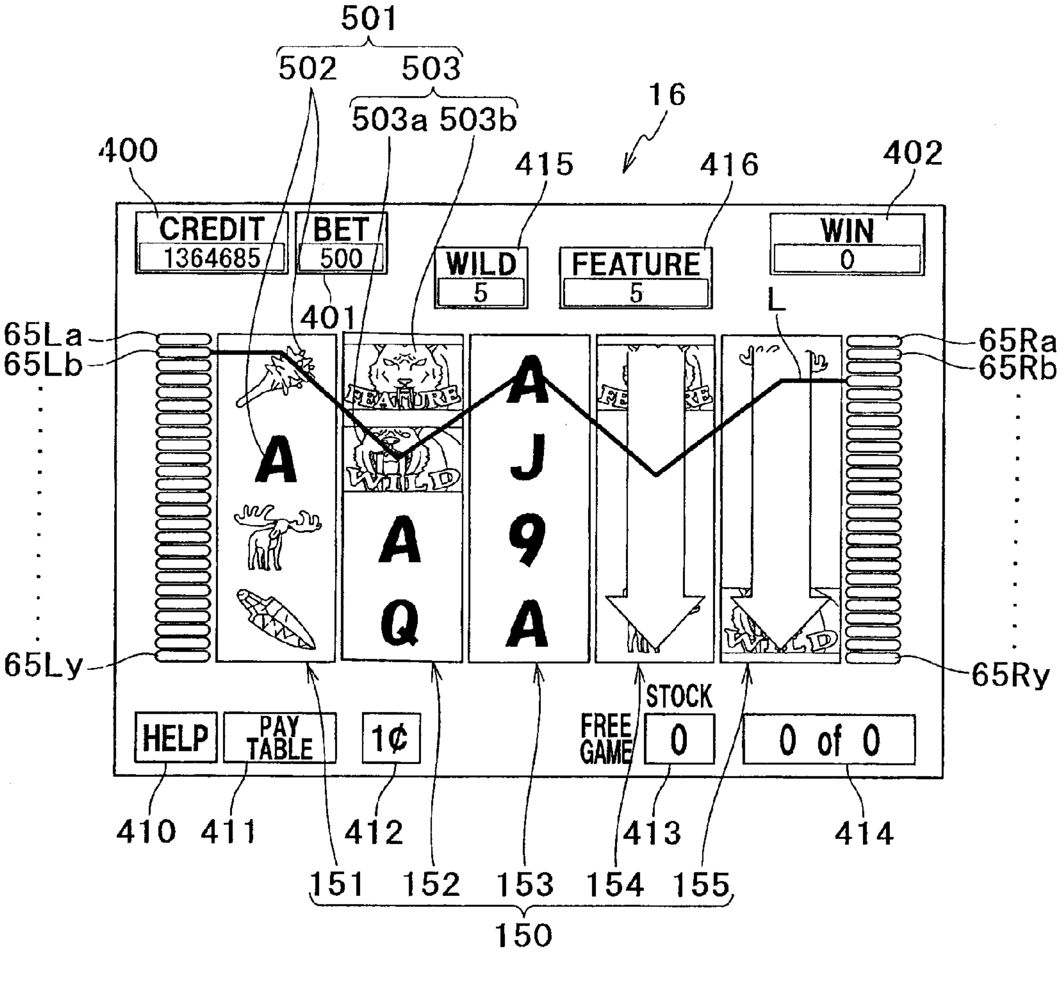
FIG. 17 is an explanatory diagram illustrating a display status of a symbol display device.

The symbols 501 include "specific symbols 503" and "regular symbols 502". That is, the "symbols 501" is a superordinate conception of the specific symbols 503 and regular symbols 502. The Specific symbols 503 include wild symbols 503*a* and trigger symbols 503*b*, as illustrated in FIG. 17. Each of the wild symbols 503*a* is a symbol substitutable for any type of symbols 501. Each of the trigger symbols 503*b* is a symbol serving as a trigger for starting at least a bonus game. That is, a trigger symbol 503*b* triggers transition from the base game to the bonus game, and triggers stepwise increases in the number of specific symbols 503 at an interval from the start of the bonus game. Further, the trigger symbol 503*b* triggers increases in the number of specific symbols 503 in the bonus game, that is, the trigger symbol 503*b* triggers increases in the number of trigger symbols 503*b* and/or wild symbols 503*a*. Note that the trigger symbol 503*b* may trigger an increase in the number of repetitions of game (hereinafter simply referred to as "game repetition count") in the bonus game.

The "game value" is a coin, bill, or electronic valuable information corresponding to these. Note that the game value in the present invention is not particularly limited. Examples of the game value include game media such as medals, tokens, cyber money, tickets, and the like. Further, the ticket is not particularly limited and may be a later-described ticket with a barcode or the like.

The "bonus game" has the same meaning as a "feature game." In the present embodiment, the bonus game is a game in which a free game is repeated. However, the bonus game is not particularly limited and may be any type of game, provided that the bonus game is more advantageous than the regular game for a player. Another bonus game may be adopted in combination, provided that a player is given a more advantageous playing condition than the regular game. For example, the bonus game may be a game that provides a player with a chance of winning more game values than the regular game or a game that provides a player with a higher chance of winning game values than the regular game. Alternatively, the bonus game may be a game that consumes fewer amounts of game values than the regular game. In the bonus game, these games may be provided alone or in combination.

The "free game" is a game runnable with a bet of fewer amounts of game values than the regular game. Note that "bet of fewer amounts of game values" encompasses a bet of zero game value. The "free game" therefore may be a game runnable without a bet of a game value, which free game awards an amount of game values based on symbols 501 rearranged. In other words, the "free game" may be a game which is started without the premise that a game value is consumed. To the contrary, the "regular game" is a game runnable on condition that a game value is bet, which regular game awards an amount of game media based on symbols 501 rearranged. In other words, the "regular game" is a game which starts on the premise that a game value is consumed.

The expression "rearrange" means dismissing an arrangement of symbols 501, and arranging symbols 501 once again. "Arrangement" in this specification means a state where the symbols 501 can be visibly confirmed by a player.

The "regular payout according to rearranged symbols 501" means a regular payout corresponding to a winning combination achieved as a result of the rearrangement. In addition, the "bonus payout according to rearranged symbols 501" means a bonus payout corresponding to a winning combination achieved as a result of the rearrangement. When a "winning combination" has been formed, a winning is achieved. The winning combination is detailed later.

The "condition that a payout percentage is higher than that of the base game" is, for example, a free game, a state where the number of wild symbols 503*a* or trigger symbols 503*b* has increased, or a game using a replaced symbol table. The "rescue start condition" is, for example, the extremely large number of repetitions of base game, that is, a state where the number of repetitions of the base game is a predetermined number or more. Alternatively, it is, for example, an extremely small total amount of payout obtained, that is, a case where a total amount of payouts (base payouts or bonus payouts), which has been obtained by one player as a result of repeating a game a predetermined number of times or more, is equal to or less than a predetermined value. The "rescue process" is a process for rescuing a player. Examples of the rescue process include: running a free game, providing a state where the number of wild symbols 503*a* or trigger symbols 503*b* is increased, running a game using a replaced symbol table, or awarding an insurance payout.

The gaming machine 300 having the first structure as described above realizes a gaming method where the gaming machine 300 runs a common game such as crap game simultaneously at all the slot machines 10 each serving as a gaming terminal. In other words, the gaming machine 300 is functional at least by a control method to run the common game simultaneously at all the gaming terminals.

Specifically, the gaming method and the control method of the gaming machine 300 is carried out by the gaming machine having slot machines 10 each serving as a gaming terminal, and the center controller 200 connected in communication with each of the slot machines 10.

The slot machine 10 carries out the steps of: running a base game in response to a start operation input through the input device; running a crap game in response to a game start command from the center controller 200; determining, based on a shooter command from the center controller 200, whether the slot machine 10 is designated to be a shooter of the crap game, and in the event that the slot machine 10 is designated to be a shooter, receiving a roll operation input through the input device to allow a roll operation command to be outputted to the center controller 200; and based on game result information from the center controller 200, determining a win or loss which causes the crap game to end, and (i) in the event that no win or loss is resulted, running a crap game again, and (ii) in the event that a win is resulted, awarding a payout according to the win.

The center controller 200 carries out the steps of: determining whether a crap game start condition has been met, based on a running status of the base game at each of the slot machines 10; when the crap game start condition has been met, outputting the game start command simultaneously to all of the slot machines 10; after outputting a game start command, selecting a specific slot machine 10 from among all the slot machines 10, and outputting a shooter command to the specific slot machine 10; determining a win or loss of the crap game based on a roll operation command from the specific slot machine 10, and outputting the result as game result information to all of the slot machines 10; and in the event that no win or loss is resulted from the crap game, selecting a specific slot machine 10 from all of the slot machines 10, and outputting a shooter command to the specific slot machine 10.

According to the gaming machine 300 having the first structure and the gaming method and control method having the above steps, the center controller 200 determines whether the crap game start condition has been met, based on the running status of the base game at each of the slot machines 10. When it is determined that the crap game start condition has been met, a game start command is outputted simultaneously to all of the slot machines 10. Thus, even when the base game is run at individual timing in response to a start operation input through the input device, a crap game is run at all the slot machines 10 simultaneously or substantially simultaneously, in response to a game start command inputted simultaneously to each of the slot machines 10. As a result, the gaming machine 300 realizes a high entertainment characteristic which allows players to participate in the crap game from the beginning at all of the slot machines 10. Further, the gaming machine 300 prevents a player from being behind of a game due to participating in an ongoing crap game, thus preventing an unfair situation among the players of the slot machines 10 caused by a player's belated participation.

Further, each time a crap game is run again, a specific slot machine 10 is selected from among all of the slot machines 10, and a shooter command is outputted to the specific slot machine 10. Thus, shooters may be changed each time a crap game is run again. As a result, even when a series of crap games are run for a long period of time, each player may be designated to be a shooter of a crap game. This prevents such a situation where the shooter determined at the beginning of the series of crap games being the only player who directly plays the crap games for a long period of time.

Further, in addition to the first structure, the gaming machine may have a second structure where in at least one of the steps of (b3) and (b5), the gaming machine 300 randomly selects a specific slot machine 10 from among all of the slot machines 10. According to the gaming machine 300 having the second structure, when the shooter is randomly selected, every player may be unexpectedly designated to be the shooter, that is, a main player of the crap game. This enhances each player's interest towards the crap game.

Further, in addition to the first and second structures, the gaming machine 300 may have a third structure where in the step of (b3), the gaming machine 300 selects a slot machine 30 having met the crap game start condition as a specific slot machine 10. According to the gaming machine 300 having the third structure, the slot machine 10 which causes the crap game to start is selected to be the shooter. This enhances each player's interest towards meeting the crap game start condition which causes the crap game to start.

Further, in addition to any one of the first to third structures, the gaming machine 300 may have a fourth structure where in the step of (a4), when no win or loss is resulted, the gaming machine 300 allows a bet increase. According to the gaming machine 300 having the fourth structure, even when a series of crap games are run without any win or loss resulted, the bet is allowed a bet increase. This maintains and enhances each player's interest towards the crap game.

Further, in addition to any one of the first to fourth structures, the gaming machine 300 may have a fifth structure where in the step of (b1), the gaming machine 300 sets the crap game start condition as achieving a specific winning in the base game. According to the gaming machine 300 having the fifth structure, achieving a specific winning in the base game means meeting the crap game start condition. This causes each player to be conscious of a crap game each time a base game is run. Thus, each player constantly holds his/her interest towards the crap game.

Further, in addition to any one of the first to fifth structures, the gaming machine 300 may include a sixth structure where in the step of (b1), the gaming machine 300 sets the crap game start condition as an accumulated value reaching a predetermined value, which accumulated value increases in accordance with the repetition of base games. Here, the "accumulated value" is a countable value such as the number of base games and a bet amount. According to the gaming machine 300 having the sixth structure, the accumulated value reaching the predetermined value means meeting the crap game start condition. This causes each player to be aware that a crap game is coming closer, thus makes each player hold his/her interest towards the crap game.

Further, in addition to any one of the first to sixth structures, the gaming machine 300 may have a seventh structure where: the slot machines 10 each further include a symbol display device 16 serving as a terminal display device; and in the step of (a2), the slot machines 10 each display a bet table 901 on the symbol display device 16 in response to a game start command from the center controller 200. According to the above structure, the bet table 901 is displayed on the symbol display device 16 of each of the slot machines 10. This directs each player's attention towards the crap game.

Further, in addition to any one of the first to seventh structures, the gaming machine 300 may have an eighth structure where: the slot machines 10 each further includes a symbol display device 16 serving as a terminal display device; and in the step of (a5), the slot machines 10 each carry out a process of displaying a movie related to the roll operation during a period of time after outputting a roll operation command to the center controller before receiving game result information from the center controller 200. The example of "a movie related to the roll operation" shown in FIG. 1 is a movie illustrating die images 801 rolling. According to the gaming machine 300 having the eighth structure, the movie related to the roll operation is displayed after a roll operation has been carried out before game result information is received. This directs each player's interest towards the crap game.

Further, in addition to any one of the first to eighth structures, the gaming machine 300 may include a common display device 700 provided to a position where the common display device 700 is noticeable from operating positions of all the slot machines 10, and in the step of (b1), the gaming machine 300 may display on the common display device 700 a status until the crap game start condition is met. Note that the "operating position" is the eye level of a player who operates the slot machine 10. According to the gaming machine 300 having the eighth structure, the common display 700 displays thereon a screen illustrating a status until the crap game start condition is met. This allows each player to anticipate waiting time before the crap game begins.

(Functional Block of Gaming Machine 300)

Figure 2:
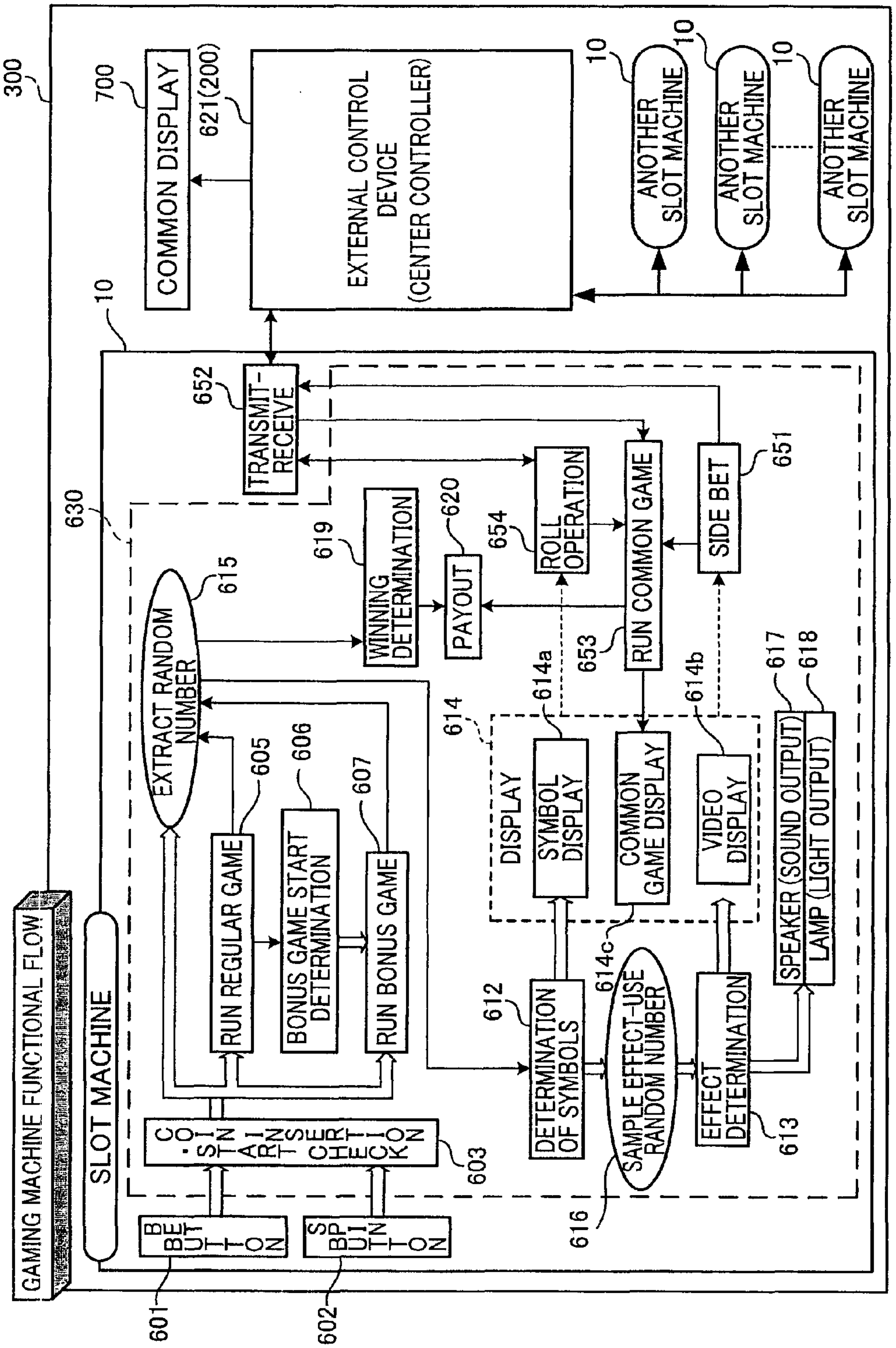
FIG. 2 is a block diagram of the gaming machine.

As illustrated in FIG. 2, the gaming machine 300 structured as described above includes: slot machines 10, and an external control device 621 (center controller 200) data-communicably connected to the slot machines 10. The external control device 621 is data-communicably connected to the slot machines 10 installed in a hall. The external control device 621 is for remotely controlling and remotely monitoring an operating condition of each slot machine 10 or a process of changing various set values of a game, for example. Further, the external control device 621 is for running a crap game as a common game simultaneously at all the slot machine 10, and for allowing shooters to be changed at each unit game.

Each slot machine 10 includes a bet button unit 601, a spin button unit 602, a display unit 614, and a game controller 630 which controls these units. Note that the bet button unit 601 and the spin button unit 602 each are a kind of an input device. Further, the slot machine 10 includes a send-receive unit 652 which enables data communication with the external control device 621.

The bet button unit 601 has a function of accepting a player's operation for entering a bet amount. The spin button unit 602 has a function of receiving a start of a game such as base game through a player's operation; i.e., start operation. The display unit 614 has a function of displaying still image information such as various types of symbols 501 and numeral values, and moving-image information such as an effect movie. Further, the display unit 614 includes a touch panel as an input device, and has a function of receiving various commands inputted by player's press operations. The display unit 614 has a symbol display region 614*a*, a video display region 614*b*, and a common game display region 614*c*. The symbol display region 614*a* displays symbols 501, as illustrated in FIG. 1. The video display region 614*b* displays various effect movie information to be displayed during a game, in the form of a moving image or a still image. The common game display region 614*c* displays therein a common game such as crap game. Note that the common game display region 614*c* may be formed with the symbol display region 614*a* and a video display region 614*b*. The game display region 614*c* may appear only when the common game is run, in replacement of the symbol display region 614*a* or the image display area 614*b*.

The game controller 630 includes: a coin insertion/start-check unit 603; a regular game running unit 605; a bonus game start determination unit 606; a bonus game running unit 607; a random number sampling unit 615; a symbol determining unit 612; an effect-use random number sampling unit 616; an effect determining unit 613; a speaker unit 617; a lamp unit 618; a winning determination unit 619; and a payout unit 620.

The base game running unit 605 has a function of running a regular game on condition that the bet button unit 601 is operated. The bonus game start determination unit 606 determines whether to run a bonus game, based on a combination of rearranged symbols 501 resulted from the regular game. In other words, the bonus game start determination unit 606 has functions of: (i) determining that the player is entitled to a bonus game when one or more trigger symbols 503*b* rearranged satisfy a predetermined condition; and (b) activating the bonus game running unit 607 so as to run a bonus game from the subsequent unit game.

Note that a unit game includes a series of operations performed within a period between a start of receiving a bet to a point where a winning may be resulted. For example, bet reception, rearrangement of symbols 501 having been stopped, and a payout process to award a payout are performed once each within a single unit game of the base game.

The bonus game running unit 607 has a function of running a bonus game which repeats free games for the number of times equal to the number of games, merely in response to an operation on the spin button unit 602.

The symbol determining unit 612 has functions of: determining symbols 501 to be rearranged with a random number given from the random number sampling unit 612; rearranging the determined symbols 501 on the symbol display region 614*a* of the display unit 614, outputting information on rearrangement the rearranged symbols 501 to the winning determination unit 619; based on symbol-increase information from a specific symbol increase unit, adding the increased specific symbols 503 as part of symbols 501 used for symbol determination; replacing part of or the entire symbols 501 used for symbol determination with part of or the entire specific symbols 503; outputting an effect designation signal to the effect-use random number sampling unit 616, based on the rearrangement of the symbols 501.

The effect-use random number sampling unit 616 has functions of: when receiving the effect instruction signal from the symbol determining unit 612, sampling an effect-use random number; and outputting the effect-use random number to the effect determining unit. The effect determining unit has functions of: determining an effect by using the effect-use random number; outputting video information on the determined effect on the video display region 614*b* of the display unit 614; outputting audio and illumination information on the determined effect to the speaker unit 617 and the lamp unit 618, respectively.

The winning determination unit 619 has functions of: determining whether a winning is achieved when information on symbols 501 rearranged and displayed on the display unit 614 is given; a function of calculating an amount of payout based on a winning combination formed when it is determined that a winning has been achieved; outputting to the payout unit 620 a payout signal which is based on the amount of payout.

Further, the game controller 630 includes a common game running unit 653, a roll operation unit 654, and a side bet unit 651. The roll operation unit 654 and the side bet unit 651 each have a function associated with a process of the common game running unit 653. Specifically, the roll control panel 654 has a function of receiving a roll operation inputted through the touch panel of the display unit 614. The side bet unit 651 has a function of allowing a bet increase inputted through the touch panel of the display unit 614 when no win or loss is resulted from the common game.

The common game running unit 653 has functions of: running a common game such as crap game in response to a game start command from the external control device 621; determining, based on a shooter command from the external control device 621, whether the slot machine 10 is designated to be a shooter of the common game; in the event that the slot machine 10 is designated to be a shooter, allowing a roll operation command to be outputted to the external control device 621 in response to a roll operation input through the input device; determining a win or loss in the common game, based on game result information from the external control device 62; in the event that no win or loss is resulted, running a common game again; in the event that a win is resulted from the common game, awarding a payout according to the win; in the event that no win or loss is resulted, allowing a bet increase; displaying a movie related to a roll operation during a period after outputting a roll operation command to the external control device 621 before receiving game result information from the external control device 621.

The slot machines 10 structured as described above are connected to the external control device 621. The external control device 621 has functions of: determining whether a common game start condition has been met, based on a running status of the base game at each of the slot machines 10; when the common game start condition has been met, outputting a game start command simultaneously to all the slot machines 10; after outputting a game start command, selecting a specific slot machine from among all the slot machines 10 and outputting a shooter command to the specific slot machine 10; determining a win or loss in the common game based on a roll operation command from the specific slot machine 10, and outputting the result as game result information to all the slot machines 10; and in the event that no win or loss is resulted from the common game, selecting a specific slot machine 10 from among all the slot machines 10, and outputting a shooter command to the specific slot machine 10.

Further, the external control device 621 has functions of: randomly selecting a specific slot machine 10 from among all the slot machine 10; selecting a slot machine 10 having satisfied the crap game start condition as a specific slot machine 10; setting achieving a specific winning in the base game as the crap game start condition; setting an accumulated value reaching a predetermined value as the crap game start condition, the accumulated value which increases in accordance with the repetition of base games.

(Operation of Gaming Machine 300)

Figure 3:
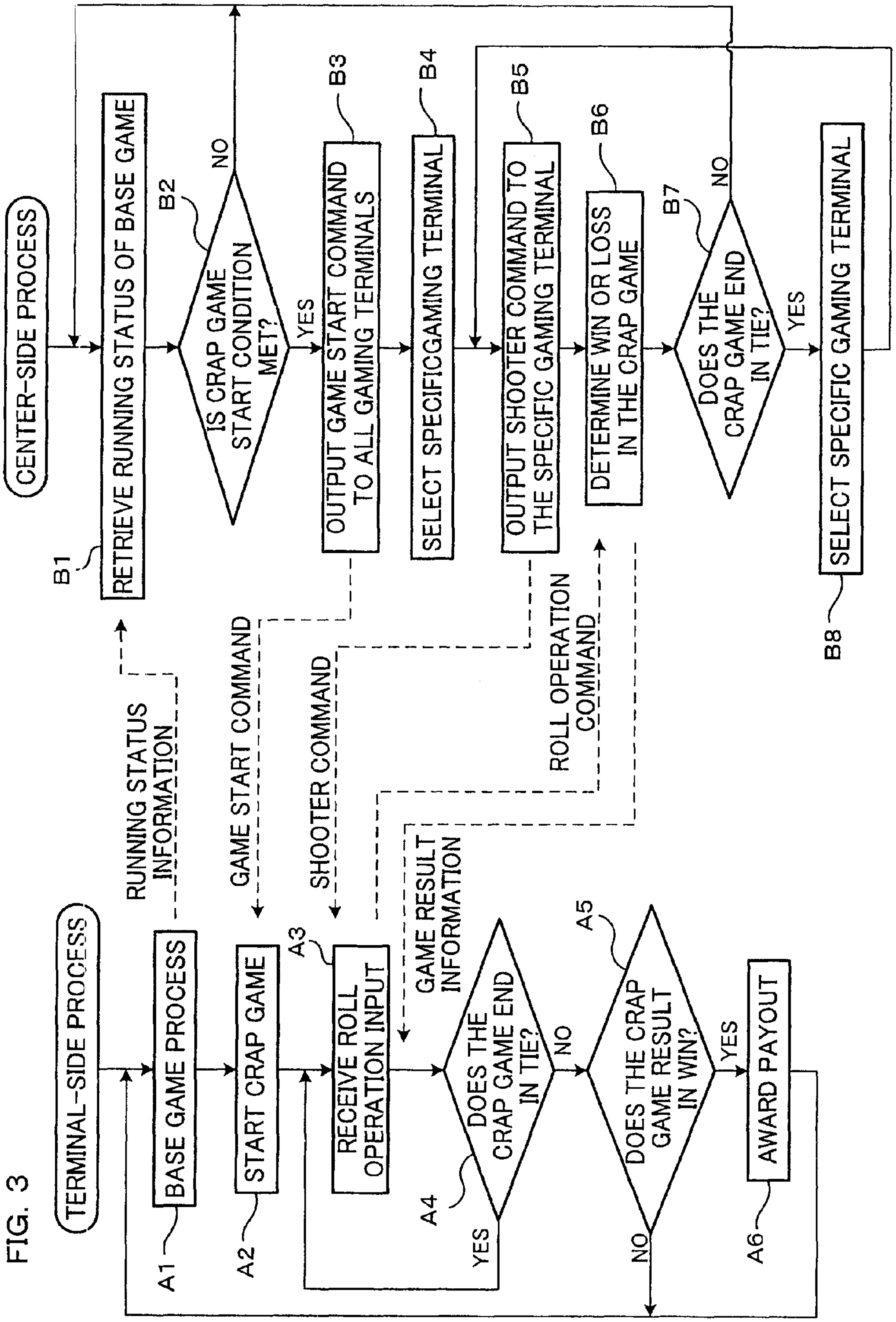
FIG. 3 is a flowchart illustrating the playing method of the gaming machine.

With reference to a flowchart of FIG. 3, the following describes an operation of the gaming machine 300 having the above described functional blocks. Note that in the present invention, the "gaming terminal" in the flow chart refers to a slot machine 10 which runs a lost game. The "gaming terminal"; however, is not limited to this.

(Operation of Slot Machine 10)

The slot machine 10 serving as a gaming terminal carries out terminal-side processes (A1) to (A6). Specifically, a base game process (regular game and the like) is run first (A1). A series of operations described below are carried out.

(Coin Insertion/Start-Checking)

First, the gaming machine 300 checks if the bet button unit 601 is pressed by a player, and if the spin button unit 602 is subsequently pressed by the player.

(Symbol Determination)

Next, when the player presses the spin button unit 602, the slot machine 10 samples a random number for symbol determination. Then, for each of video reels displayed on the display unit 614, the slot machine 10 determines symbols 501 to be presented to the player when scrolling of symbol columns is stopped.

(Symbol Display)

Next, the slot machine 10 starts scrolling a symbol column of each video reel, and stops the scroll so that the symbols 501 determined are presented to the player.

(Winning Determination)

Next, when the symbol column of each video reel stops scrolling, the slot machine 10 determines whether a combination of the symbols 501 presented to the player causes a winning.

(Payout)

Next, when a combination of the symbols 501 presented to the player causes a winning, the slot machine 10 awards a player a profit according to the combination of the symbols 501.

For instance, when a combination of symbols 501 which causes a payout of a coin, the slot machine 10 pays out the number of coins according to the combination of symbols 501.

Next, whether a bonus combination is formed is determined. When it is determined that a bonus combination is formed, a bonus game process is run. Meanwhile, when no bonus combination is formed, a regular game is run again. Running status information is transmitted to the external control device 621 during a period of time where such a regular game and a bonus game is being run, the running status information indicating a start and an end of a regular game and the bet amount on a unit game. This allows the external control device 621 to perform centralized control of each slot machine 10.

The slot machine 10 starts and runs a crap game in response to a game start signal from the external control device 621 (A2). Thus, as illustrated in FIG. 1, an screen display illustrating a base game is switched to a screen display illustrating the bet table 901. Then, a movie or an image which suggests the player to the crap game is displayed.

Next, the slot machine 10 receives a shooter command from the external control device 621, and determines whether the slot machine 10 is designated to be a shooter based on the shooter command. In other words, when the shooter command is attended to the slot machine 10, the slot machine 10 receives a roll operation input (A3). Thus, the slot machine 10 receives a roll operation input through the input device such as a touch panel to make a roll operation command inputtable to the external control device 621. When the player performs a roll operation, the slot machine 10 designated to be the shooter transmits a roll operation command to the external control device 621. Note that when the shooter command is not attended to the slot machine 10, the slot machine 10 determines that it is not designated to be a shooter, thus keeps displaying a movie illustrating the crap game.

Next, the slot machine 10 determines, based on game result information from the external control device 621, a win or loss which causes the crap game to end, and (i) in the event that no win or loss is resulted, running a crap game again, and (ii) in the event that a win is resulted, awarding a payout according to the win.

Specifically, the slot machine 10 determines whether the crap game ends in a tie (A4). In the event that the crap game ends in a tie, that is, when no win or loss is resulted (A4, YES), the crap game is continued and process is carried out, such process as determination of if the slot machine 10 is designated to be the shooter, or display of a movie illustrating the crap game.

Meanwhile, in the event that the cap game does not end in a tie, that is, in the event that a win or loss is resulted (A4, NO), it is determined whether the slot machine 10 has won the crap game (A5). In the event that it is determined that the slot machine 10 has lost the crap game (A5, NO), the base game of process A1 is run again. Meanwhile, in the event that it is determined that the slot machine 10 has won the crap game (A5, YES), a payout is awarded (A6) before the base game of process A1 is run again.

(Operation of External Control Device 621)

The external control device 621 runs the following center-side processes of B1 to B8 in synchronization with the slot machines 10, while the slot machines 10 are being in operation as described above.

First, the external control device 621 receives running state information from each of the slot machines 10 to retrieve a running status of the base game at each slot machine 10 (B1). Then, the external control device 621 determines whether the crap game start condition has been met, based on the running status of the base game at each slot machine 10 (B2). In the event that it is determined that the crap game start condition has not been met (B2, NO), re-running the process of B1 to retrieve the running status of the base game at each slot machine 10.

Meanwhile, in the event that it is determined that the crap game start condition has been met (B2, YES), a game start command is output simultaneously to all the slot machines 10 (B3). A specific slot machine 10 is selected from among all the slot machines 10 thereafter (B4). A shooter command is outputted to the specific slot machine 10 (B5).

Next, the external control device 621 waits until it receives a roll operation command sent from the specific slot machine 10. When the roll operation command is received, a determination of a win or loss in the crap game is made in response thereto. In other words, a determination is made on whether each of the slot machines 10 wins or loses the crap game, or the crap game ends in a tie. The determination result is transmitted as game result information to all the slot machines 10 (B6).

A determination is made thereafter on whether the crap game ends in a tie (B7). In the event that the crap game does not end in a tie (B7, NO), the process of B1 is re-run to newly retrieve a running status of the base game at each slot machine 10. On the other hand, in the event that the crap game ends in a tie (B7, YES), a specific slot machine 10 is selected (B8). Then, the process of B5 is run, to transmit a shooter command to the specific slot machine 10, and the processes of B5 to B8 are repeated until a win or loss is resulted from the crap game.

As described above, the gaming machine 300 includes the slot machines 10 and the external control device 621, each of which slot machines 10 carries out the terminal-side processes (A1) to (A6), and the external control device 621 carries out the center-side processes of (B1) to (B8). Thus, in the gaming machine 300, a crap game in run at all the slot machines 10 simultaneously or substantially simultaneously even when the base game is run at individual timing at each slot machine 10, in response to a game start command input simultaneously to each slot machine 10. As a result, the gaming machine 300 realizes a high entertainment characteristic which allows players to participate in the crap game from the beginning at all the slot machines 10. Further, the gaming machine 300 prevents a player from being behind of a game due to participating in an ongoing crap game, thus preventing an unfair situation among the players of the slot machine 10 caused by a player's belated participation.

Further, a specific slot machine 10 is selected from among all the slot machines 10 and a shooter command is outputted to the specific slot machine 10, each time a crap game is run again. Thus, shooters may be changed each time a crap game is run again. As a result, each player may be designated to be a shooter of a crap game, even when a series of crap games are run for a long period of time. Thus, the gaming machine 300 is capable of preventing such a situation where the shooter determined at the beginning of the series of crap games being the only player who directly plays the crap games for a long period of time.

(Mechanical Structure of Slot Machine 10)

Figure 5:
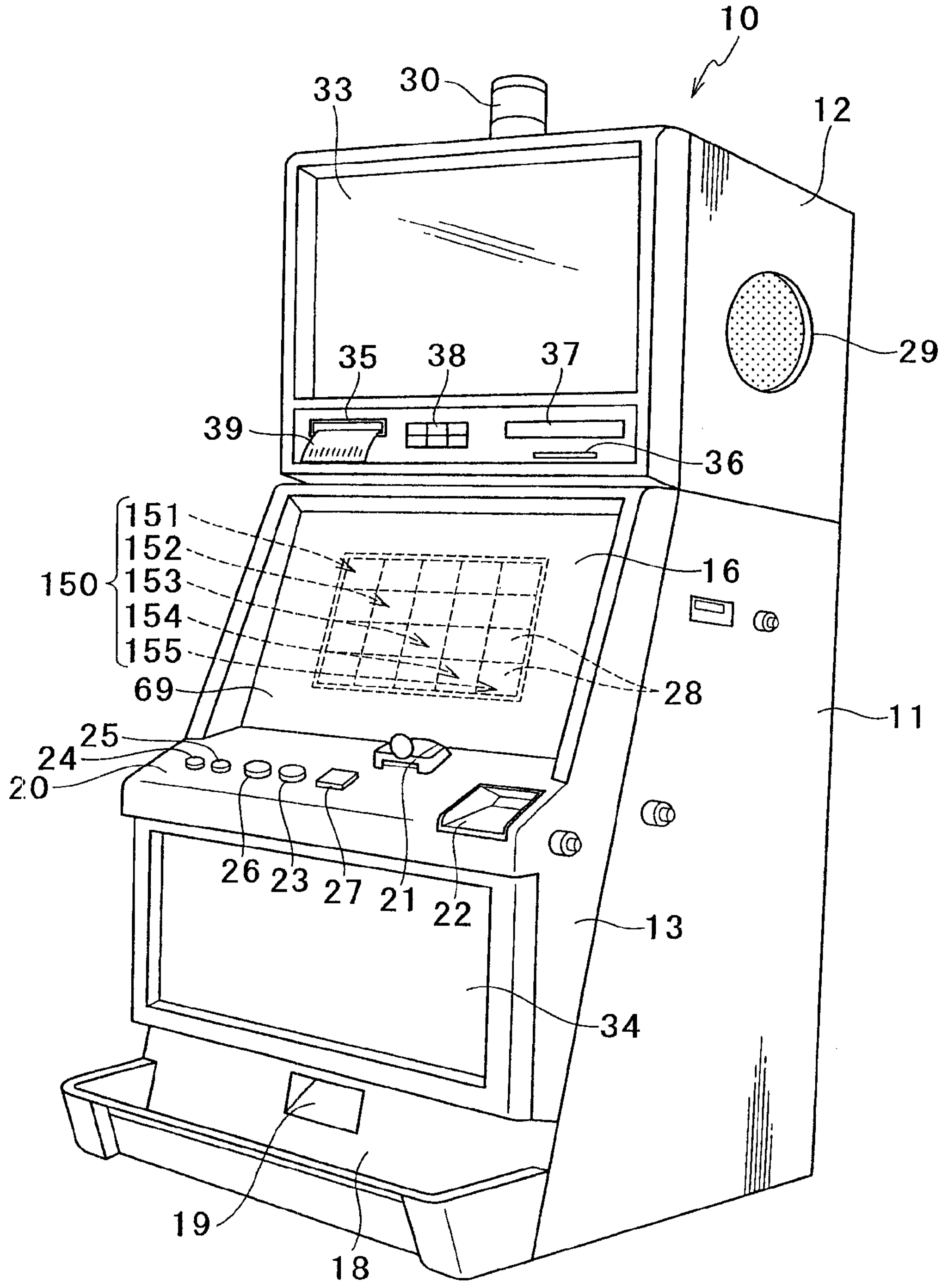
FIG. 5 is a perspective view of a slot machine in the gaming machine.

As illustrated in FIG. 5, the slot machine 10 runs a unit game with a game value spent. The slot machine 10 includes: a cabinet 11, a top box 12 provided above the cabinet 11, and a main door 13 provided on the front face of the cabinet 11.

The main door 13 has the symbol display device 16 which is also referred to as lower image display panel. The symbol display device 16 is made of a transparent liquid crystal panel. The symbol display device 16 is capable of switching between a slot game screen and a later-described crap game screen. The slot game screen has a display window 150 at its center portion. The display window 150 includes twenty display blocks 28 which are arranged in five columns and four rows. The columns form simulated reels 151 to 155, each having four display blocks 28. The four display blocks 28 in each of the simulated reels 151 to 155 are displayed as if all the display blocks 28 are moving downward at various speeds. This enables rearrangement; in a manner that symbols 501 respectively displayed in the display blocks 28 are rotated in a longitudinal direction and stopped thereafter.

On the left and right sides of the display window 150, symmetrically-arranged payline occurrence columns are respectively disposed. As illustrated in FIG. 17, a payline occurrence column on the left when viewed from the player includes 25 payline occurrence parts 65L (65La to 65Ly).

On the other hand, a payline occurrence column on the right includes 25 payline occurrence parts 65R (65Ra to 65Ry).

Each payline occurrence part 65L is paired with one of the payline occurrence parts 65R. Paylines L are prescribed, each extending from one of the payline occurrence parts 65L to one of the payline occurrence parts 65R which are paired with each other. Although there are 25 paylines L, FIG. 17 only shows one payline L for the sake of easier understanding.

Each payline L is activated when the payline L connects a pair of payline occurrence parts 65L and 65R. The payline L is inactive otherwise. The number of active paylines L is determined based on a bet amount. When the bet amount is the maximum value, the maximum number of paylines L; i.e., 25 paylines L are activated. Various winning combinations of symbols 501 are formed along activated paylines L. The winning combination is detailed later.

The present embodiment deals with a case where the slot machine 10 is a video slot machine. However, the slot machine 10 of the present invention may partially adopt a mechanical reel in place of the simulated reels 151 to 155.

Further, a not-illustrated touch panel 69 is disposed on a front face of the symbol display device 16, and a player is able to input various instructions by operating the touch panel 69. From the touch panel 69, an input signal is transmitted to the main CPU 41.

Below the lower image panel 16 are control panel 20, a coin receiving port 21, and a bill validator 22. The control panel 20 includes plural buttons 23 to 27 by which a player is able to input an instruction related to progression of a game. The coin receiving port 21 receives a coin and takes it into the cabinet 11.

The control panel 20 has: a start button 23, a change button 24, a cash-out button 25, a 1-bet button 26, and a maximum bet button 27. The start button 23 is for inputting an instruction to start scrolling symbols. The change button 24 is used when requesting a gaming facility staff member to exchange money. The cash-out button 25 is for inputting an instruction to pay out credited coins to a coin tray 18.

The 1-bet button 26 is for inputting an instruction to bet a single coin out of the credited coins. The maximum bet button 27 is for inputting an instruction to bet the maximum number of coins bettable on one game (500 coins in this embodiment), out of the credited coins.

The bill validator 22 is for validating the legitimacy of a bill input, and takes into the cabinet 11 a bill recognized as legitimate. The bill identifier 22 may be also capable of reading a barcode on a later-mentioned barcoded ticket 39. On the lower front surface of the main door 13, that is, below the control panel 20, there is provided a belly glass 34 with a character or the like of the slot machine 10 being drawn thereon.

On the front face of top box 12 is provided an upper image display panel 33. The upper image display panel 33 has a liquid crystal panel, and displays thereon an image which provides introduction to the game, the rules of the game, and the like.

Further, the top box 12 is provided with speakers 29. Below the upper image display panel 33 are provided a ticket printer 35, a card reader 36, a data displayer 37, and a keypad 38. The ticket printer 35 prints on a ticket a barcode and outputs the ticket as a barcoded ticket 39. A barcode is encoded data containing a credit amount, date, an identification number of the slot machine 10, and the like. A player is allowed to exchange the barcoded ticket 39 with a bill or the like at a predetermined location in the gaming facility (e.g. change booth of a casino).

The card reader 36 reads/writes data from/into a smart card. The smart card is carried by a player, and stores therein data such as data for identifying the player, data related to history of games played by the player. The smart card may store data of coins, bills, or a credit card. Further, it is possible to adopt a magnetic stripe card instead of the smart card. The data displayer 37 includes a fluorescent display or the like, and displays the data read by the card reader 36 and the data input by the player through the key pad 38. The key pad 38 is for entering instructions or data relating to issuing of a ticket or the like.

(Electric Structure of Slot Machine 10)

Figure 6:
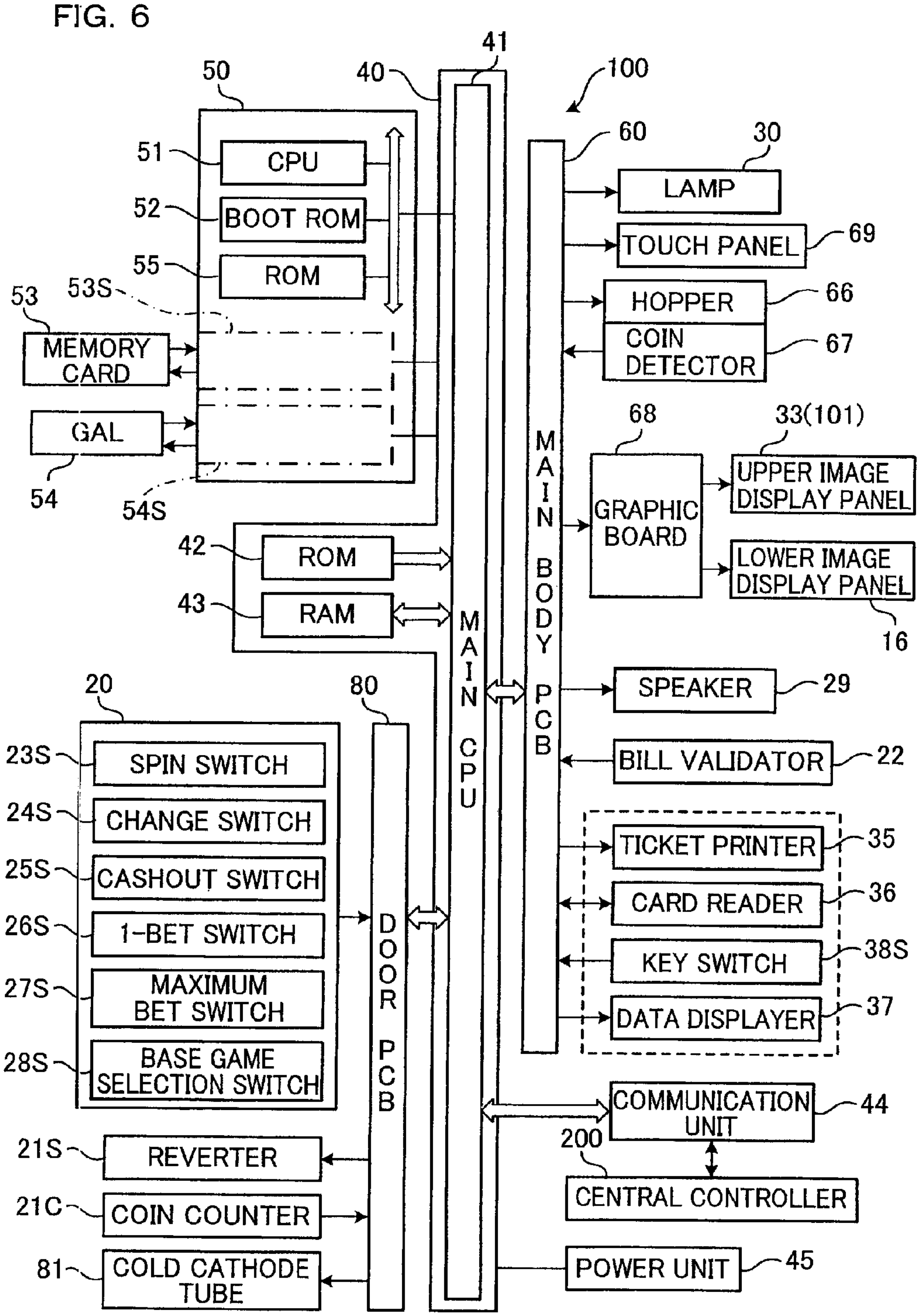
FIG. 6 is a block diagram illustrating a control circuit of a terminal controller 100.

FIG. 6 illustrates an internal structure of the slot machine 10 shown in FIG. 5, that is, FIG. 6 is a block diagram of the terminal controller 100. The gaming board 50 is provided with a CPU (Central Processing Unit) 51, a ROM 55, a boot ROM 52, a card slot 53S corresponding to a memory card 53, and an IC socket 54S corresponding to a GAL (Generic Array Logic) 54. The CPU 51, the ROM 55, and the boot ROM 52 are connected to one another through an internal bus.

The memory card 53 is made of an non-volatile memory such as a compact flashR, and stores a game program. The game program contains a stop symbol determining program. The symbol determination program is a program for determining symbols to be rearranged on the display blocks 28.

The card slot 53S is structured so as to allow the memory card 53 to be attached/detached to/from the card slot 53S. This card slot 53S is connected to the motherboard 40 through an IDE bus. Thus, the type and content of a game run by a slot machine 10 can be modified by detaching the memory card 53 from the card slot 53S, write a different game program into the memory card 53, and inserting the memory card 53 back into the card slot 53S. The game program includes a program relating to a game progress. This game program includes image data of, for example free game occurrence image 200, achievement effect image 201, free game addition image 202.

The game program includes regular game symbol table data, odds data, wild symbol increase number determination table data, trigger symbol increase number determination table data, code number determination table data, and the like. The regular game symbol table data indicates a regular game symbol table (see FIG. 8) illustrating a corresponding relationship among each symbol on each symbol column in each display block, a code number, and a random value. The odds data indicates a corresponding relationship between the type and number of symbols rearranged on the payline L and a payout amount (see FIG. 14). This wild symbol increase number determination table data indicates a wild symbol increase number determination table (see FIG. 12). The trigger symbol increase number determination table data illustrates a trigger symbol increase number determination table (see FIG. 13). The code number determination table data indicates a symbol column determination table (see FIG. 10).

A CPU 51, a ROM 55, and a boot ROM 52 are connected to a motherboard through a PCI bus. The PCI bus communicates signals between the motherboard 40 and the gaming board 50 and supplies power from the motherboard 40 to the gaming board 50.

The motherboard 40 is structured by using a marketed general-purpose motherboard which is a printed circuit board having basic components of a personal computer, and includes: a main CPU 41; a ROM (Read Only Memory) 42; and a RAM (Random Access Memory) 43. The motherboard 40 corresponds to the terminal controller 100 of the present invention.

The ROM 42 is made of a memory device such as a flash memory, and stores permanent data and a program such as BIOS (Basic Input/Output System) which is run by the main CPU 41. Running the BIOS by the main CPU 41 initializes predetermined peripherals and starts loading the game program stored in the memory card 53 via the gaming board 50. Note that, in the present invention, the ROM 42 may be rewritable or non-rewritable.

The RAM 43 stores data used during operation of the main CPU 41 and a program such as the symbol determination program. Further, the RAM 43 is capable of storing the game program.

Further, the RAM 43 stores a credit amount, and an input amount and a payout amount for each game (unit game). Further, the RAM 43 stores data of bonus game symbol table (see FIG. 9) and the like. The bonus game symbol table indicates the relation among the symbols of each symbol column in the display blocks, the code numbers, and random values. The bonus game is a type of a bonus game and is also referred to as “feature game.”

Further, the RAM 43 has a free game count recording region, a total game count recording region, and a total payout amount recording region, and a trigger symbol count recording region. The trigger symbol may be also referred to as "feature symbol". In the free game count recording region is stored remaining game count data which indicates a remaining free game count T. In the total game count recording region is stored total game count data indicating a total game count C. The total game count C is the number of regular games played after a transition to the insured mode. In the trigger symbol count recording region is stored trigger symbol count data indicating a trigger symbol count. The trigger symbol count is the total number of trigger symbols that may be rearranged during a free game.

Further, the main RAM 43 is provided with an insurance flag recording region. The insurance flag is set when a rescue start condition has been met, or when a not-illustrated insurance button has been pressed, for example. The rescue start condition is met, for example, when a repetition count of base game has reached a predetermined value. The insurance flag recording region is, for example, a storage region of a predetermined bits, and the insurance flag is turned on and off according to contents of the storage region. The insurance flag in the on state corresponds to the insured mode. The insurance flag in the off state corresponds to the uninsured mode.

When the bonus game is run in the insured mode, an increase in the number of trigger symbols and/or that of wild symbols may be greater than in the uninsured mode. Further, when a bonus combination is achieved during the bonus game, at least one of an increase in the number of trigger symbols and that of wild symbols may be greater in the uninsured mode than in the insured mode.

The motherboard 40 is connected to a later-described main body PCB (Printed Circuit Board) 60 and a door PCB 80 respectively via USBs. Further, the motherboard 40 is connected to a power unit 45.

The main body PCB 60 and door PCB 80 are connected to various devices or units which generate signals to be input to the main CPU 41, and various devices or units whose operations are controlled by signals from the main CPU 41. Based on a signal input to the main CPU 41, the main CPU 41 runs the game program and the game system program stored in the RAM 43, to perform an arithmetic process. Then, the CPU 41 stores the result of the arithmetic process in the RAM 43, or transmits a control signal to the various devices and units to control them based on the result.

To the main body PCB 60 are connected: a lamp 30, a hopper 66, a coin detector 67, a graphic board 68, a speaker 29, a touch panel 69, a bill validator 22, a ticket printer 35, a card reader 36, key switch 38S, a data displayer 37, and a random number generator 64. The lamp 30 flashes in a predetermined pattern, based on a control signal output from the main CPU 41.

The hopper 66 is mounted in the cabinet 11 and pays out a predetermined number of coins from a coin outlet 19 to the coin tray 18, based on a control signal from the main CPU 41. The coin detector 67, when detecting that a predetermined number of coins are output from the coin payout port 19, outputs an input signal to the main CPU 41.

The graphic board 68 controls image displaying on the upper image display panel 33 and the symbol display device 16, based on a control signal output from the main CPU 41. On the upper image display panel 33 and the display blocks 28 of the symbol display device 16 are displayed symbols which are scrolled or stopped. A credit amount display unit 400 of the symbol display device 16 displays thereon a credit amount stored in the RAM 43. Further, a bet amount display unit 401 of the symbol display device 16 displays thereon the number of coins bet. Further, a payout display unit 402 of the symbol display device 16 displays the number of coins paid out. Further, the graphic board 68 is provided with a VDP (Video Display Processor) for generating image data on the basis of a control signal from the main CPU 41, a video RAM for temporarily storing the image data generated by the VDP, and the like. Note that image data used at the time of generating the image data by the VDP is in a game program which is read out from the memory card 53 and stored in the RAM 43.

The bill validator 22 validates whether a bill is legitimate, and only accepts a legitimate bill into the cabinet 11. When taking in a genuine bill, the bill validator 22 outputs an input signal indicating the denomination of the bill to the main CPU 41. The main CPU 41 stores into the RAM 43 a credit-value corresponding to the denomination of the bill indicated by the signal.

The ticket printer 35 prints a barcode onto a ticket to issue a ticket 39 having the barcode. The barcode contains encoded data such as credit-value stored in the RAM 43, date and time, identification number of the slot machine 10, or the like, based on a control signal from the main CPU 41. The card reader 36 reads out data from the smart card and transmits the data to the main CPU 41. Further, the card reader 36 writes data into the smart card based on the control signal output from the main CPU 41. The key switches 38S are provided to the key pad 38, and transmit a predetermined input signal to the main CPU 41 when a player operates the key pad 38. The data displayer 37 displays, based on a control signal from the main CPU 41, the data read by the card reader 36 or the data input by the player through the key pad 38.

The random number generator 64 generates a random number at a predetermined timing. Note that random numbers generated by the random number generator 64 ranges from 0 to 65535.

The door PCB 80 is connected to a control panel 20, a reverter 21S, a coin counter 21C and a cold cathode tube 81. The control panel 20 is provided with a start switch 23S corresponding to the start button 23, a change switch 24S corresponding to the change button 24, a cash-out switch 25S corresponding to a cash-out button 25, a 1-bet switch 26S corresponding to the 1-bet button 26, and a maximum bet switch 27S corresponding to the maximum bet button 27. Each of the switches 23S to 27S outputs a signal to the main CPU 41, when a player presses the associated button.

The coin counter 21C is provided inside the coin receiving port 21, and validates whether a coin input by a player to the coin receiving port 21 is a valid coin. A coin is discharged from the coin outlet 19 unless the coin is valid. In addition, the coin counter 21C outputs an input signal to the main CPU 41 upon detection of a genuine coin.

The reverter 21S is operated on the basis of the control signal output from the main CPU 41 and distributes a coin, which is recognized as a valid coin by the coin counter 21C, to a not-shown cash box or hopper 66 mounted in the slot machine 10. In other words, when the hopper 66 is full of coins, the genuine coin is distributed into the cash box by the reverter 21S. On the other hand, when the hopper 66 is not yet full of coins, the valid coin is distributed into the hopper 66. The cold cathode tube 81 functions as a back light disposed at the back sides of the symbol display device 16 and the upper display panel 33. This cold cathode tube 81 lights based on a control signal output from the main CPU 41.

(Electrical Structure of Center Controller 200)

Figure 7:
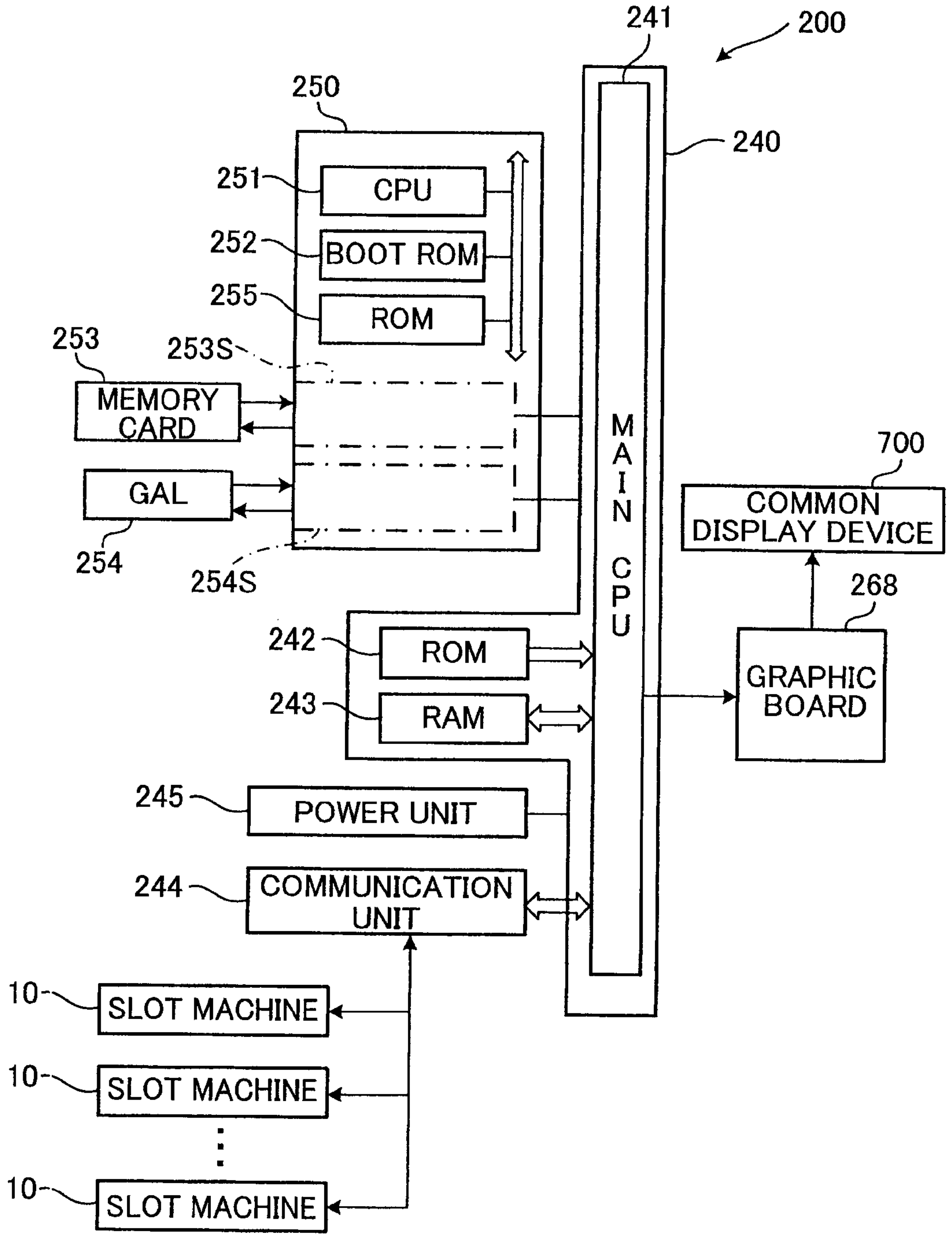
FIG. 7 is a block diagram illustrating a controller circuit of a center controller.

FIG. 7 is a block diagram illustrating an electrical structure of the center controller 200. The center controller 200 is provided therein with a control unit. The control unit includes a motherboard 240, a gaming board 250, a power unit 245, and the like.

The gaming board 250 has the same structure as the gaming board 50 of the slot machine 10 (terminal controller). In other words, the gaming board 250 includes a CPU 251, a ROM 255, a boot. ROM 252, a card slot 253S corresponding to a memory card 253, and an IC socket 254S corresponding to a GAL 254.

The motherboard 240 has the same structure as the motherboard 40 of the slot machine 10. In other words, the motherboard 240 includes a main CPU 241, a ROM 242, and a RAM 243. The RAM 243 stores therein various types of data in forms of a gaming terminal management table of FIG. 15, a common game management table of FIG. 16 and the like. The communication unit 244 is for carrying out communication with the slot machines 10 through a communication line.

The graphic board 268 has the same structure as the graphic board 68 of the slot machine 10; however, the graphic board 268 differs from the graphic board 68 in that the former controls an image display on a common display device 700 based on a control signal outputted from the main CPU 241.

(Common Display Device 700)

Figure 23:
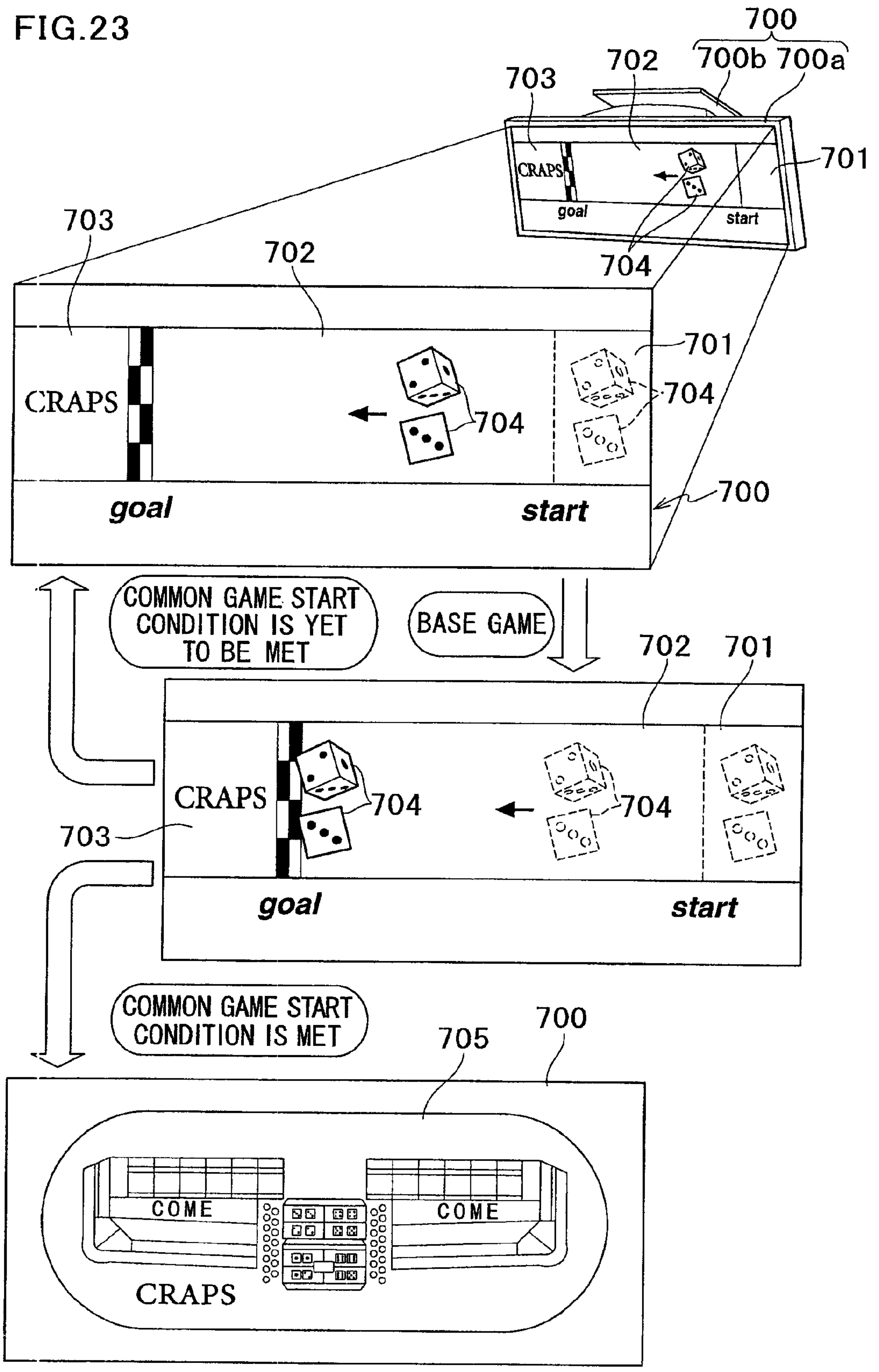
FIG. 23 is an explanatory diagram illustrating a display status of a common display device.

The common display device 700 includes a display device main body 700*a* and a bracket 700*b*, as illustrated in FIGS. 1 and 23. The bracket 700*b* is attached on a back surface of the display device main body 700*a*, and is capable of supporting the display device main body 700*a* at any angle. The bracket 700*b* is fixable on a ceiling of a facility such as a hall.

The display device main body 700*a* switchably displays a progress screen and the crap game screen. The progress screen illustrates a status of a game before the crap game start condition is met. Specifically, the progress screen has a start area 701, a travel area 702, and a goal area 703. The progress screen also displays a die image 704 which serves as a moving object. The die image 704 is positioned in the start area 701 immediately after the crap game has ended. The die image 704 moves through the travel area 702 from the start area 701 towards the goal area 703 each time a base game is run. The die image 704 is positioned in the goal area 703 when the crap game start condition has been met. The progress screen thereby enables the player to anticipate when the crap game will start, based on the position of the die image 704.

Meanwhile, the crap game screen is displayed in place of the progress screen when the crap game start condition has been met. The crap game screen displays an entire bet table 705 for the crap game. Thus, the crap game screen informs all players that a crap game will begin, by using an entire screen on the display device main body 700*a*.

(Symbol, Combination, and the Like)

Symbols displayed on the simulated reels 151 to 155 of the slot machine 10 form symbol columns each including plural symbols 501. Each symbol 501 forming a symbol column is given any one of the code Nos. 0 to 19 or more, as shown in FIGS. 8 and 9. Each symbol column has a combination of symbols 501 which are: "WILD," "FEATURE," "A," "Q," "J," "K," "BAT," "HAMMER," "SWORD," "RHINOCEROS," "BUFFALO," and "DEER."

Any four consecutive symbols 501 of a symbol column are displayed (arranged) in the uppermost stage, upper stage, lower stage, and lowermost stage of the corresponding one of the simulated reels 151 to 155, respectively, thereby forming a symbol matrix of five columns and four rows under the display window 150. Symbols 501 forming a symbol matrix are scrolled when a game is started at least by pressing the start button 23. This scrolling of the symbols 501 stops (rearrangement) after a predetermined period from the beginning of the scrolling.

Further, for symbols 501, various winning combinations are set beforehand. Each winning combination achieves a winning. A winning combination is a combination of symbols 501 stopped on the payline L, which combination of symbols 501 is advantageous to a player. The wording "advantageous" means that a predetermined number of coins corresponding to the winning combination are paid out; the number of coins to be paid out is added to a credit amount; a bonus game is started; or the like.

In the present embodiment, a winning combination is a combination of symbols 501 which informed on an activated payline L and includes a predetermined number of at least one kind of the following symbols 501: "WILD," "FEATURE," "A," "Q," "J," "K," "BAT," "HAMMER," "SWORD," "RHINOCEROS," "BUFFALO," and "DEER." When a predetermined kind of symbols 501 is set as a scatter symbol, a winning combination is regarded as to be formed if a predetermined number or more of those are rearranged, irrespective of the activation/inactivation status of the paylines L.

Specifically, a winning combination with "FEATURE" (a trigger symbol 503*b*) stopped on a payline L serves as a bonus trigger and causes (i) transition of the gaming mode from the regular game to the bonus game and (ii) a payout according to the bet amount. Further, when a winning combination with "BAT" stopped on a payline L in the regular game, there is paid out an amount of coins (value) which is a product of a basic payout amount of the "BAT" multiplied by the bet amount.

(Base Game Symbol Table)

FIG. 8 shows a table used for determining symbols 501 to be rearranged during a regular game. The regular game symbol table indicates symbols 501 of each symbol column for the display blocks 28, code Nos. respectively associated with the symbols 501, and twenty number ranges respectively associated with the code Nos. ranging from 0 to 65535.

Note that the above numbers may be equally divided or unequally divided. The latter case enables adjustment of a rearrangement probability for each symbol 501 by adjusting the associated range of random numbers. Further, the range of random numbers associated with "FEATURE" corresponding to the trigger symbol 503*b* among the specific symbols 503, or "WILD" corresponding to the wild symbol 503*a* among the specific symbols 503 may be narrower than ranges of random numbers associated with other symbols 501. This allows easier adjustment of winning or losing, by lowering probability of winning of a valuable symbol 501 in accordance with the status of a game.

For example, when a random number randomly selected for the first column is "10000," the symbol "J" whose code No. "3" is associated with a range of random numbers including "10000" is selected as a symbol to be rearranged in the first simulated reel 151. Further, for example, when a random number randomly selected for the fourth column is "40000," the symbol "FEATURE" whose code No. "12" is associated with a range of random numbers including "40000" is selected as a symbol to be rearranged in the fourth simulated reel 151.

(Bonus Game Symbol Table)

FIG. 9 is a table used at the time of determining symbols 501 to be rearranged during a bonus game. As is the regular game symbol table, the bonus game symbol table contains symbols 501 of each symbol column for the display blocks 28, code Nos. respectively associated with the symbols 501, and number ranges respectively associated with the code Nos.

The number ranges cover the numbers 0 to 65535. These numbers 0 to 65535 are divided into the ranges similarly to the case of the regular game symbol table.

Further, the bonus game symbol table includes additional specific symbols 503 or specific symbols 503 replacing the other symbols. The wording "replacing" means that new symbol data is written over already existing symbol data. The number of additional symbols or the number of symbols replacing the other symbols, or the symbol column in which the addition or replacement takes place may be randomly determined or determined beforehand. In the present embodiment, the number of symbols to be added is randomly determined based on the wild symbol increase count determination table of FIG. 12 and the trigger symbol increase count determination table of FIG. 13. When symbol data is replaced with another set of symbol data, an image based on the overwritten data (replacement data) may be displayed, in place of a symbol 501 having been stopped and displayed.

For example, in the bonus game symbol table of FIG. 9, ten wild symbols 503*a* are evenly added to symbol columns (L1) to (L5). This achieves conditions whereby a wild symbol 503*a* is more likely to be selected through random selection, in all the symbol columns (L1) to (L5).

(Symbol Column Determination Table)

FIG. 10 illustrates a symbol column determination table used at the time of determining a symbol column, out of the symbol columns (L1) to (L5), in which addition of or replacement with the specific symbols 503 takes place. The symbol column determination table indicates symbol column Nos. and random number ranges respectively associated with the symbol column No. A symbol column Nos. 1 to 5 respectively indicate first to fifth columns of display blocks 28.

The present embodiment deals with a case where an increase in the number of specific symbols 503 or the number of specific symbols 503 to replace the other symbols is determined for each symbol column based on the random number sampled and the symbol column determination table. The present invention however is not limited to this. For example, the number of specific symbols 503 to be increased or to replace the other symbols may be determined in advance for each symbol column. Further, an increase in the number of specific symbols 503 or the number of specific symbols 503 to replace the other symbols may be determined for each type of the specific symbols 503.

(Code No. Determination Table)

FIG. 11 shows a code No. determination table. The code No. determination table indicates code Nos. and random number ranges respectively associated with the code Nos. For example, when the random numbers for the first symbol column No. (the first column) are 40567, 63535, 65323, then "12", "end", and "end" are selected as the code Nos., respectively.

The present embodiment deals with a case where the code Nos. of specific symbols to be increased is determined for each of the symbol columns based on the random numbers obtained and the code No. determination table. The present invention however is not limited to this. For example, the code No. of a specific symbol 503 to be increased may be set in advance for each symbol column.

(Wild Symbol Increase Count Determination Table)

FIG. 12 shows a wild symbol increase count determination table. The wild symbol increase count determination table indicates a list of wild symbol increase counts and random number ranges respectively associated therewith. The wild symbol increase count has five numerical values: "10," "30," "50," "70," and "90." For example, when the random number is 17235, the wild symbol increase count selected is "30." Note that the list of wild symbol increase counts is not particularly limited provided that the list includes more than one integers of 1 or greater. Further, the increases in the number may be variable at a predetermined timing; e.g. at every unit game.

(Trigger Symbol Increase Count Determination Table)

FIG. 13 shows a trigger symbol increase count determination table. The trigger symbol increase count determination table indicates a list of trigger symbol increase counts and associated random numbers. The trigger symbol increase count has five numerical values: "2," "4," "6," "8," and "10." For example, when the random number is 17235, the trigger symbol increase count selected is "4". Note that the list of trigger symbol increase counts is not particularly limited provided that the list includes more than one integers of 1 or greater. Further, the list of increases, in the table, may be variable at a predetermined timing; e.g. at every unit game.

(Payout Table)

FIG. 14 is a payout table for managing payouts awarded based on winning combinations. This payout table is stored in the ROM 242 of the main control board 71, and payout information (payout multiplying factor) is associated with each winning combination. For example, a payout multiplying factor corresponding to a winning combination including three "A"s is "4." Therefore, a payout calculated by multiplying a bet amount by 4 is awarded to a player in this case. A payout multiplying factor corresponding to a winning combination including five "BUFFALO"s is "100." Note that the setting of payout multiplying factor for the regular game is the same as that of the free game; however, the present invention is not limited to this. That is, the setting of payout multiplying factor may be different between the regular game and the free game.

The data of each of the above tables is stored in the ROM 42, the RAM 43 in the terminal controller 100 of the slot machine 10. This allows the slot machine 10 to run a game independently when it is separated from the center controller 200.

(Gaming Terminal Management Table)

FIG. 15 illustrates a gaming terminal management table which manages, in the center controller 200, a running state of a base game at each slot machine 10. This management table has a gaming terminal column, a game type column, a game state column, an accumulated bet amount column, and an accumulated game number column. The gaming terminal column stores therein unique machine numbers respectively assigned to the slot machines 10. For instance, when six slot machines 10 are connected, the machine numbers "001" to "006" are stored.

The game type column stores therein a type of base game being run at each slot machine 10 in association with the machine number. Examples of types of the base game include the regular game and the bonus game. The slot machine 10 assigned the machine number "001," for instance, has been repeating unit games of the regular game, since the game type column thereof indicates the "regular game."

The game status column stores a status of a base game ongoing at each slot machine 10, that is, a game status of a unit game, in association with the machine number. The gaming statuses include "run" and "stop." For example, at the slot machine 10 assigned the machine number "002," a win or loss has resulted from a unit game of the regular game and the next unit game is to begin, since the indicated game type is "regular game," and the indicated game state is "stop." At the slot machine 10 assigned the machine number "004," a unit game of the bonus game is being run, since the indicated game type is "bonus game," and the indicated game status is "run."

The accumulated bet amount column stores an accumulated bet amount placed on the slot game as an accumulated bet amount. The accumulated bet amount refers to an accumulated bet amount indicating an accumulated bet amount placed on the slot game, with a bet count indicated at a resumption of the slot game after the crap game has ended as an initial value of the accumulated bet amount. The accumulated game number column stores an accumulated game number of unit games of the regular game with a game number indicated at a resumption of the slot game after the crap game has ended as an initial value thereof. The accumulated bet amount and the accumulated game number of each slot machine 10 are respectively used for calculations of a total accumulated bet amount and a total accumulated game number with which a determination of whether a common game can be run is made, the total accumulated.

(Common Game Management Table)

FIG. 16 illustrates a common game management table which manages a status of a common game at each slot machine 10 in the center controller 200. The management table includes a gaming terminal column, a bet amount column, a payout multiplying factor column, and a shooter column. The gaming terminal column stores therein unique machine numbers respectively assigned to the slot machines 10. The bet amount column stores therein the number of coins bet on the common game. The payout multiplying factor column stores a payout multiplying factor at each slot machine 10. The bet amount is multiplied by a payout multiplying factor to determined the number of coins to be paid out, when the slot machine 10 wins the common game. The shooter column stores the numerical values "1" and "0," the "1" indicating that the slot machine 10 is designated to be the shooter, and the "0" indicating that the slot machine 10 is not designated to be the shooter. In the case illustrated in FIG. 16, the slot machine 10 assigned the machine number "002" is designated to be the shooter.

(Display Status)

The following describes an exemplary display status of the Symbol display device 16 in the operation of the slot machine 10.

(Slot Game: Regular Game Screen)

FIG. 17 illustrates an exemplary regular game screen which is a screen displayed on the symbol display device 16, during the regular game.

More specifically, the regular game screen is arranged in a center portion, and includes: the display window 150 having the five simulated reels 151 to 155, and the pay line occurrence parts 65L and 65R which are arranged on both sides of the display window 150 and symmetrical with respect to the display window 150. Note that FIG. 17 illustrates a regular game screen in which the first to third simulated reels 151, 152, and 153 are stopped, while the fourth and fifth simulated reels 154 and 155 are rotating.

Above the display window 150 are: the credit amount display unit 400, the bet amount display unit 401, a wild symbol count display unit 415, a trigger symbol count display unit 416, and the payout display unit 402. These units 400, 401, 415, 416, and 402 are sequentially arranged in this order from the left side to the right side when viewed from a player.

The credit amount display unit 400 displays a credit amount. The bet amount display unit 401 displays a bet amount on a unit game in progress. The wild symbol count display unit 415 displays the number of wild symbols 503*a* in a unit game in progress. With this, it is possible to notify the player in advance that there are five wild symbols 503*a* in the regular game. The trigger symbol count display unit 416 displays the number of trigger symbols 503*b* in a unit game in progress. With this, it is possible to notify the player in advance that there are five trigger symbols 503*b* in the base game. The payout display unit 402 displays the number of coins to be paid out when a winning combination is achieved.

Blow the display window 150 are: a help button 410; a pay-table button 411; a bet unit display unit 412; a stock display unit 413; and a free game count display unit 414. These units 410, 411, 412, 413, and 414 are sequentially arranged in this order from the left side to the right side when viewed from the player.

The help button 410, when pressed by a player, activates a help mode. The help mode provides a player with information to solve his/her problem regarding the game. The pay-table button 411, when pressed by a player, activates a payout display mode in which an amount of payout is displayed. The payout display mode displays a screen explaining a relation between a winning combination and a payout multiplying factor.

The bet unit display unit 412 displays a bet unit (payout unit) at the current point. With the bet unit display unit 412, the player is able to know that, for example, the minimum game value required to participate in a unit game is one cent, and that he/she is able to raise his/her bet in increments of one cent.

The stock display unit 413 displays a bonus game carry-over number. Here, the "bonus game carry-over number" means the remaining number of bonus games runnable subsequently to an end of the currently-run bonus game. That is, when the stock display unit 413 displays "3", three more bonus games are runnable after the currently-run bonus game. Note that the stock display unit 413 displays the number "0" in the regular game.

The free game count display unit 414 displays the total number of times the bonus game is to be repeated, and how many times the bonus game has been repeated. That is, when the free game count display unit 414 displays "0 OF 0," the total number of times a free game is to be repeated ("free game total number") is 0; that is, the game in progress is not a bonus game. Further, when the free game count display unit 414 displays "5 OF 8," during the bonus game, the free game total number is eight, and the current game in progress is the fifth free game.

(Bonus-Win Screen in Regular Game)

Figure 18:
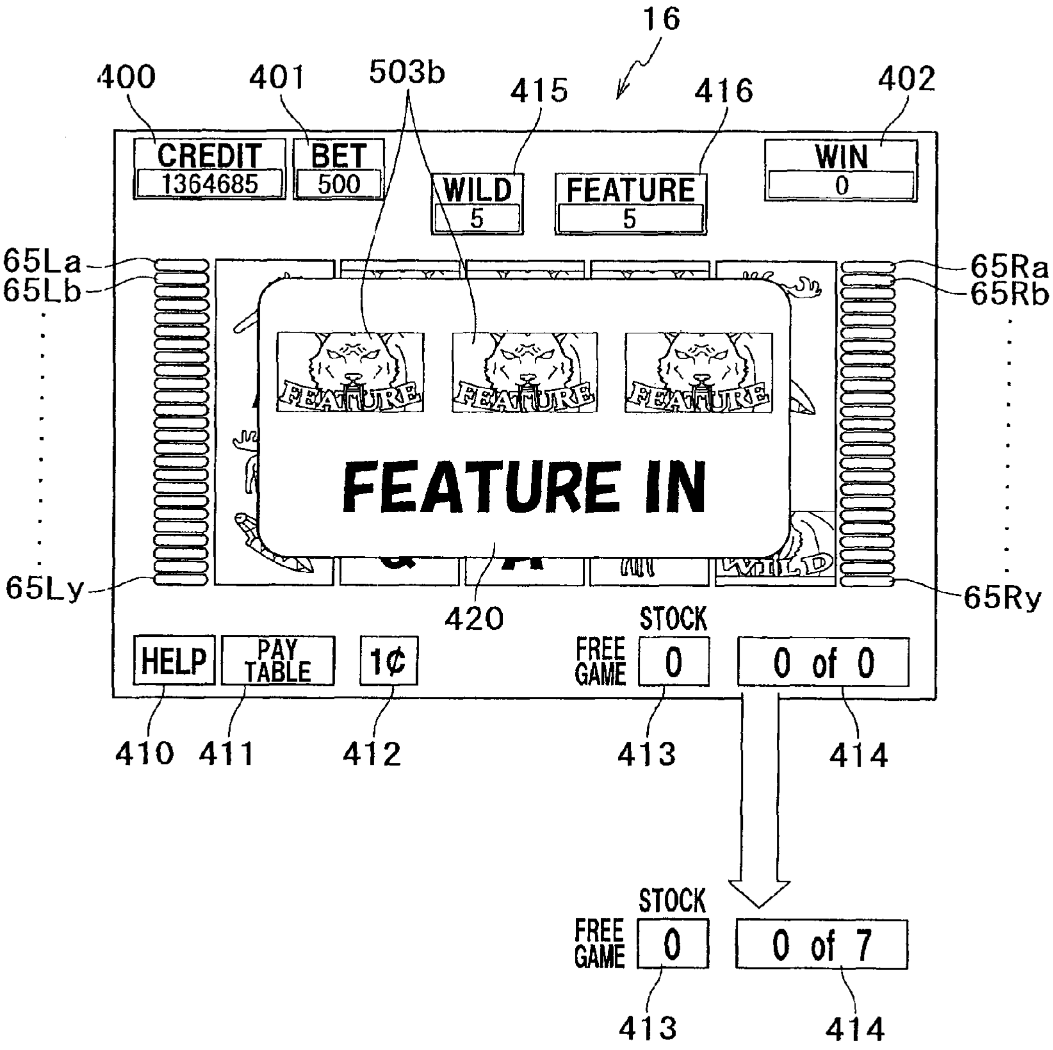
FIG. 18 is an explanatory diagram illustrating a display status of the symbol display device.

FIG. 18 shows a screen displayed for a predetermined period after a winning of bonus. More specifically, the screen shows that a bonus is won with three trigger symbols 503*b* being rearranged. The trigger symbol 503*b* preferably has a readable text such as "FEATURE", so as to have a player clearly understand the symbol relates to a winning of bonus.

On this screen, a bonus-win screen 420 is pop-up displayed which notifies a player of the winning of bonus using a symbol image and an image of text of "FEATURE IN". Then, at the same time or immediately after displaying the bonus-win screen 420, the free game total number "0" of the free game count display unit 414 is switched to "7". Thus, the player is able to know that he/she has won a bonus, and that the game will transit to a bonus game in which the free game is repeated seven times.

(Slot Game: Bonus Game Screen)

Figure 19:
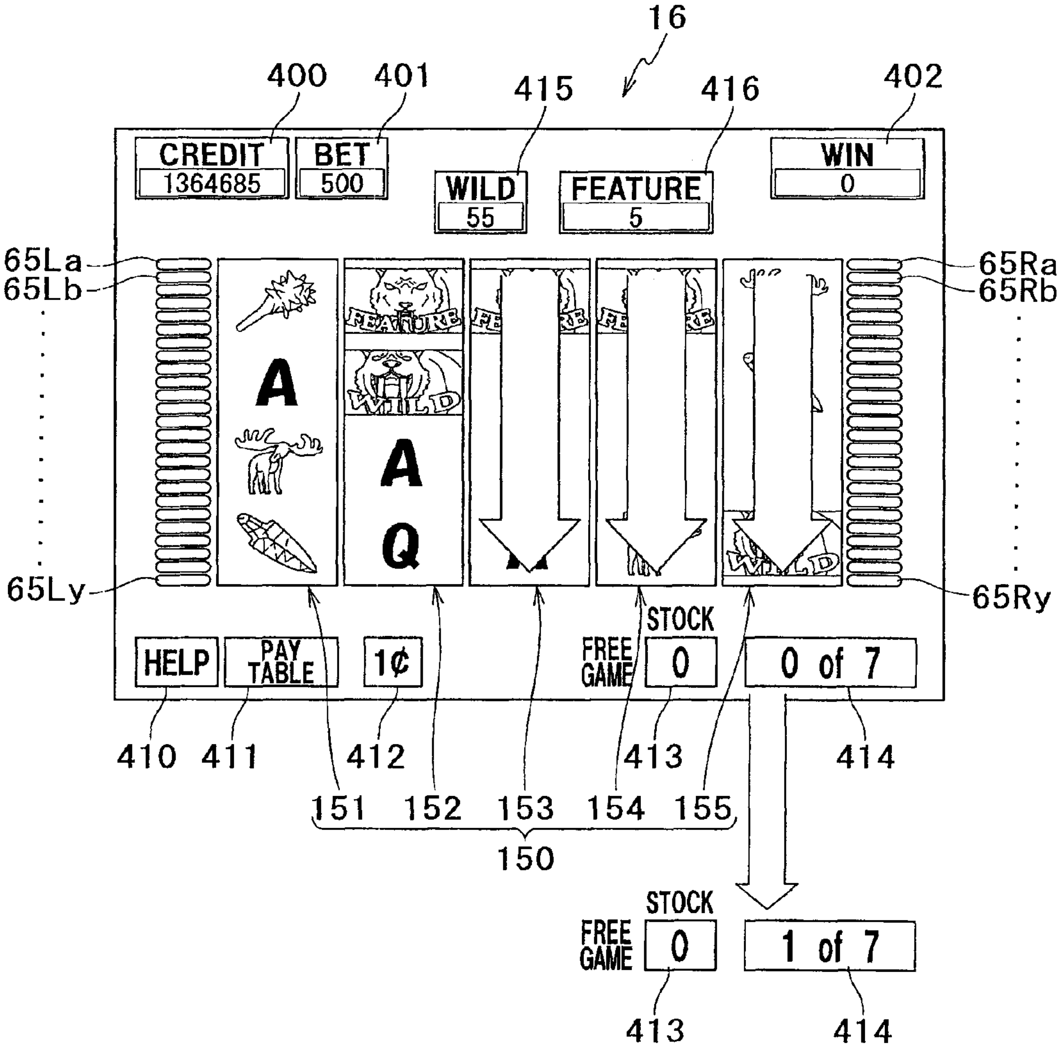
FIG. 19 is an explanatory diagram illustrating a display status of the symbol display device.

FIG. 19 illustrates an exemplary bonus game screen which is a screen displayed on the symbol display device 16 during the bonus game.

Specifically, the free game count display unit 414 displays the free game total number and what number game the current game is. For example, the free game count display unit 414 indicates that the first free game out of seven free games is running. Other operations are the same as those of the regular game.

(Crap Game Screen: Come-Out Roll Screen)

Figure 20:
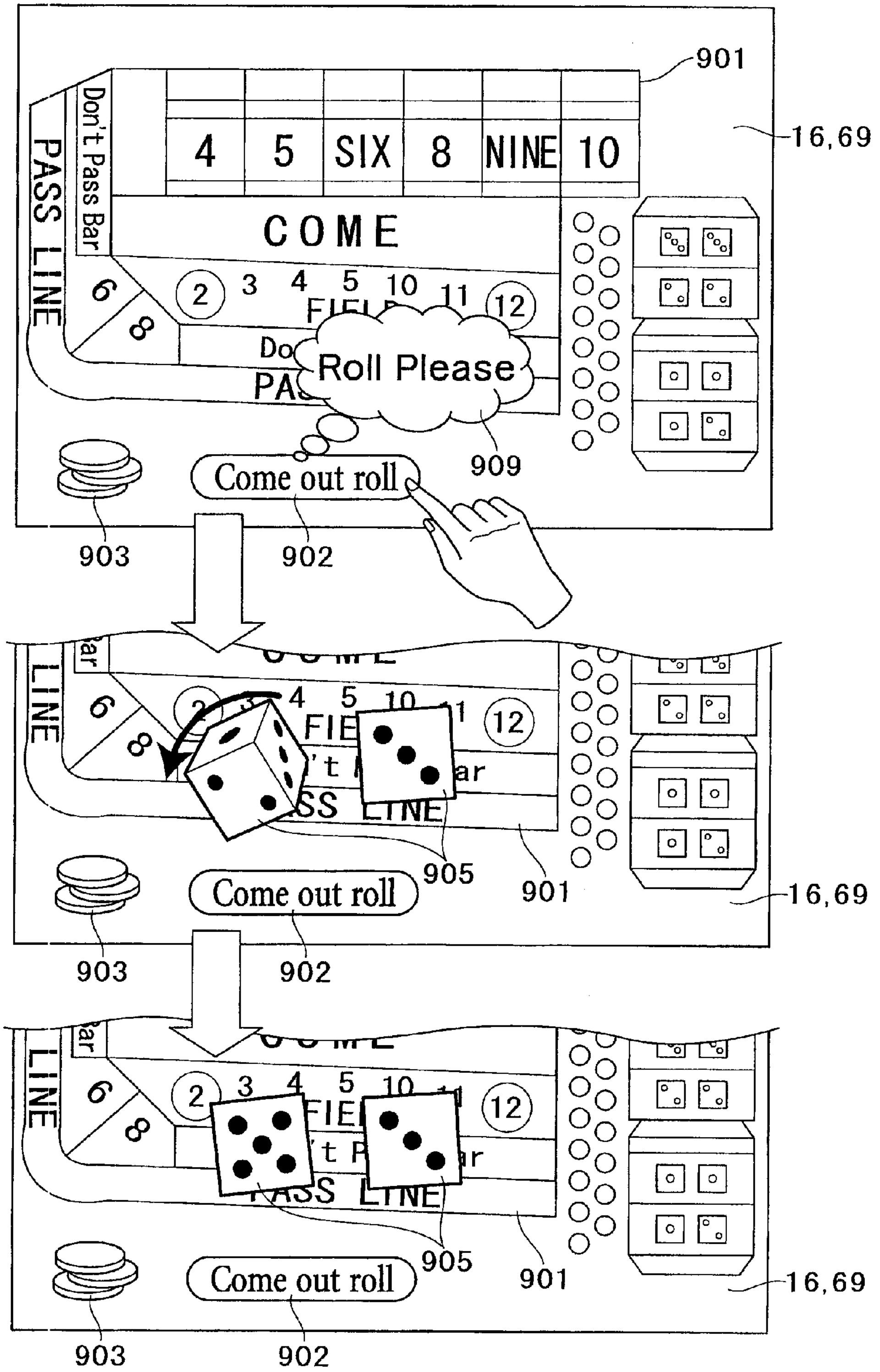
FIG. 20 is an explanatory diagram illustrating a display status of the symbol display device.
Figure 21:
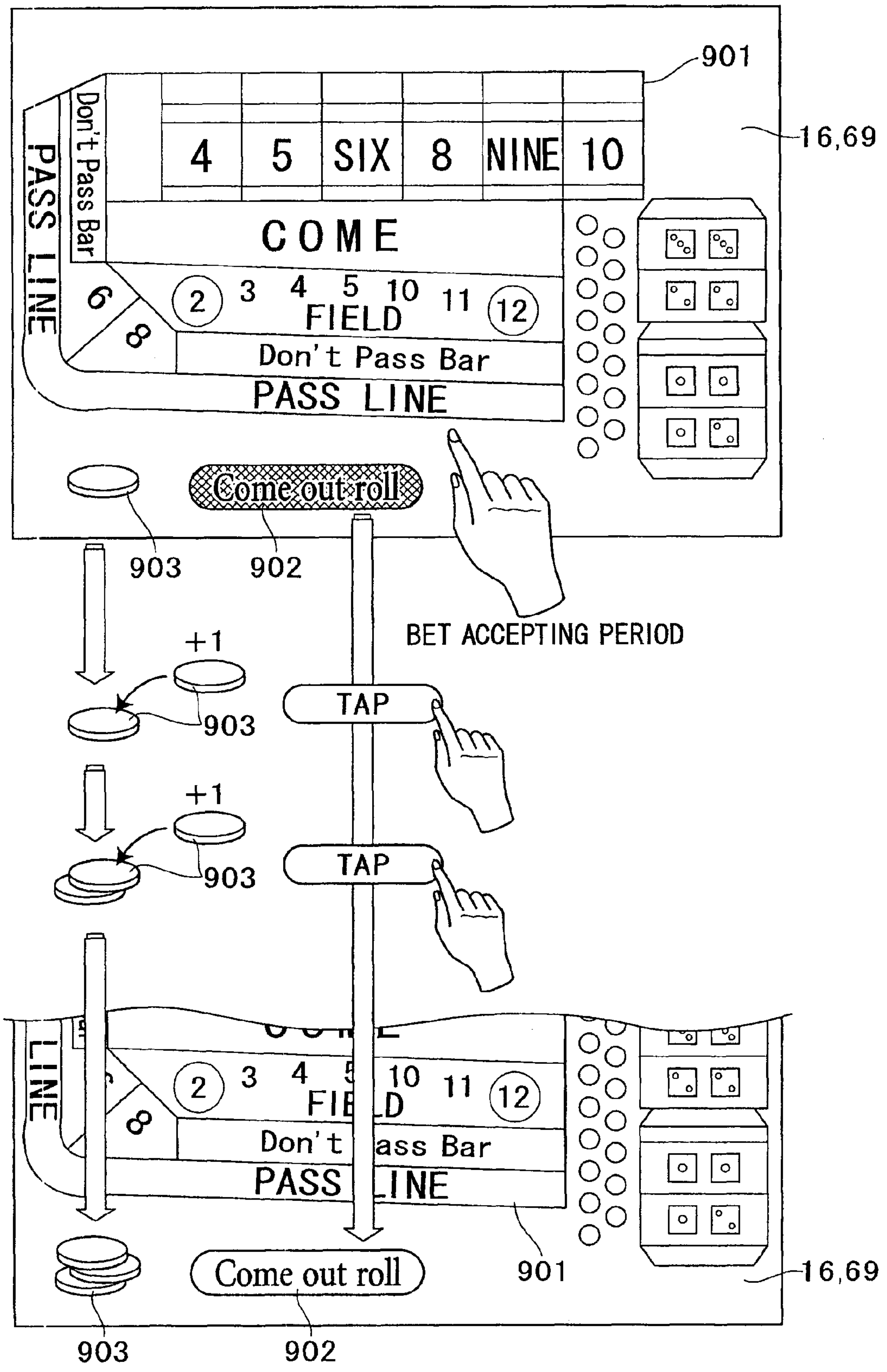
FIG. 21 is an explanatory diagram illustrating a display status of the symbol display device.

FIGS. 20 and 21 illustrate a display screen of a come-out roll in the crap game. These come-our roll screens are each displayed on the symbol display device 16 in place of a slot game screen illustrated in FIG. 17 and the like.

Specifically, the come-out roll screen of FIG. 20 is the screen on the symbol display device 16 when the slot machine 10 is designated to be the shooter. The come-out roll screen has display areas each for a crap game bet table 901 and for a roll button 902 provided below the bet table 901. Note that when the slot machine 10 is designated to be the shooter, the die images 801 are displayed on the upper image display panel 33, as illustrated in FIG. 1.

The bet table 901 allows increase in the bet when the touch panel 69 is pressed. The roll button 902 has letters "Come out roll" displayed on a button face thereof to inform a status of the current crap game. The roll button 902 allows die images 905 to roll when the touch panel is pressed (roll operation). When the roll operation is performed, the die images 905 appear on the bet table 901, and is displayed in the form of a movie illustrating the die images 905 where the die images 905 is rolling, until a win or loss has resulted from the crap game.

Further, the come-out roll screen has a display area for a balloon 909. The balloon 909 has the letters "Roll Please" displayed therein. The balloon 909 appears only when the slot machine 10 is designated to be the shooter. The balloon 909 has functions of notifying the player that he/she is selected to be the shooter, and encourage him/her to perform the roll operation. Further, a shooter screen has a display area for a coin image 903 to a side of the roll button 902. The coin image 903 can increase/decrease the number of coins it shows, in accordance with the bet amount. Note that the coin image 903 may show one coin per one bet, or one coin per N (natural number) bet.

Meanwhile, the come-our roll screen in FIG. 21 is a screen shown when an additional bet is made during a come-out roll period. The roll button 902 changes its display mode such as a display color, luminance, shape, size, during the period where an additional bet can be made. Thereby the roll button 902 notifies the player that an additional bet can be made. Note that the coin image 903 showing one coin is displayed as an initial value of the bet amount immediately after the crap game has begun. The coin image 903 increases the number of coins it shows, each time the player taps at a pass line on the bet table 901 for a predetermined number of times.

(Crap Game Screen: Point Roll Screen)

Figure 22:
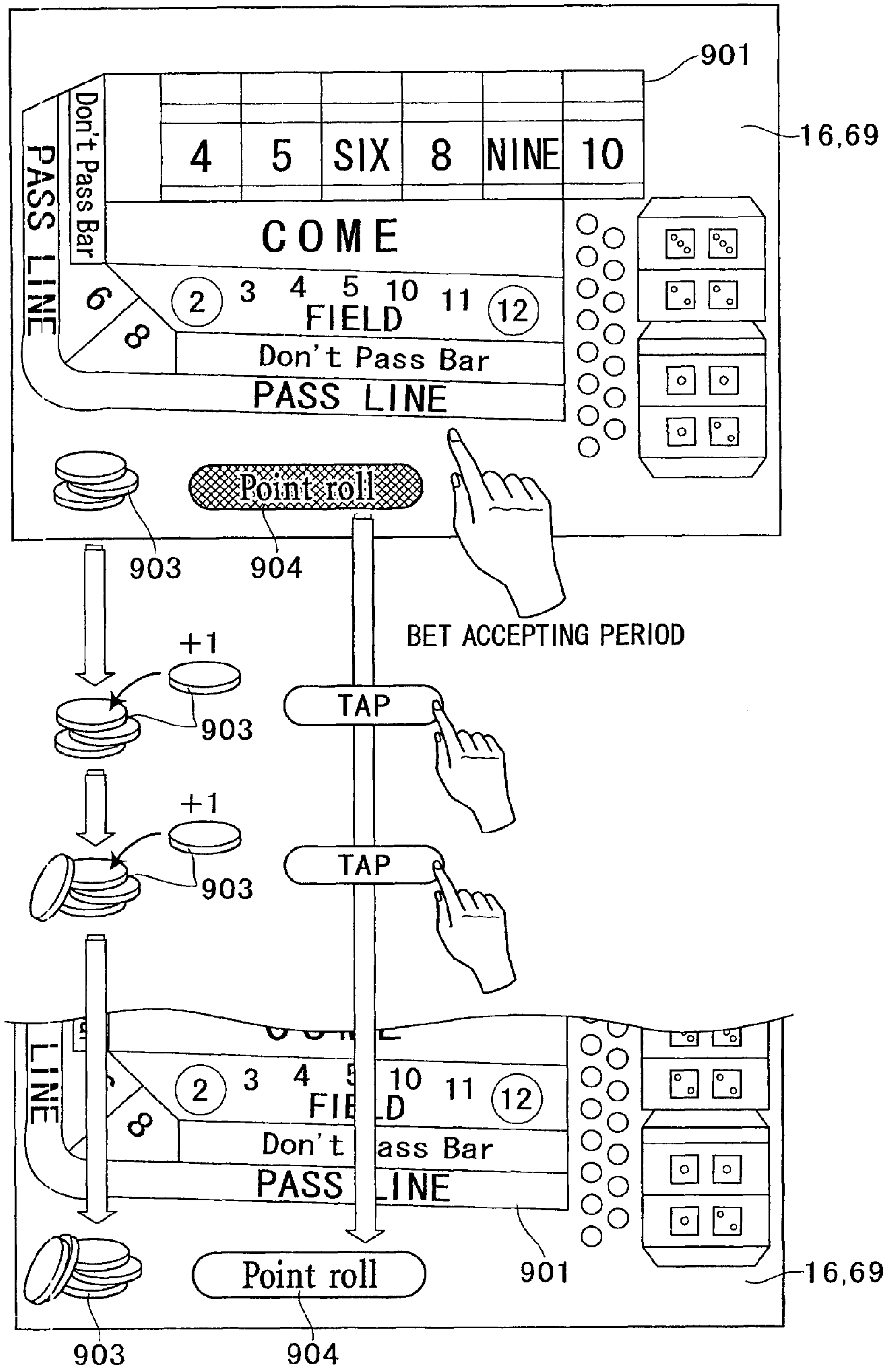
FIG. 22 is an explanatory diagram illustrating a display status of the symbol display device.

FIG. 22 is a display screen illustrating a point roll; i.e., point roll screen at the crap game. The point roll screen is displayed on the symbol display device 16 when no win or loss is resulted from the crap game, in place of the come-out roll screen illustrated in FIG. 20 and the like. The point roll screen has the same display mode and the function, except that the roll button 902 of the come-out roll screen is replaced with a roll button 904 of the point roll screen.

Specifically, as the come-out roll screen, the point roll screen of FIG. 22 has a display area for the bet table 901 and a display area for the roll button 904 provided below the bet table 901. The roll button 904 has letters "Point roll" displayed on a button face thereof to notify the player of a status of the currently-run crap game. As the come-out roll screen of FIG. 20, the roll button 904 allows the die images 905 to roll when a press operation (roll operation) is performed on the touch panel 69. Further, in order to notify the player that an additional bet can be made, the roll button 904 is capable of changing a display mode such as a display color, luminance, shape, or size, during a period where an additional bet can be made.

(Operations of Slot Machine 10: Regular Game Running Process)

Figure 27:
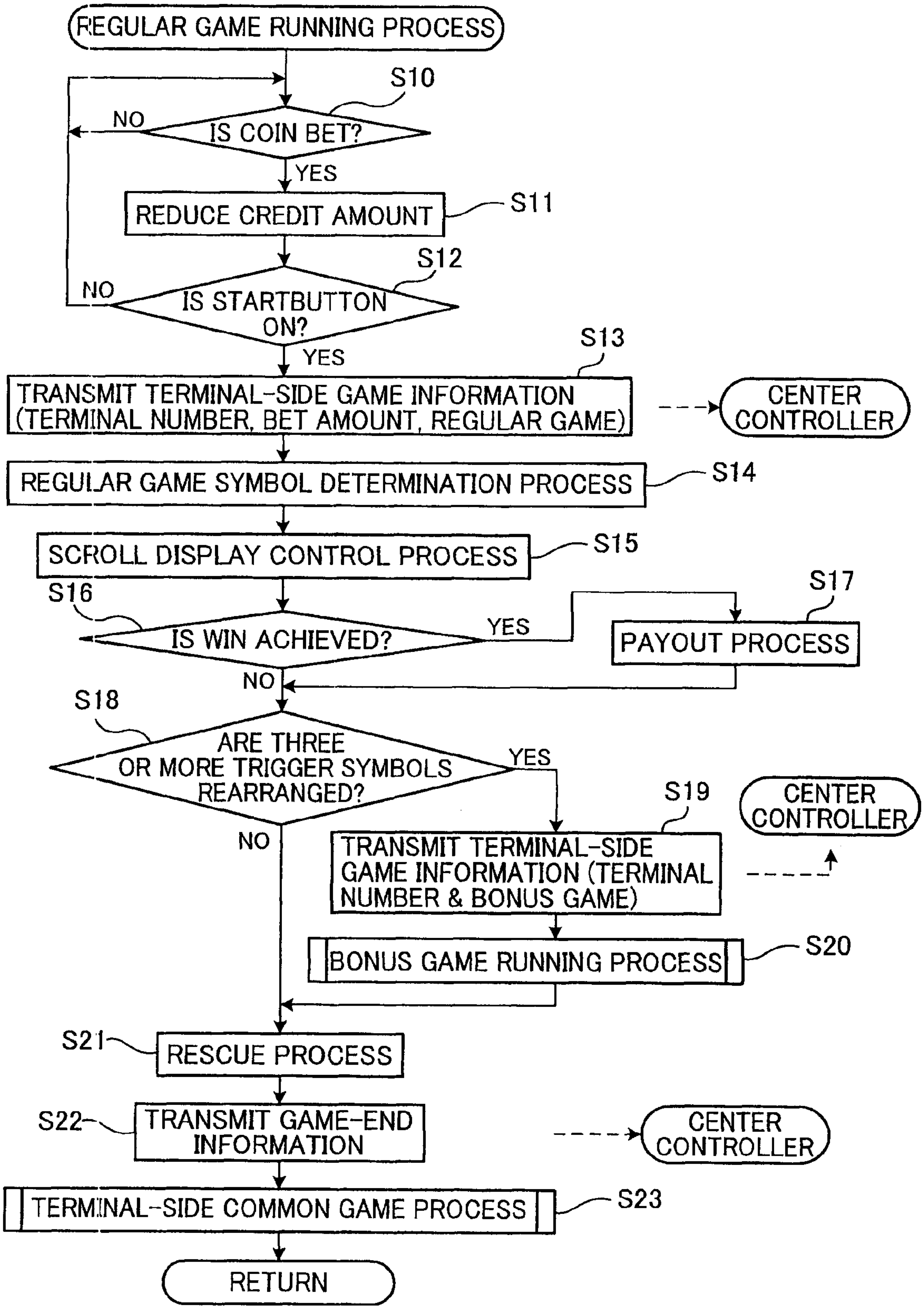
FIG. 27 is a flowchart illustrating a regular game running process.
Figure 28:
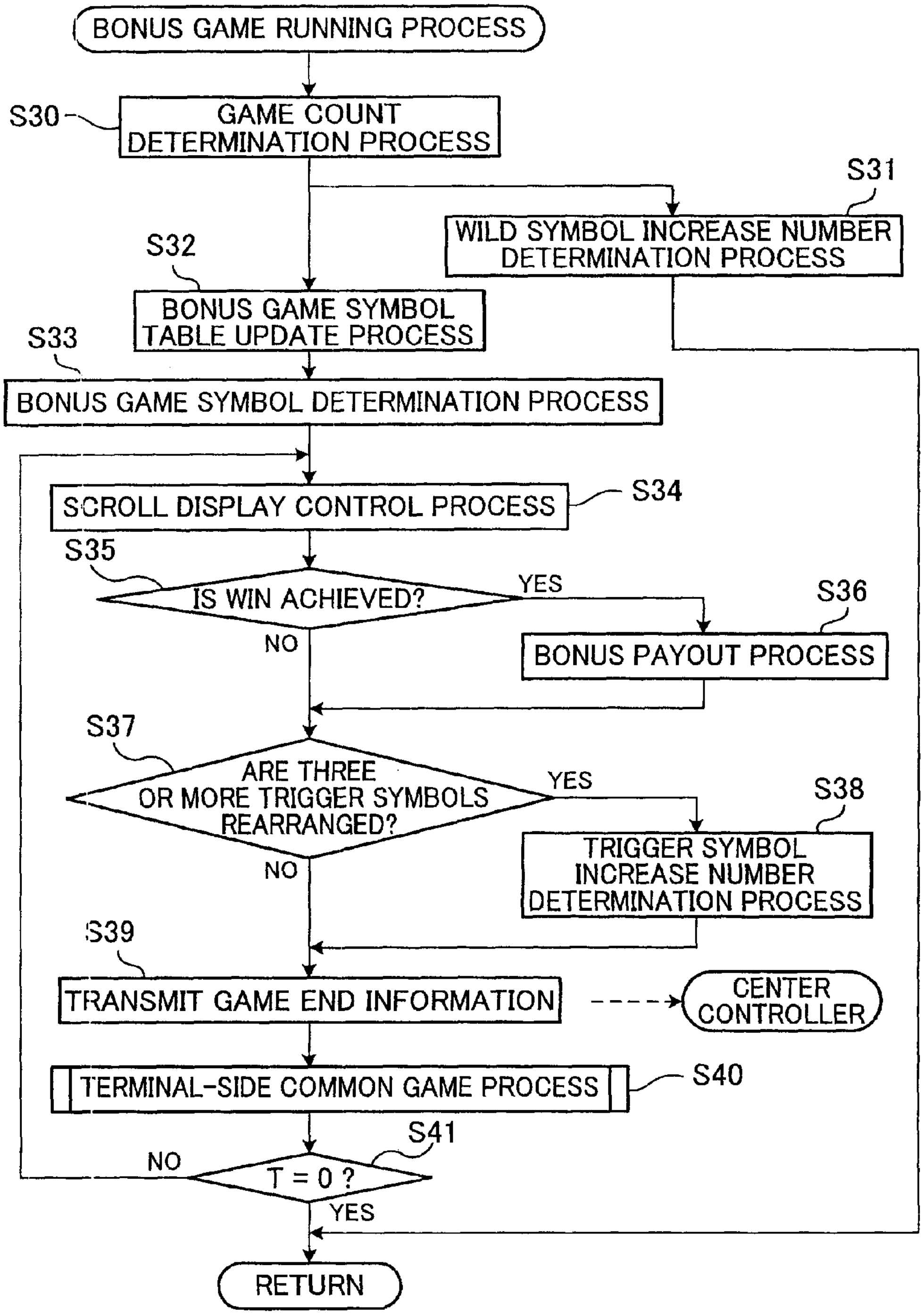
FIG. 28 is a flowchart of a bonus game running process.
Figure 29:
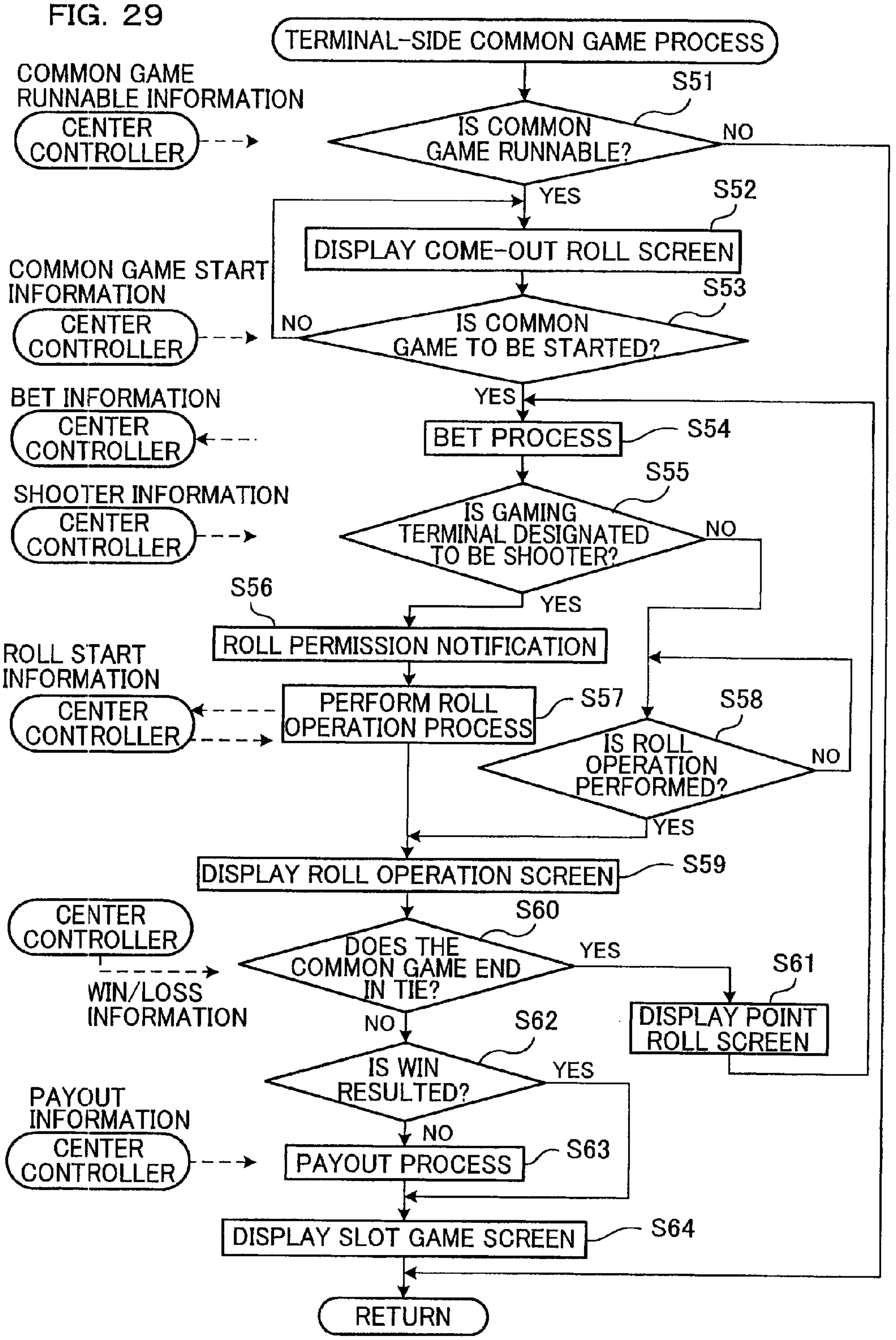
FIG. 29 is a flow chart illustrating a terminal side common game process.

The following describes an operation of the slot machine 10 having the above structure, with reference to FIGS. 27 to 29. The regular game running process shown in FIG. 27 is run by the main CPU 41 of the slot machine 10. Note that the slot machine 10 is started before this process.

As shown in FIG. 27, the main CPU 41 determines whether or a coin is bet (S10). In this process, the main CPU 41 determines whether an input signal is received. The input signal may be an input signal output from the 1-bet switch 26S when the 1-bet button 26 is operated, or an input signal output from the maximum bet switch 27S when the maximum bet button 27 is operated. When it is determined that no coin is bet, the process returns to S10.

On the other hand in S10, if it is determined that a coin is bet, the main CPU 41 performs a process of reducing the credit amount stored in the RAM 43, by the amount of coins having been bet (S11). Note that when the number of coins bet surpasses the credit amount stored in the RAM 43, the process of reducing the credit amount in the RAM 43 is not performed and the process returns S10. Further, if the number of coins bet surpasses the maximum number of coins bettable on one game (500 coins in this embodiment), the process of reducing the credit amount in the RAM 43 is not performed and the process goes to S12.

Next, the main CPU 41 determines whether the start button is turned on (S12). In this process, the main CPU 41 determines whether an input signal is received, which signal is output from the start switch 23S when the start button 23 is pressed. If it is determined that the start button 23 is not turned on, the process returns to S10. Note that when the start button 23 is not turned on (e.g. when the start button 23 is not turned on, and an instruction to end the game is input), the main CPU 41 cancels the result from the reduction performed in S11.

Meanwhile, when it is determined that the start button is turned on in S12, the main CPU 41 transmits terminal-side game information to the center controller 200 (S13). Here, the terminal side game information includes such information as the machine number of the slot machine 10 which is the origin of the terminal side game information, the bet amount, and the regular game which indicates the type of the current game. Note that part of the bet amount is stored each time a base game is run, and serves as a resource of the crap game.

The main CPU 41 runs a regular game symbol determination process thereafter (S14). In the regular game symbol determining process, the main CPU 41 runs the symbol determination program stored in the RAM 43 to determine a code No. at the time of stopping the symbols. Specifically, the main CPU 41 obtains a random number, and determines the code No. for each symbol column at the time of stopping symbol columns in the display blocks 28, based on the random number obtained, and the regular game symbol table of FIG. 8.

As illustrated in FIG. 8, there are 14 wild symbols (also referred to as specific symbols) in the regular game symbol table. The wild symbol is a symbol substitutable for any symbol.

Next, in S15, the main CPU 41 performs a scroll display control process. As illustrated in FIG. 17, this process controls displaying so that symbols determined in S14 are rearranged after scrolling of symbols is started.

Next, the main CPU 41 determines whether a winning is achieved (S16). In S16, the main CPU 41 counts the number of each type of symbols rearranged along the same payline L in S15. Then, the main CPU 41 determines if there is a counted value which equals or surpasses "2."

When it is determined that a winning is achieved, the main CPU 41 performs a process related to coin payout (S17). In this process, the main CPU 41 refers to the odds data stored in the RAM 43, and determines the payout multiplying factor based on the number of certain symbols rearranged along a payline L. The odds data is data indicating the number of certain symbols rearranged along a single payline L and the associated payout multiplying factor (See FIG. 14). Note that the payout is doubled every "WILD" arranged on a winning-achieved payline L. That is, if three "WILD" symbols are displayed along the winning-achieved payline L, the payout is eight times as much of the original payout amount.

The present embodiment deals with a case where it is determined that a winning is achieved when symbols arranged along a single payline L includes at least two symbols of the same type. The present embodiment however is not limited to this. For example, the paylines may be omitted from the present invention, and it is possible to determine that a winning is achieved when symbols rearranged in the display blocks 28 include at least two symbols of the same type.

When it is determined that a winning is not achieved in S16, or after the process of S17, the main CPU 41 determines whether three or more trigger symbols 503*b* are rearranged (S18). In this process, whether or not three or more trigger symbols 503*b* are rearranged in the display blocks 28 is determined, without taking into consideration the paylines L. When it is determined in S18 that three or more trigger symbols 503*b* are rearranged as illustrated in FIG. 17, the main CPU 41 transmits terminal-side game information to the center controller 200 (S19) before running a bonus game running process (S20). In the bonus game running process, the free game is run with an increased number of wild symbols. The bonus game running process is detailed later.

When it is determined in S18 that fewer than three trigger symbols 503*b* are rearranged, or after S20, the main CPU 41 runs, when a predetermined rescue running condition has been met, a rescue process to rescue the player (S21).

After S21, the main CPU 41 transmits game end information as information for causing all the slot machines 10 to simultaneously start the common game (S22). The main CPU 41 then runs a terminal-side common game process (S23) before ending the sub routine. Thereby when all the slot machines 10 are running the regular game, all the slot machines 10 start running a common game at a timing that a unit game of the regular game has finished, as illustrated in FIG. 1.

Next, the following describes the bonus game running process, with reference to FIG. 28. FIG. 28 is a flowchart showing a sub routine of the bonus game running process. A bonus game is a game which allows the player to play a game without betting a coin. First, the main CPU 41 sets a remaining free game count T to T=$F_1$ (=specific number of times=7) in the free game count recording region of the RAM 43 (S30). Further, the main CPU 41 causes pop-up displaying of the bonus-win screen 420 on the symbol display device 16, as illustrated in FIG. 18.

Next, the main CPU 41 executes a wild symbol increase count determining process (S31). Specifically, when three or more trigger symbols 503*b* are rearranged, a random number is obtained first. Then, a total increase in the number of wild symbols is determined based on that random number and the wild symbol increase count determination table. Then, the number of wild symbols is increased stepwise, or increased at once.

Further, the main CPU 41 executes a bonus game symbol table updating process (S32). In the bonus game symbol table updating process, the main CPU 41 updates the bonus game symbol table based on an increase in the number of wild symbols determined in the wild symbol increase count determining process.

Next, the main CPU 41 executes a bonus game symbol determining process (S33). In the bonus game symbol determining process, the main CPU 41 determines a code No. at the time of stopping the symbols, by running the symbol determination program stored in the RAM 43. More specifically, the main CPU 41 obtains random numbers, and determines the code No. of each symbol column of the display blocks 28, at the time of stopping the symbols, based on the random numbers obtained, and the bonus game symbol table.

Next in S34, the main CPU 41 executes a scroll display control process as illustrated in FIG. 19. This process is a display control whereby scrolling of symbols is started and symbols determined in S33 are rearranged thereafter.

Next, the main CPU 41 determines whether a winning is achieved (S35). In the present embodiment, a winning is achieved when symbols arranged along a payline L includes at least two symbols of the same type, as described above. The "WILD" which is the wild symbol is a symbol substitutable for any type of symbol. In the bonus game, the number of wild symbols is increased compared to that of the regular game. Therefore, the possibility of winning is higher than the regular game.

In S35, the main CPU 41 counts the number of each type of symbols rearranged along the same payline L in S34. Then, the main CPU 41 determines if there is a counted value which equals or surpasses "2".

When it is determined that a winning is achieved, the main CPU 41 performs a process related to coin payout (S36).

When it is determined that a winning is not achieved in S35, or after the process of S36, the main CPU 41 determines whether three or more trigger symbols 503*b* are rearranged (S37). In this process, whether or not three or more trigger symbols 503*b* are rearranged in the display blocks 28 is determined, without taking into consideration the paylines L. In S38, when it is determined that three or more trigger symbols 503*b* are rearranged, the main CPU 41 executes the trigger symbol increase count determining process, adds "1" to the bonus game stock number (carry-over number), and displays the stock number on the stock display unit 413.

Figure 24:
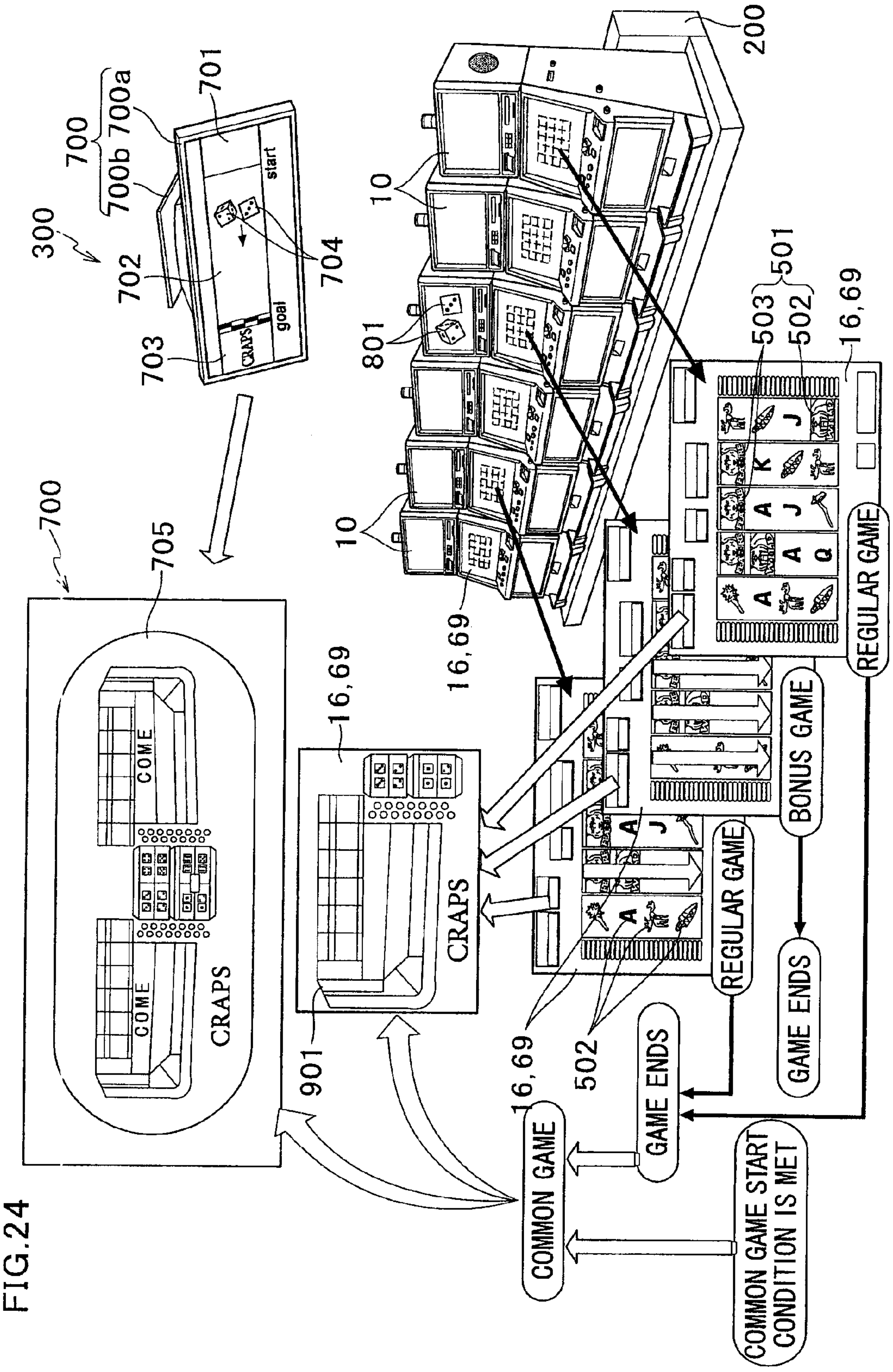
FIG. 24 is an explanatory diagram illustrating a playing method of the gaming machine.
Figure 25:
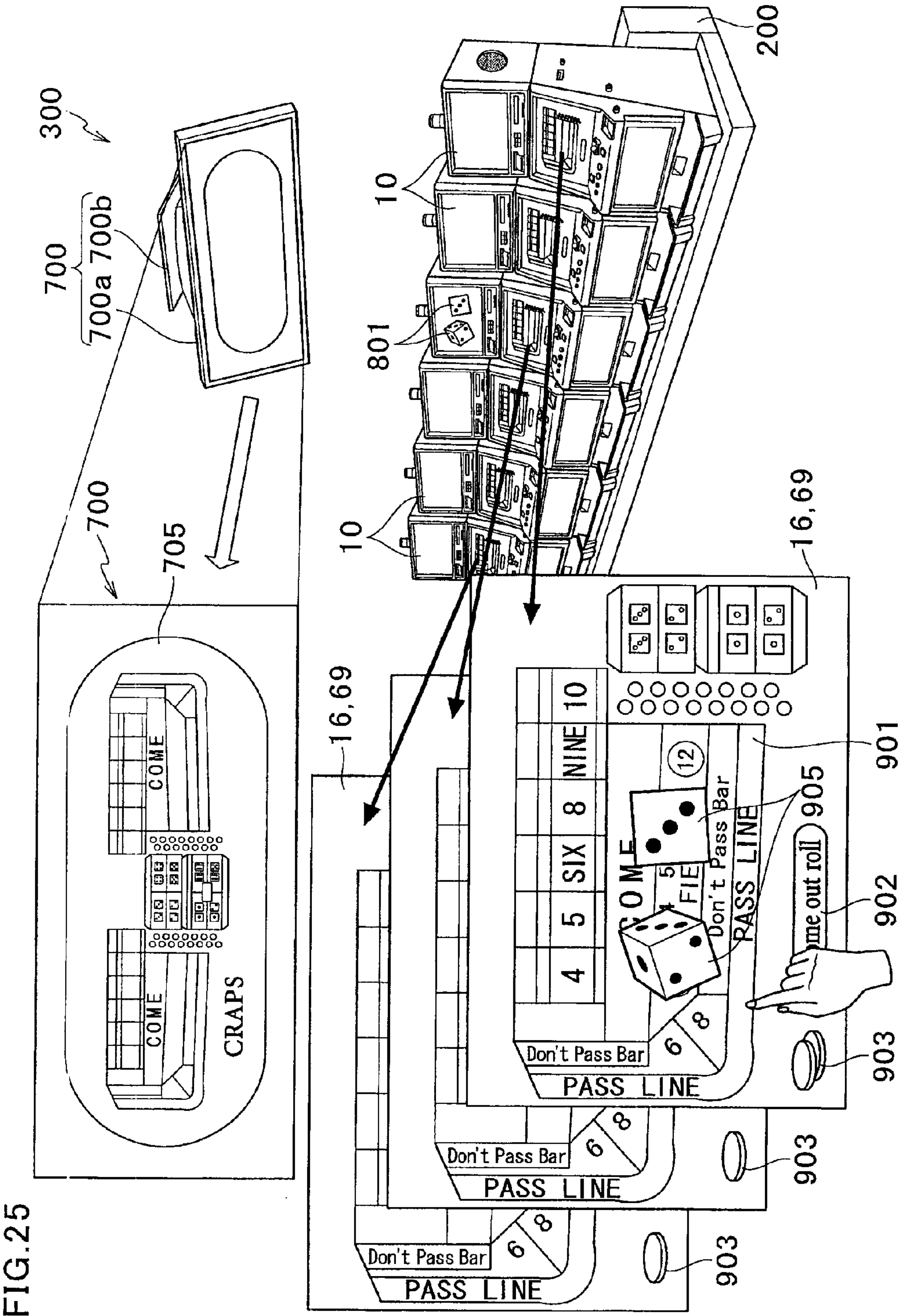
FIG. 25 is an explanatory diagram illustrating a playing method of the gaming machine.

The main CPU 41, as in the case of the regular game, transmits game end information as information for causing all the slot machines 10 to start running the common game simultaneously at all the slot machines 10 (S39). The main CPU 41 then runs the terminal-side common game process of FIG. 29 (S40). Thus, all slot machines 10 which are running the bonus game start the common game at a timing that a unit game of the bonus game has ended. For instance, when one or more slot machines 10 running the regular game and another one or more slot machine 10 running the bonus game coexist as illustrated in FIG. 24, all the slot machines 10 start running the common game at a timing that a unit game of the regular game and a unit game of the bonus game has ended.

Next, the main CPU 41 determines whether the remaining free game count (T) is "0," based on the remaining game count data stored in the free game count recording region of the RAM 43 (S39). When it is determined that the remaining free game count (T) is not "0", the main CPU 41 brings the process back to 534. Meanwhile, when it is determined that the remaining time (T) is "0," the main CPU 41 ends the routine on condition that the carry-over number of the bonus game is "0." When the bonus game carry-over number is not "0," the bonus game is run until the carry-over number becomes "0."

(Process Operation of Slot Machine 10: Terminal-Side Common Game Process)

In the regular game running process or the bonus game running process, when the terminal-side game process is run, it is first determined whether the common game is runnable, based on common game runnable information from the center controller 200 (S51), as illustrated in FIG. 29. When it is determined that the common game is unrunnable (S51, No), the routine ends and the regular game or bonus game continues.

Meanwhile, when it is determined that the common game is runnable (S51, Yes), the screen is switched from a slot game; e.g., the regular game screen or the bonus game screen, to a common game screen; i.e., a come-out roll screen of the crap game, as illustrated in FIG. 1 or 24 (S52). Thereafter, it is determined whether to start the common game, based on common game start information from the center controller 200 (S53). When it is determined that the common game is not started (S53, NO), S52 is repeated to cause a stand-by state while the come-out roll screen is being displayed.

When it is determined that the common game is started (S53,YES), a betting process is subsequently run (S54). In the betting process, as illustrated in FIG. 21, the roll button 902 is displayed in red during the come-out roll period to notify the player that an additional bet can be made. After a predetermined period of time has elapsed after the come-out roll period has begun, the roll button 902 is blinked As the end of the come-out roll period approaches, a blink interval of the roll button shortens, and the displaying of the roll button 902 switches from red to blue when the come-out roll period ends. Thereby, the player is able to understand that an additional bet can be made as he/she sees the displaying color of the roll button 902, and the player also understands that the end of the come-out roll is approaching based on the blinking status of the displaying color of the roll button 902.

When the player taps at the "PASS LINE" during the come-out roll period, the number of coins according to the number of tapping is bet, and the number of coin images illustrated in the coin image 903 is increased for each predetermined number of coins bet. Thereby, the player can understand that an additional bet has been made, by visually confirming a state of the coin image 903. Note that in FIG. 21, one coin image is added to the coin image 903 each time one additional bet is made.

Next, based on shooter information from the center controller 200, it is determined whether the slot machine 10 is designated to the shooter (S55). When it is determined that the slot machine 10 is not designated to be the shooter (S55, No), it is determined whether a roll operation is performed, based on roll start information from the center controller 200 (S58). When no roll operation is performed (S58, NO), S58 is repeated to cause a stand-by state. When a roll operation is performed (S58, Yes), a roll operation image is displayed (S59). Specifically, a moving image is displayed on the symbol display device 16, in which moving image the die images 905 appear and roll.

Meanwhile, when the slot machine 10 is designated to be the shooter (S55, Yes), the balloon 909 appears as illustrated in FIG. 20. Thus, the player is able to recognize that he/she is designated to be the shooter by visually confirming the balloon 909. Then, when the player presses the roll button 902, the roll operation is performed, and the roll start information is transmitted to the center controller 200 (S57). Afterwards, a moving image is displayed on the symbol display device 16, in which moving image the die images 905 appear and roll (S59). Note that the display of the moving image continues until a win or loss is resulted from the crap game.

Figure 26:
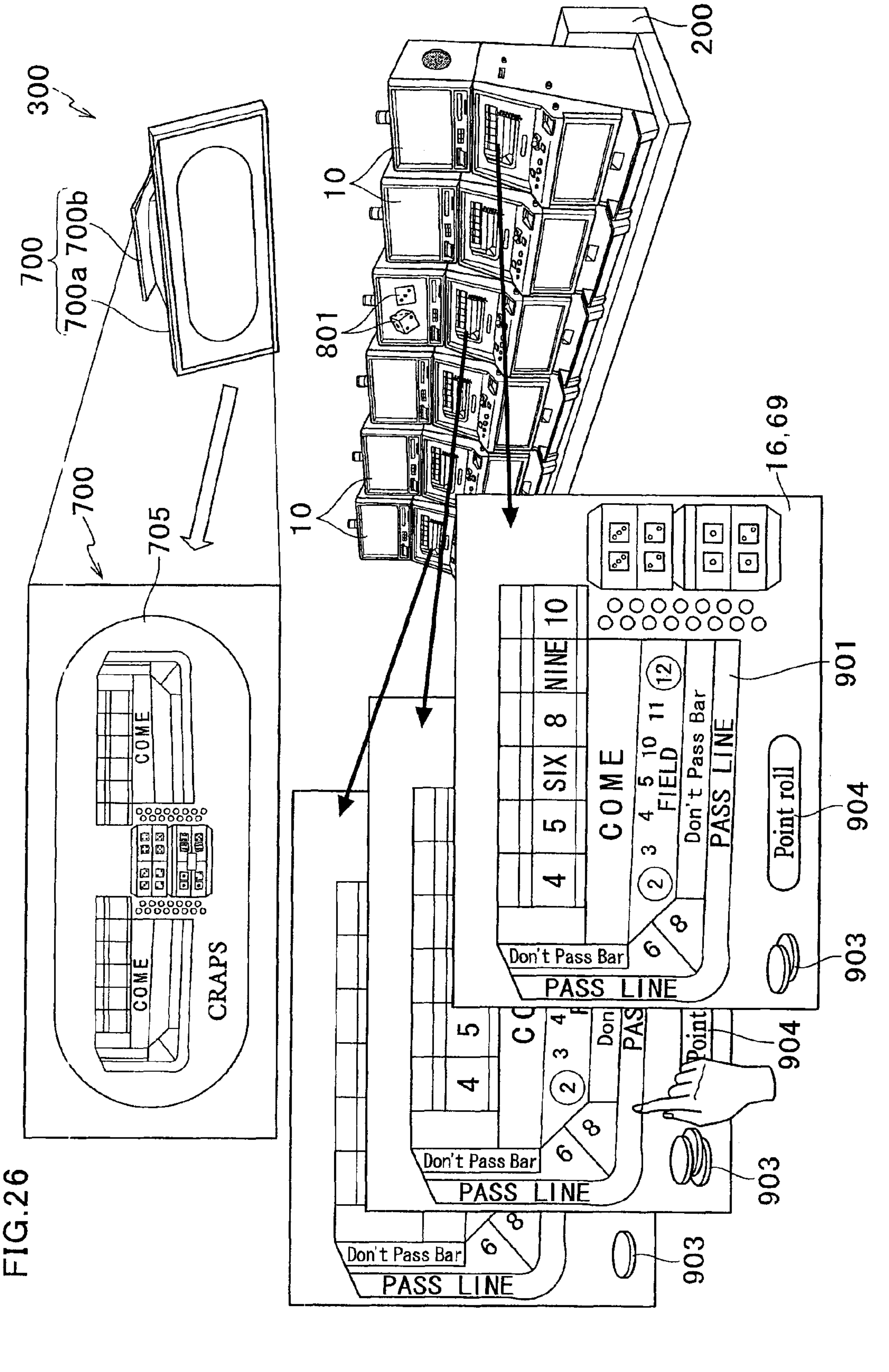
FIG. 26 is an explanatory diagram illustrating a playing method of the gaming machine.

Next, it is determined whether the crap game ends in a tie, based on win/loss information from the center controller 200 (S60). When it is determined that the crap game ends in a tie (S60, Yes), the point roll screen is displayed as a next crap game (S61), as illustrated in FIG. 22. Then, S54 is repeated, and an additional bet is allowed in the point-roll screen in the crap game, as illustrated in FIG. 26.

Meanwhile, when it is determined that the crap game did not end in a tie (S60, NO), it is subsequently determined whether a win is resulted from the crap game (S62). When it is determined that no win is resulted (S63, No), it is determined that a loss is resulted from the crap game, and the screen is brought back to the slot game screen displayed immediately before the crap game had begun, such as the regular game or the bonus game (S64), and this routine ends. Meanwhile, when a win is resulted (S62, Yes), a payout process is performed based on payout information from the center controller 200, where the bet amount is multiplied by a predetermined rate (S63) before this routine ends.

(Process Operation of the Center Controller 200: Center-Side Common Game Process)

Figure 30:
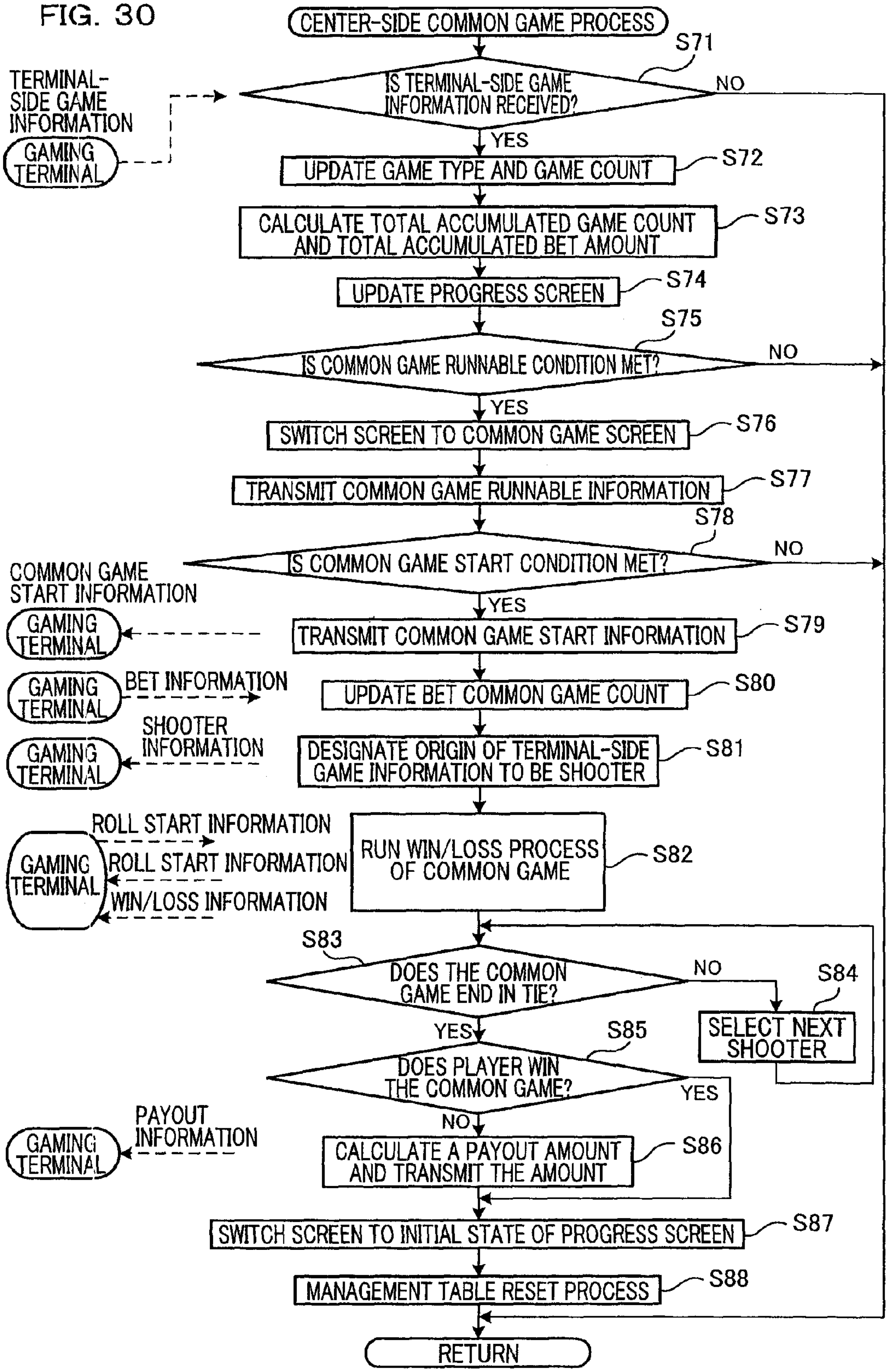
FIG. 30 is a flowchart illustrating a center side common game process.

As illustrated in FIG. 30, the center controller 200 runs the center-side common game process while performing data communication between each of the slot machines 10. Specifically, it is first determined whether terminal-side game information from each of the slot machines 10 is received (S71). When it is determined that no terminal-side game information is received (S71, No), this routine ends. Meanwhile, when the terminal-side game information is received (S71, Yes), various types of information included in the terminal-side information is retrieved, and a gaming terminal management table of FIG. 15 is updated, which information including a game type, a game number, the machine number, and the bet amount (S72). Note that a part of the bet is stored for each bet amount on the base game, and serves as a resource for a payout in the crap game.

Afterwards, a total accumulated game number and a total accumulated bet amount are calculated, the total accumulated game number indicating the total number of regular games being the total number of regular games having been run at all the slot machines 10, and the total accumulated bet amount being the total amount of bet made at all the slot machines 10 (S73). A progress screen on the common display device 700 is updated using at least one of the total accumulated game number and the total accumulated bet amount (S74). Specifically, as illustrated in FIGS. 1 and 23, a position in the travel area 702 is determined and the die images 704 are displayed at the position, the position associated with the total accumulated game number and/or the total accumulated bet amount. Thus, the die images 704 are displayed as if the die images 704 are traveling in the travel area 702 from the start area 701 towards the goal area 703. The player is able to anticipate when the crap game as the common game will start, when he/she visually confirms positions of the die images 704 displayed in the travel area 702.

Next, it is determined whether the common game runnable condition has been met, with at least one of the total accumulated game number and the total accumulated bet amount (S75). In other words, the total accumulated game number or the total accumulated bet amount is compared with a predetermined value, or the total value of the total accumulated game number and the total accumulated bet amount is compared with the predetermined value, in order to determine whether the common game runnable condition has been met (S75). If the common game runnable condition has not been met (S75, No), the routine ends, and the process is repeated from S71.

When the common game runnable condition has been met (S75, Yes), the screen is switched from the progress screen to the common game screen (S76). Then, common game runnable information indicating satisfaction of the common game runnable condition is transmitted to each of the slot machines 10 (S77).

Next, the gaming terminal management table in FIG. 15 is referred to, and a gaming status of a unit game of the regular game or the bonus game at each slot machine 10 is retrieved. It is then determined whether all gaming statuses are "stop," that is, whether the common game start condition has been met (s78). When it is determined that the common game start condition has not been met (S78, No), the routine ends and the process is re-run from S71.

When it is determined that the common game start condition has been met (S78, Yes), the common game start information indicating satisfaction of the common game start condition is transmitted to all the slot machines 10 (S79). Afterwards, the bet amount on the common game which is a crap game is updated based on bet information from each slot machine 10. In other words, a bet amount column of a common game management table of FIG. 16 is updated (S80). A slot machine 10 which is the origin of terminal-side game information is designated to be the shooter, and shooter information is transmitted to the designated specific slot machine 10 (S81).

Next, a common game win/loss process is run at a timing that roll start information from the specific slot machine 10 is received (S82). Specifically, first, the roll start information indicating that a roll operation has been performed is transmitted to all the slot machines 10. Then, a win/loss mode is randomly selected from three types of win/loss mode for the crap game as the common game. The three types of win/loss mode consist of win, loss, or tie. Note that the random selection of a win/loss mode may be different in accordance with the probability of each type being selected. For example, the win/loss mode indicating "tie" may be selected with higher possibility than the other types of win/loss mode. When the win/loss mode is selected, win/loss information indicating the selected win/loss mode is transmitted to all the slot machines 10.

Thereafter, it is determined whether the win/loss mode selected in the common game win/loss process is "tie" (S83). When the win/loss mode selected is "tie," (S83, Yes), a next shooter is selected (S84). The shooter may be (i) randomly selected from all the slot machines 10, (ii) sequentially selected from the slot machines 10 in the descending order of the total value of the bet amount or the game number at the slot game, or (iii) sequentially selected in the order of the arrangement of the slot machines 10, or in the order of machine number.

Meanwhile, when the win/loss mode is not "tie" (S83, No), it is subsequently determined whether the player wins or not (S85). When it is determined that the player wins (S85, Yes), a payout amount at each slot machine 10 is calculated, and payout information indicating the payout amount is transmitted to each slot machine 10 (S86) before S87 is run. Meanwhile, when it is determines that the player loses (S85, No), S87 is immediately run. In other words, the crap game screen is switched to the progress screen at the initial state (S87). Thereafter, the gaming terminal management table of FIG. 15 is reset (S88), and the routine ends.

In the above embodiment, a function of the side bet unit 651 of FIG. 2 where a bet can be increased through the touch panel of the display unit 614 is exhibited as an example. In addition to, or in place of the function, the side bet unit 651 may have the following function.

In other words, the side bet unit 651 of FIG. 2 exhibits, as an example, the function where a bet can be increased through the touch panel of the display unit 614 when no win or loss is resulted from the common game. The function of the side bet unit 651, however, is not limited to this. In other words, the side bet unit 651 may have functions of: betting on win or loss of the shooter; determining a win or loss which causes the crap game to end, and (i) when the shooter wins, awarding a payout according to the win, and (ii) when a bet is placed on the shooter's win, awarding a payout according to the bet. Further, the side bet unit 651 of FIG. 2 may have a function of when the shooter loses and when a bet is placed on the shooter's loss, awarding a payout according to the bet.

Specifically, the gaming machine 300 includes: a plurality of slot machines 10 each of which serving as a gaming terminal having an input device and a terminal controller, the input device capable of accepting an external input, and the terminal controller programmed to carry out the following steps of (e1) to (e4); and the center controller 200 connected in communication with the slot machines 10 and programmed to carry out the following steps of (f1) to (f5).

Specifically, the terminal controller is programmed to carry out the steps of:

(e1) running a base game in response to a start operation input through the input device;

(e2) running a crap game in response to a game start command from the center controller 200;

(e3) placing a bet on a shooter's win or loss;

(e4) determining, based on game result information from the center controller 200, a win or loss in the crap game which causes the crap game to end, and: (i) in the event that no win or loss is resulted, running a crap game again; and (ii) in the event that a win is resulted, awarding a payout according to the win, and in the event that a bet has been placed on the shooter winning the crap game, awarding a payout according to the bet.

Figure 31:
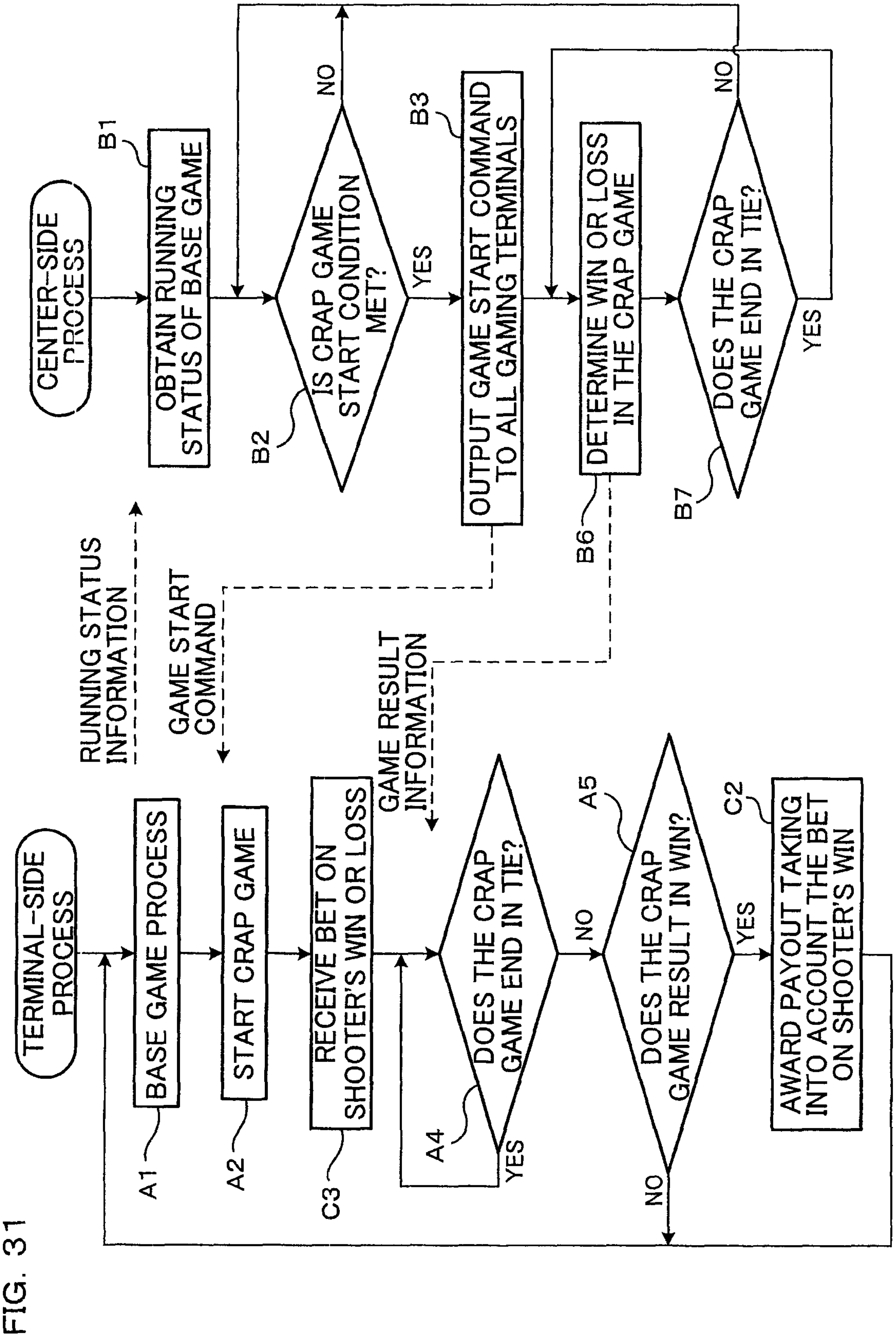
FIG. 31 is a flowchart illustrating the playing method of the gaming machine.

In other words, as illustrated in FIG. 31, the slot machine 10 runs the base game process (A1), starts the crap game in response to a game start command from the center controller 200 (A2), and receives a bet placed on the shooter's win or loss (C3). The slot machine 10 also: determines whether the crap game ends in a tie (A4); when it is determined that the crap game ends in the tie (A4, Yes), repeats the step of A4; and when it is determined that the crap game does not end in a tie (A4, No), subsequently determines whether the shooter wins the crap game (A5). When it is determined that the crap game (A5, Yes), the process is re-run from A1. When it is determined that the shooter wins the crap game (A5, Yes), a bet placed on the shooter's win or loss is added to a payout and the payout is awarded (C2). Note that the steps A1, A2, A4, and A5 of the flow chart have the same functions as those of the flow chart of FIG. 2.

Figure 32:
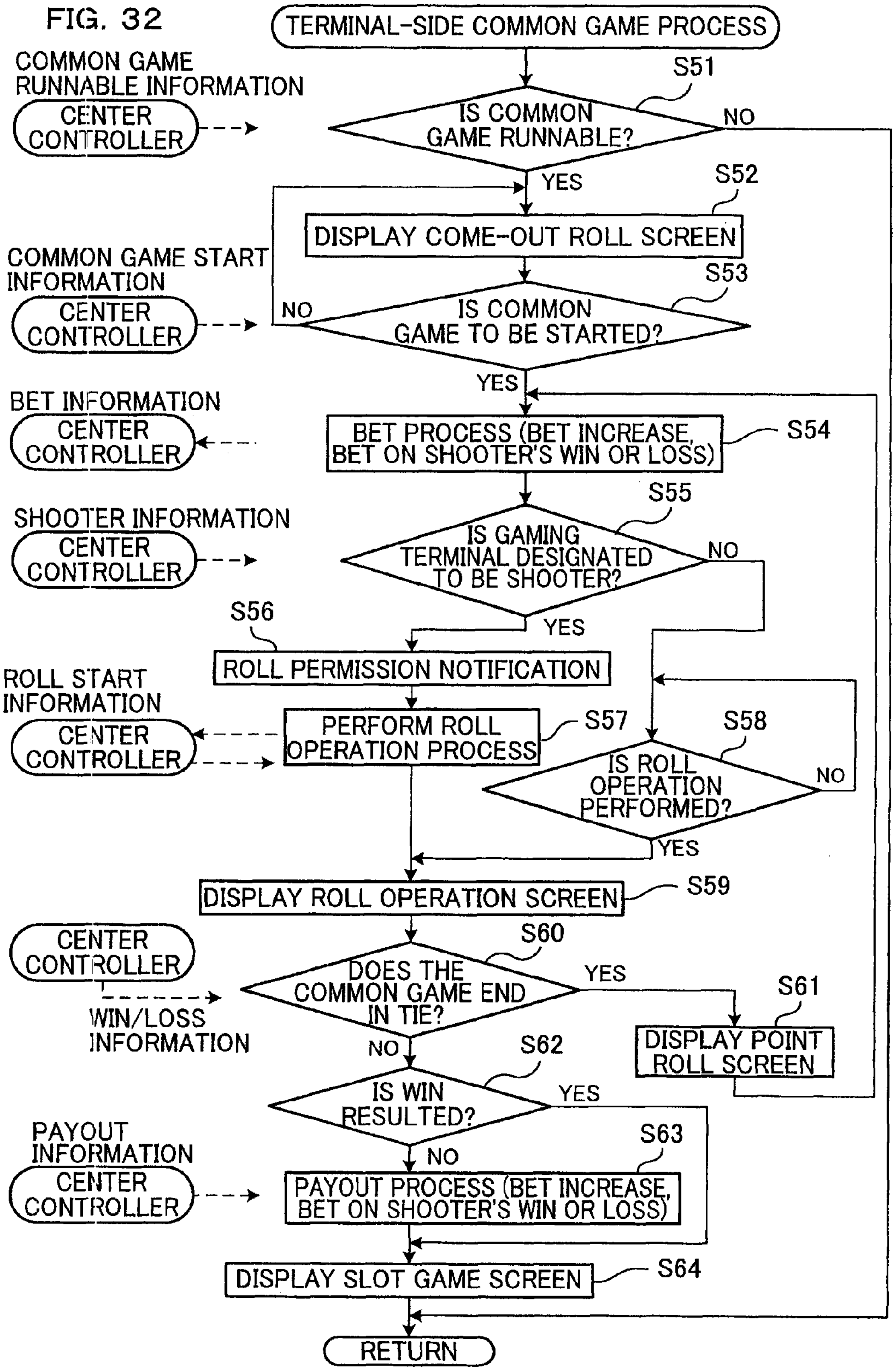
FIG. 32 is a flow chart illustrating a terminal side common game process.
Figure 33:
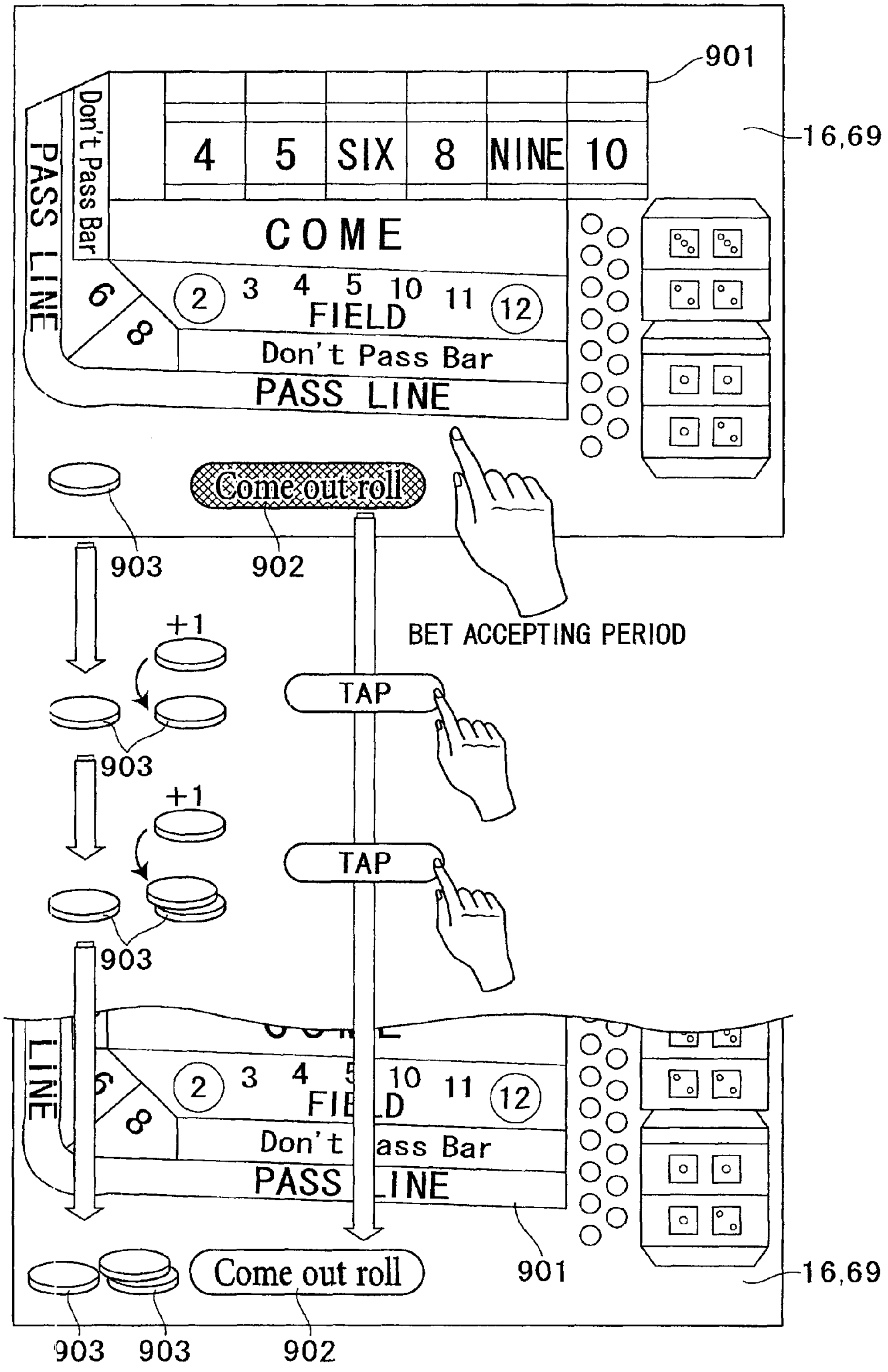
FIG. 33 is an explanatory diagram illustrating a display state of the symbol display device.

A flow chart of FIG. 32 is realized when each step of the flowchart of the terminal-side common game process in FIG. 29. In other words, as illustrated in FIG. 32, in the slot machine 10, an additional bet can be made and a bet can be placed on the shooter's win or loss in the bet process in S54. When a bet is placed on win or loss of the shooter, the coin images 903 are parallelly placed as illustrated in FIG. 33, and it is displayed in a not-illustrated region whether a bet is placed on the shooter's win or loss. Thereafter in the payout process of S63, a payout is awarded according to the additional bet and the bet placed on the shooter's win or loss.

Meanwhile, the center controller carries out the steps of;

(f1) determining whether the crap game start condition has been met, based on a running status of the base game at each of the slot machines 10;

(f2) in the event that the crap game start condition has been met, outputting the game start command simultaneously to all of the slot machines 10;

(f3) determining a win or loss in the crap game, and outputting the result of the crap game as the game result information to all of the gaming terminals; and (f4) in the event that no win or loss is resulted from the crap game, running the process of (f 3) again.

In other words, as illustrated in FIG. 31, the center controller 200: retrieves a running state of the base game based on tae running state information from each of the slot machines 10 (B1); and determines whether the crap game start condition has been met (B2). When the crap game start condition has not been met (B1, No), the center controller 200 carries out the step of B2 again.

Meanwhile, when the crap game start condition has been met (B1, Yes), the center controller 200 outputs a game start command to all the slot machines 10 (b3) before determining a win or loss of the crap game (B6). Then, the center controller 200 determines whether the crap game ends in a tie (B7), and (i) when it is determined that the crap game does not end in a tie (B7, Yes), the center controller 200 runs the process B2 again, and (ii) when it is determined that the crap game ends in a tie, the center controller 200 runs the process B6 again. Note that steps B1, B2, B3, B6, and B7 of the flow chart have the same functions as those of the flow chart of FIG. 2.

Accordingly, in addition to awarding a payout according to the win when the shooter wins the crap game, the gaming machine awards a payout according to the bet when a bet is placed on the shooter's winning the crap game. Thus, a player may be awarded an increased payout in accordance with the bet on the shooter's winning or losing the crap game.

Further, the present embodiment deals with the case where one or more coins are paid out in accordance with the bet amount, when the player wins a common game such as the crap game. The present invention, however, is not limited to this: The present invention may award a one or more stored coins at a distribution rate corresponding to the bet amount on the common game, which stored coins are a part of a bet stored for each bet amount on the base game.

The present embodiment deals with a case where the number of paylines L is 25; however, the number of paylines is not limited to this. For example, the number of paylines may be 30.

The present embodiment deals with a case where a winning of bonus is achieved when three or more trigger symbols are rearranged. However, the winning of bonus is not limited to this. For example, a winning of bonus may be achieved when a predetermined period of time has elapsed since the last bonus game has ended.

Further, in the present embodiment, the free game is a game in which displaying of symbols in display blocks 28 are varied and stopped, and then a payout amount is determined according to the symbols having stopped or a combination of the stopped symbols (i.e. a game normally run at a slot machine). However, the free game of the present invention is not limited to this, and the free game may be different from a game run at a slot machine. Examples of the free game include: a card game such as poker, a shooting game, a fighting game, and the like. The free game may be a game that awards a game medium or a game that awards no game medium. Further, the following is also possible. Namely, a free game is run on condition that the number of regular games counted during the insured mode reaches a predetermined number. Then, when the number of regular games counted during the insured mode once again reaches the predetermined number, a free game which is different from the previous free game is run. The free game in the present invention may be suitably designed, and is not particularly limited, as long as the free game requires no bet of a game medium.

The above embodiment thus described solely serves as a specific example of the present invention, and the present invention is not limited to such an example. Specific structures of various means and the like may be suitably designed or modified. Further, the effects of the present invention described in the above embodiment are no more than examples of most preferable effects achievable by the present invention. The effects of the present invention are not limited to those described in the embodiment of the present invention described above.

Further, the detailed description above is mainly focused on characteristics of the present invention to fore the sake of easier understanding. The present invention is not limited to the above embodiment, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, term, number, or the like solely for the sake of convenience. Although the present specification occasionally personifies the processes performed in the steps or blocks, these processes are essentially executed by various devices. Further, the other structures necessary for the steps or blocks are obvious from the above descriptions.

The present invention is applicable to gaming machines in general which runs a common game such as crap game at a plurality of gaming terminals.

What is claimed is:

1. A gaming machine comprising:

a plurality of gaming terminals each having an input device and a terminal controller, the input device capable of receiving an external input, and the terminal controller programmed to carry out the following steps of (a1) to (a4); and a center controller connected in communication with the gaming terminals programmed to carry out the following steps of (b1) to (b5), wherein the terminal controllers each carry out the steps of:

(a1) repetitively running an individual base game at each of the plurality of gaming terminals in response to a start operation input through the input device, each individual base game at each of the plurality of gaming terminals being independent and distinct, and separately runnable, from one another;

(a2) running a common crap game which allows participation by all of the plurality of gaming terminals in response to a common game start command from the center controller;

(a3) determining whether a gaming terminal is designated to be a shooter of the common crap game based on a shooter command from the center controller, and in the event that the gaming terminal is designated to be a shooter, receiving a roll operation input through the input device to allow the roll operation command to be outputted to the center controller; and (a4) based on game result information from the center controller, determining a common game win or loss which causes the crap game to end, and (i) in the event that no win or loss is resulted, running a common crap game again, and (ii) in the event that a win is resulted, awarding a payout according to the win, and wherein the center controller carries out the steps of:

(b1) based on an individual base game running status at each of the plurality of gaming terminals and a cumulative accumulated value, which is a sum of accumulated values taken from each of the plurality of gaming terminals and which increases through repetition of the individual base games at each of the gaming terminals, determining whether a common crap game runnable condition has been met based on the cumulative accumulated value reaching a predetermined value;

(b2) in the event that the common crap game runnable condition has been met, outputting the common game start command simultaneously to all of the gaming terminals;

(b3) after the common game start command is outputted, shifting from the individual base games played at each of the plurality of gaming terminals to the common crap game, selecting a specific gaming terminal from among all of the gaming terminals, and outputting the shooter command to the specific gaming terminal;

(b4) determining a win or loss based on the roll operation command from the specific gaming terminal, and outputting the determination result as game result information to all of the gaming terminals; and (b5) in the event that no win or loss results from the common crap game, selecting the specific or another specific gaming terminal from among all of the gaming terminals, and outputting the shooter command to the specific or another gaming terminal, wherein a portion of a bet amount in each individual base game at each of the plurality of gaming terminals is collected and stored by the central controller and utilized as a resource for payout in the common crap game; and wherein, the gaming machine includes a common display device positionally disposed such that it is viewable from each of the plurality of the gaming terminals, and the center controller is configured to display a movable object and a predetermined goal area on the common display device and control movement of the movable object toward the predetermined goal area as the cumulative accumulated value increases, the movable object reaching the predetermined goal area when the cumulative accumulated value reaches the predetermined value corresponding to the common crap game runnable condition.

2. The gaming machine according to claim 1, wherein, in at least one of steps (b3) and (b5), the specific or another gaming terminal is randomly selected from among all of the gaming terminals.

3. The gaming machine according to claim 1, wherein, in step (b3), the gaming terminal causing the common crap game runnable condition to have been met is selected as the specific gaming terminal.

4. The gaming machine according to claim 1, wherein the bet amount is allowed to be increased in step (a4) in the event that no win or loss results.

5. The gaming machine according to claim 1, wherein the gaming terminals each further include a terminal display device; and in step (a2), the gaming terminals each display a bet table of the common crap game on the terminal display device, in response to the game start command from the center controller.

6. The gaming machine according to claim 1, wherein the gaming terminals each further include a terminal display device; and wherein the terminal controller further carries out the step of:

(a5) displaying a moving image corresponding to the roll operation during a period of time after outputting the roll operation command to the center controller before receiving game result information from the center controller.

7. The gaming machine of claim 1 wherein the cumulative accumulated value serving as the runnable condition comprises a total of accumulative bet amounts taken from each of the plurality of gaming terminals and a total number of individual base games played at each of the plurality of gaming terminals.

8. The gaming machine of claim 1, wherein the determination of whether a common crap game runnable condition has been met, based on an individual base game running status at each of the gaming terminals, comprises a determination of a state of progress of the individual base game at each of the gaming terminals, the state of progress being one of the individual base game at each of the gaming terminals being in a running, or stopped, condition.

9. A gaming machine comprising:

a plurality of gaming terminals each having an input device and a terminal controller, the input device capable of receiving an external input, and the terminal controller programmed to carry out the following steps of (c1) to (c4); and a center controller connected in communication with the gaming terminals and programmed to carryout the following steps of (d1) to (d5), wherein the terminal controller carries out the steps of:

(c1) repetitively running an individual base game at each of the plurality of gaming terminals in response to a start operation input through the input device, each individual base game at each of the plurality of gaming terminals being independent and distinct, and separately runnable, from one another;

(c2) running a common game which allows participation by all of the gaming terminals in response to a common game start command from the center controller;

(c3) determining whether a gaming terminal is designated to be a shooter in the common game based on a shooter command from the center controller, and in the event that the gaming terminal is designated to be the shooter, receiving a roll operation input through the input device to allow the roll operation command to be outputted to the center controller;

(c4) determining, based on game result information from the center controller, a common game win or loss which causes the common game to end, and (i) in the event that no common game win or loss results, running the common game again, and (ii) in the event that a common game win results, awarding a payout according to the win, and wherein the center controller carries out the steps of:

(d1) determining whether a common game runnable condition has been met, based on an individual base game running status at each of the gaming terminals and a cumulative accumulated value reaching a predetermined value, the cumulative accumulated value comprising a sum of accumulated values taken from each of the plurality of gaming terminals and which increases through repetition of the individual base games at each of the gaming terminals;

(d2) in the event that the common game runnable condition has been met, outputting the common game start command simultaneously to all of the gaming terminals;

(d3) after outputting the common game start command, shifting from the individual base games played at each of the plurality of gaming terminals to the common game, selecting a specific gaming terminal from among all of the gaming terminals, and outputting the shooter command to the specific gaming terminal;

(d4) determining a win or loss in the common game based on the roll operation command from the specific gaming terminal, and outputting a result as common game result information to all of the gaming terminals; and (d5) in the event that no win or loss is resulted from the common game, selecting the specific or another gaming terminal from among all of the gaming terminals, and outputting the shooter command to the specific or another gaming terminal, wherein a portion of a bet amount in each individual base game at each of the plurality of gaming terminals is collected and stored by the central controller and utilized as a resource for payout in the common game; and wherein, the gaming machine includes a common display device positionally disposed such that it is viewable from each of the plurality of the gaming terminals, and the center controller is configured to display a movable object and a predetermined goal area on the common display device and control movement of the movable object toward the predetermined goal area as the cumulative accumulated value increases, the movable object reaching the predetermined goal area when the cumulative accumulated value reaches the predetermined value corresponding to the common crap game runnable condition.

10. The gaming machine of claim 9 wherein the cumulative accumulated value serving as the runnable condition comprises a total of accumulative bet amounts taken from each of the plurality of gaming terminals and a total number of individual base games played at each of the plurality of gaming terminals.

11. The gaming machine of claim 9, wherein the determination of whether a common crap game runnable condition has been met, based on an individual base game running status at each of the gaming terminals, comprises a determination of a state of progress of the individual base game at each of the gaming terminals, the state of progress being one of the individual base game at each of the gaming terminals being in a running, or stopped, condition.

12. A playing method of a game run by a gaming machine having a plurality of gaming terminals and a center controller connected in communication with the gaming terminals, the method comprising:

the gaming terminals each carrying out the steps of:

repetitively running an individual base game at each of the plurality of gaming terminals in response to a start operation received through the input device, each individual base game at each of the plurality of gaming terminals being independent and distinct, and separately runnable, from one another;

running a common crap game which allows participation by all of the gaming terminals in response to a common game start command from the center controller;

determining whether a gaming terminal is designated to be a shooter in the common game in response to a shooter command from the center controller, and in the event that the gaming terminal is designated to be a shooter, receiving a roll operation through the input device to allow the roll operation command to be outputted to the center controller;

determining, based on game result information from the center controller, a common game win or loss which causes the common crap game to end, and (i) in the event that no win or loss results, running the common crap game again; and (ii) in the event that a win results, awarding a payout according to the win, and wherein the center controller carries out the steps of:

determining whether a common crap game runnable condition has been met, based on an individual base game running status at each of the gaming terminals and a cumulative accumulated value reaching a predetermined value, the cumulative accumulated value comprising a sum of accumulated values taken from each of the plurality of gaming terminals and which increases through repetition of the individual base games at each of the gaming terminals;

in the event that the common crap game runnable condition has been met, outputting the common game start command simultaneously to all of the gaming terminals;

after outputting the common game start command, shifting from the individual base games played at each of the plurality of gaming terminals to the common crap game, selecting a specific gaming terminal from among all of the gaming terminals, and outputting the shooter command to the specific gaming terminal;

determining a win or loss in the common crap game based on the roll operation command from the specific gaming terminal, and outputting the result of the common crap game as the game result information to all of the gaming terminals; and in the event that no win or loss is resulted from the common crap game, selecting the specific or another gaming terminal from among all of the gaming terminals, and outputting the shooter command to the specific or another gaming terminal, wherein a portion of a bet amount in each individual base game at each of the plurality of gaming terminals is collected and stored by the central controller and utilized as a resource for payout in the common crap game; and wherein, the gaming machine includes a common display device positionally disposed such that it is viewable from each of the plurality of the gaming terminals, and the center controller is configured to display a movable object and a predetermined goal area on the common display device and control movement of the movable object toward the predetermined goal area as the cumulative accumulated value increases, the movable object reaching the predetermined goal area when the cumulative accumulated value reaches the predetermined value corresponding to the common crap game runnable condition.

13. The playing method of claim 12 wherein the cumulative accumulated value serving as the runnable condition comprises a total of accumulative bet amounts taken from each of the plurality of gaming terminals and a total number of individual base games played at each of the plurality of gaming terminals.

14. The gaming machine of claim 12, wherein the determination of whether a common crap game runnable condition has been met, based on an individual base game running status at each of the gaming terminals, comprises a determination of a state of progress of the individual base game at each of the gaming terminals, the state of progress being one of the individual base game at each of the gaming terminals being in a running, or stopped, condition.

15. A gaming machine comprising:

a plurality of gaming terminals each having an input device and a terminal controller, the input device capable of receiving an external input, the terminal controller programmed to carry out the following steps of (e1) to (e4);

a center controller connected in communication with the gaming terminals, and programmed to carry out the following steps of (f1) to (f4), wherein the terminal controller carries out the steps of:

(e1) repetitively running an individual base game at each of the plurality of gaming terminals in response to a start operation input through the input device, each individual base game at each of the plurality of gaming terminals being independent and distinct, and separately runnable, from one another;

(e2) running a common crap game which allows participation by all of the gaming terminals in response to a common game start command from the center controller;

(e3) placing a bet on a shooter's win or loss in the common crap game;

(e4) determining, based on game result information from the center controller, a win or loss in the common crap game which causes the common crap game to end, and:

(i) in the event that no win or loss is resulted, running the common crap game again; and (ii) in the event that a win is resulted, awarding a payout according to the win, and in the event that a bet has been placed on the shooter winning the common crap game, awarding a payout according to the bet, and wherein the center controller carries out the steps of:

(f1) determining whether a common crap game runnable condition has been met, based on an individual base game running status at each of the gaming terminals and a cumulative accumulated value reaching a predetermined value, the cumulative accumulated value comprising a sum of accumulated values taken from each of the plurality of gaming terminals and which increases through the repetition of the individual base games at each of the gaming terminals;

(f2) in the event that the common crap game runnable condition has been met, shifting from the individual base games played at each of the plurality of gaming terminals to the common crap game, and outputting the common game start command simultaneously to all of the gaming terminals;

(f3) determining a win or loss in the common crap game, and outputting the result of the common crap game as the game result information to all of the gaming terminals; and (f4) in the event that no win or loss results from the common crap game, running the process of (f3) again, wherein a portion of a bet amount in each individual base game at each of the plurality of gaming terminals is collected and stored by the central controller and utilized as a resource for payout in the common crap game; and wherein, the gaming machine includes a common display device positionally disposed such that it is viewable from each of the plurality of the gaming terminals, and the center controller is configured to display a movable object and a predetermined goal area on the common display device and control movement of the movable object toward the predetermined goal area as the cumulative accumulated value increases, the movable object reaching the predetermined goal area when the cumulative accumulated value reaches the predetermined value corresponding to the common crap game runnable condition.

16. The gaming machine of claim 15 wherein the cumulative accumulated value serving as the runnable condition comprises a total of accumulative bet amounts taken from each of the plurality of gaming terminals and a total number of individual base games played at each of the plurality of gaming terminals.

17. The gaming machine of claim 15, wherein the determination of whether a common crap game runnable condition has been met, based on an individual base game running status at each of the gaming terminals, comprises a determination of a state of progress of the individual base game at each of the gaming terminals, the state of progress being one of the individual base game at each of the gaming terminals being in a running, or stopped, condition.

* * * * *